(12) United States Patent
Matas et al.

(10) Patent No.: US 11,849,063 B2
(45) Date of Patent: Dec. 19, 2023

(54) TOUCH SCREEN DEVICE, METHOD, AND GRAPHICAL USER INTERFACE FOR PROVIDING MAPS, DIRECTIONS, AND LOCATION-BASED INFORMATION

(71) Applicant: Apple Inc., Cupertino, CA (US)

(72) Inventors: Michael Matas, Healdsburg, CA (US); Christopher Blumenberg, San Francisco, CA (US); Andre M. J. Boule, San Jose, CA (US); Stephen O. Lemay, Palo Alto, CA (US); Richard Williamson, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/901,269

(22) Filed: Jun. 15, 2020

(65) Prior Publication Data

US 2020/0314234 A1     Oct. 1, 2020

Related U.S. Application Data

(60) Continuation of application No. 13/662,370, filed on Oct. 26, 2012, now Pat. No. 10,686,930, which is a
(Continued)

(51) Int. Cl.
*G06F 3/048* (2013.01)
*H04M 1/72457* (2021.01)
(Continued)

(52) U.S. Cl.
CPC ........ *H04M 1/72457* (2021.01); *G01C 21/20* (2013.01); *G01C 21/367* (2013.01); *G01C 21/3664* (2013.01); *G06F 3/0488* (2013.01)

(58) Field of Classification Search
CPC ........ H04M 1/72572; H04M 1/72448; H04M 1/724; G01C 21/20; G01C 21/3664;
(Continued)

(56) References Cited

U.S. PATENT DOCUMENTS 4,899,138 A    2/1990 Araki et al.
4,935,728 A    6/1990 Kley
(Continued)

FOREIGN PATENT DOCUMENTS

CN    1683905 A    10/2005
CN    1754084 A    3/2006
(Continued)

OTHER PUBLICATIONS

Xiao et al. ("Wireless Community Support For Community Network" from pp. 21-26, "http://citeseerx.ist.psu.edu/viewdoc/download?doi=10.1.1.85.6793&rep=rep1&type=pdf#page=21", 3rd International Workshop on Smart Appliances and Wearable Computing Proceedings; pub date: May 29, 2003), (Year: 2003).*
(Continued)

*Primary Examiner* — Steven B Theriault
(74) *Attorney, Agent, or Firm* — Kubota & Basol LLP

(57) ABSTRACT

A device, method, and graphical user interface for providing maps, directions, and location-based information on a touch screen display are disclosed.

33 Claims, 53 Drawing Sheets

Related U.S. Application Data division of application No. 12/143,752, filed on Jun. 20, 2008, now Pat. No. 8,302,033.

(60) Provisional application No. 61/019,295, filed on Jan. 6, 2008, provisional application No. 61/019,296, filed on Jan. 6, 2008, provisional application No. 60/937,993, filed on Jun. 29, 2007, provisional application No. 60/936,725, filed on Jun. 22, 2007.

(51) Int. Cl.
*G01C 21/36* (2006.01)
*G01C 21/20* (2006.01)
*G06F 3/0488* (2022.01)

(58) Field of Classification Search
CPC ...... G01C 21/367; G01C 21/36; G01C 21/34; G01C 21/3667; G06F 3/0487; G06F 3/048; G06F 3/0488; G06F 3/04883; G06F 3/0482; G06F 3/04842; G06F 3/04817; G06F 3/017; G06F 2203/04806; G06F 3/0485; G06F 3/04815; G06F 3/04886; G06F 16/29; G06F 3/0481; G06F 16/9537

See application file for complete search history.

(56) References Cited

U.S. PATENT DOCUMENTS

| | | | |
|---|---|---|---|
| 5,416,890 A | 5/1995 | Beretta | |
| 5,473,324 A * | 12/1995 | Ueno | G01C 21/3676 340/990 |
| 5,559,707 A | 9/1996 | Delorme et al. | |
| 5,594,469 A | 1/1997 | Freeman et al. | |
| 5,594,810 A | 1/1997 | Gourdol | |
| 5,608,635 A | 3/1997 | Tamai | |
| 5,638,523 A * | 6/1997 | Mullet | G06F 3/0481 715/781 |
| 5,714,698 A | 2/1998 | Tokioka et al. | |
| 5,760,767 A | 6/1998 | Shore et al. | |
| 5,760,773 A | 6/1998 | Berman et al. | |
| 5,802,492 A | 9/1998 | Delorme et al. | |
| 5,825,352 A | 10/1998 | Bisset et al. | |
| 5,825,357 A | 10/1998 | Malamud et al. | |
| 5,864,635 A | 1/1999 | Zetts et al. | |
| 5,867,150 A | 2/1999 | Bricklin et al. | |
| 5,877,751 A | 3/1999 | Kanemitsu et al. | |
| 6,002,808 A | 12/1999 | Freeman | |
| 6,009,462 A | 12/1999 | Birrell et al. | |
| 6,028,271 A | 2/2000 | Gillespie et al. | |
| 6,038,508 A | 3/2000 | Maekawa et al. | |
| 6,038,522 A | 3/2000 | Manson et al. | |
| 6,040,824 A | 3/2000 | Maekawa et al. | |
| 6,072,494 A | 6/2000 | Nguyen | |
| 6,115,025 A | 9/2000 | Buxton et al. | |
| 6,115,053 A | 9/2000 | Perlin | |
| 6,169,878 B1 * | 1/2001 | Tawil | H04N 7/20 725/63 |
| 6,199,015 B1 * | 3/2001 | Curtwright | G01C 21/20 340/990 |
| 6,201,544 B1 | 3/2001 | Ezaki | |
| 6,208,834 B1 * | 3/2001 | Tawil | H04H 40/90 455/3.02 |
| 6,229,525 B1 | 5/2001 | Alexander | |
| 6,321,158 B1 | 11/2001 | Delorme et al. | |
| 6,323,846 B1 | 11/2001 | Westerman et al. | |
| 6,336,072 B1 | 1/2002 | Takayama et al. | |
| 6,380,931 B1 | 4/2002 | Gillespie et al. | |
| 6,405,129 B1 | 6/2002 | Yokota | |
| 6,434,484 B1 | 8/2002 | Lee | |
| 6,496,695 B1 | 12/2002 | Kouji et al. | |
| 6,512,529 B1 | 1/2003 | Janssen et al. | |
| 6,570,557 B1 | 5/2003 | Westerman et al. | |
| 6,600,502 B1 | 7/2003 | Brewster, Jr. | |
| 6,667,751 B1 | 12/2003 | Wynn et al. | |
| 6,677,932 B1 | 1/2004 | Westerman | |
| 6,687,613 B2 | 2/2004 | Yokota | |
| 6,697,734 B1 * | 2/2004 | Suomela | G01C 21/3682 340/995.15 |
| 6,732,047 B1 * | 5/2004 | de Silva | G01C 21/3611 701/428 |
| 6,791,536 B2 | 9/2004 | Keely et al. | |
| 6,795,017 B1 | 9/2004 | Puranik et al. | |
| 6,806,830 B2 * | 10/2004 | Panasik | G01C 21/206 342/386 |
| 6,892,050 B1 * | 5/2005 | Tawil | H04B 7/18523 348/E7.093 |
| 6,894,678 B2 | 5/2005 | Rosenberg et al. | |
| 6,917,878 B2 | 7/2005 | Pechatnikov et al. | |
| 6,956,590 B1 * | 10/2005 | Barton | G09G 5/34 345/671 |
| 6,983,203 B1 | 1/2006 | Wako | |
| 7,030,861 B1 * | 4/2006 | Westerman | G06F 3/04883 345/173 |
| 7,032,187 B2 | 4/2006 | Keely et al. | |
| 7,046,230 B2 | 5/2006 | Zadesky et al. | |
| 7,047,113 B1 | 5/2006 | Burch et al. | |
| 7,142,978 B2 | 11/2006 | Nix et al. | |
| 7,239,301 B2 | 7/2007 | Liberty et al. | |
| 7,256,770 B2 | 8/2007 | Hinckley et al. | |
| 7,289,763 B2 * | 10/2007 | Dennison | H04B 7/18541 455/12.1 |
| 7,308,229 B2 * | 12/2007 | Hane | H04N 7/20 348/E7.093 |
| 7,310,534 B2 * | 12/2007 | Northcutt | H04M 1/72572 342/357.31 |
| 7,319,878 B2 * | 1/2008 | Sheynblat | G01S 5/0036 455/456.3 |
| 7,359,798 B2 * | 4/2008 | Nagamasa | G01C 21/36 707/999.005 |
| 7,366,609 B2 | 4/2008 | Lee | |
| 7,373,244 B2 | 5/2008 | Kreft | |
| 7,373,246 B2 * | 5/2008 | O'Clair | G06F 16/9537 701/532 |
| 7,376,640 B1 | 5/2008 | Anderson et al. | |
| 7,379,811 B2 | 5/2008 | Rasmussen et al. | |
| 7,388,519 B1 | 6/2008 | Kreft | |
| 7,433,694 B2 * | 10/2008 | Morgan | G01S 5/02 455/456.1 |
| 7,439,969 B2 | 10/2008 | Chithambaram et al. | |
| 7,457,704 B2 | 11/2008 | Yasuda et al. | |
| 7,472,354 B2 * | 12/2008 | Jetha | G06F 3/04883 715/781 |
| 7,479,949 B2 | 1/2009 | Jobs et al. | |
| 7,480,567 B2 * | 1/2009 | Suomela | G01C 21/3641 340/990 |
| 7,484,180 B2 | 1/2009 | Mccormack et al. | |
| 7,487,114 B2 | 2/2009 | Florance et al. | |
| 7,495,659 B2 | 2/2009 | Marriott et al. | |
| 7,499,040 B2 | 3/2009 | Zadesky et al. | |
| 7,580,363 B2 * | 8/2009 | Sorvari | H04M 1/72547 370/252 |
| 7,587,276 B2 * | 9/2009 | Gold | G01C 21/26 701/426 |
| 7,595,725 B1 | 9/2009 | Joseph et al. | |
| 7,603,230 B2 | 10/2009 | Suzuki et al. | |
| 7,614,008 B2 | 11/2009 | Ording | |
| 7,620,496 B2 | 11/2009 | Rasmussen | |
| 7,633,076 B2 | 12/2009 | Huppi et al. | |
| 7,640,100 B2 | 12/2009 | Spinelli | |
| 7,653,883 B2 | 1/2010 | Hotelling et al. | |
| 7,656,393 B2 | 2/2010 | King et al. | |
| 7,657,849 B2 | 2/2010 | Chaudhri et al. | |
| 7,663,607 B2 | 2/2010 | Hotelling et al. | |
| 7,676,767 B2 | 3/2010 | Hofmeister et al. | |
| 7,728,821 B2 | 6/2010 | Hillis et al. | |
| 7,768,395 B2 | 8/2010 | Gold | |
| 7,777,648 B2 | 8/2010 | Smith et al. | |
| 7,797,642 B1 | 9/2010 | Karam et al. | |
| 7,800,592 B2 | 9/2010 | Kerr et al. | |
| 7,808,479 B1 | 10/2010 | Hotelling et al. | |

(56) References Cited

U.S. PATENT DOCUMENTS

| | | | |
|---|---|---|---|
| 7,812,826 B2 | 10/2010 | Ording et al. | |
| 7,812,860 B2 | 10/2010 | King et al. | |
| 7,831,917 B1 | 11/2010 | Karam | |
| 7,840,350 B2 | 11/2010 | Spinelli | |
| 7,844,914 B2 | 11/2010 | Andre et al. | |
| 7,890,886 B2 | 2/2011 | Matthews et al. | |
| 7,891,103 B2 | 2/2011 | Mayor et al. | |
| 7,907,124 B2 | 3/2011 | Hillis et al. | |
| 7,912,634 B2 | 3/2011 | Reed et al. | |
| 7,917,866 B1* | 3/2011 | Karam | G01C 21/3682 715/764 |
| 7,933,895 B2 | 4/2011 | Amjadi | |
| 7,945,546 B2 | 5/2011 | Bliss et al. | |
| 7,957,762 B2 | 6/2011 | Herz et al. | |
| 8,006,002 B2 | 8/2011 | Kalayjian et al. | |
| 8,010,407 B1* | 8/2011 | Santoro | G06Q 30/0241 705/14.49 |
| 8,019,531 B2 | 9/2011 | Pinkus et al. | |
| 8,019,532 B2 | 9/2011 | Sheha et al. | |
| 8,060,389 B2 | 11/2011 | Johnson | |
| 8,060,499 B2 | 11/2011 | Mansikkaniemi | |
| 8,064,704 B2* | 11/2011 | Kim | G06F 3/04815 382/190 |
| 8,086,398 B2* | 12/2011 | Sanchez | G06F 3/04842 701/517 |
| 8,090,533 B2 | 1/2012 | Koike et al. | |
| 8,095,303 B1 | 1/2012 | Nesbitt et al. | |
| 8,108,137 B2 | 1/2012 | Kim | |
| 8,122,384 B2 | 2/2012 | Partridge et al. | |
| 8,164,599 B1 | 4/2012 | Kadous et al. | |
| 8,171,432 B2 | 5/2012 | Matas et al. | |
| 8,184,102 B2 | 5/2012 | Park et al. | |
| 8,205,157 B2 | 6/2012 | Van et al. | |
| 8,239,784 B2 | 8/2012 | Hotelling et al. | |
| 8,250,493 B2 | 8/2012 | Yang et al. | |
| 8,279,180 B2 | 10/2012 | Hotelling et al. | |
| 8,285,481 B2 | 10/2012 | De Silva et al. | |
| 8,302,033 B2 | 10/2012 | Matas et al. | |
| 8,332,144 B2 | 12/2012 | Diaz et al. | |
| 8,381,135 B2 | 2/2013 | Hotelling et al. | |
| 8,397,171 B2 | 3/2013 | Klassen et al. | |
| 8,397,177 B2* | 3/2013 | Barros | G06F 3/04847 715/810 |
| 8,456,297 B2 | 6/2013 | Van Os | |
| 8,464,182 B2 | 6/2013 | Blumenberg et al. | |
| 8,468,469 B1 | 6/2013 | Mendis et al. | |
| 8,473,193 B2 | 6/2013 | Neef et al. | |
| 8,479,122 B2 | 7/2013 | Hotelling et al. | |
| 8,489,641 B1 | 7/2013 | Seefeld et al. | |
| 8,532,678 B2 | 9/2013 | Geelen | |
| 8,537,119 B1 | 9/2013 | Sartore et al. | |
| 8,571,580 B2* | 10/2013 | Altman | H04L 51/32 455/456.3 |
| 8,573,479 B1 | 11/2013 | Jenkins et al. | |
| 8,607,167 B2 | 12/2013 | Matas et al. | |
| 8,761,797 B1 | 6/2014 | Norton | |
| 8,793,575 B1 | 7/2014 | Lattyak et al. | |
| 8,798,921 B2* | 8/2014 | Zink | G08G 1/09675 701/452 |
| 8,825,370 B2* | 9/2014 | Hu | G01C 21/3605 701/408 |
| 8,862,576 B2 | 10/2014 | Van Os | |
| 8,907,886 B2* | 12/2014 | Robbins | G06F 3/0485 345/173 |
| 8,938,263 B2* | 1/2015 | Niemenmaa | H04W 4/02 455/457 |
| 8,988,358 B2 | 3/2015 | Medler et al. | |
| 8,996,045 B2* | 3/2015 | Bowman | G01C 21/26 455/466 |
| 9,113,293 B1 | 8/2015 | Rayburn et al. | |
| 9,317,945 B2* | 4/2016 | Fraser | G06T 11/206 |
| 9,329,051 B1 | 5/2016 | Ichinokawa et al. | |
| 9,348,458 B2 | 5/2016 | Hotelling et al. | |
| 9,880,699 B2 | 1/2018 | Bliss et al. | |
| 9,933,937 B2 | 4/2018 | Lemay et al. | |
| 10,003,964 B1* | 6/2018 | Blintsov | H04L 63/0428 |
| 11,176,534 B1* | 11/2021 | Pandey | G06Q 20/322 |
| 2001/0020211 A1 | 9/2001 | Takayama et al. | |
| 2001/0035880 A1 | 11/2001 | Musatov et al. | |
| 2001/0045949 A1 | 11/2001 | Chithambaram et al. | |
| 2002/0015024 A1 | 2/2002 | Westerman et al. | |
| 2002/0015064 A1 | 2/2002 | Robotham et al. | |
| 2002/0042819 A1* | 4/2002 | Reichert | G09B 29/007 709/217 |
| 2002/0057263 A1 | 5/2002 | Keely et al. | |
| 2002/0087262 A1 | 7/2002 | Bullock et al. | |
| 2002/0160708 A1* | 10/2002 | Hane | H04N 7/20 455/3.06 |
| 2002/0163547 A1 | 11/2002 | Abramson et al. | |
| 2002/0183924 A1 | 12/2002 | Yokota | |
| 2003/0018427 A1* | 1/2003 | Yokota | G01C 21/367 701/455 |
| 2003/0023370 A1 | 1/2003 | Spencer et al. | |
| 2003/0054830 A1 | 3/2003 | Williams et al. | |
| 2003/0095112 A1 | 5/2003 | Kawano et al. | |
| 2003/0120423 A1* | 6/2003 | Cochlovius | G01C 21/3614 340/990 |
| 2003/0122711 A1* | 7/2003 | Panasik | G01S 5/0226 342/387 |
| 2003/0177265 A1 | 9/2003 | Page et al. | |
| 2003/0201914 A1* | 10/2003 | Fujiwara | G08G 1/0969 340/995.24 |
| 2003/0229441 A1 | 12/2003 | Pechatnikov et al. | |
| 2003/0231190 A1 | 12/2003 | Jawerth et al. | |
| 2004/0027395 A1* | 2/2004 | Lection | G06F 3/0481 715/855 |
| 2004/0030493 A1 | 2/2004 | Pechatnikov et al. | |
| 2004/0107043 A1* | 6/2004 | de Silva | G01C 21/367 340/990 |
| 2004/0107046 A1* | 6/2004 | Zink | G08G 1/09675 701/408 |
| 2004/0162669 A1* | 8/2004 | Nagamasa | G01C 21/36 701/455 |
| 2004/0243306 A1 | 12/2004 | Han | |
| 2004/0243307 A1* | 12/2004 | Geelen | G01S 19/24 701/469 |
| 2004/0257340 A1* | 12/2004 | Jawerth | G01C 21/367 345/157 |
| 2004/0260465 A1 | 12/2004 | Tu | |
| 2005/0032527 A1 | 2/2005 | Sheha et al. | |
| 2005/0041044 A1* | 2/2005 | Gannon | G01C 23/00 345/660 |
| 2005/0052462 A1* | 3/2005 | Sakamoto | G01C 21/3694 345/473 |
| 2005/0055662 A1 | 3/2005 | Strausbaugh et al. | |
| 2005/0075114 A1* | 4/2005 | Dennison | H04W 4/90 455/456.1 |
| 2005/0114021 A1 | 5/2005 | Krull et al. | |
| 2005/0125144 A1 | 6/2005 | Nakagawa | |
| 2005/0130680 A1* | 6/2005 | Northcutt | H04M 1/72572 455/457 |
| 2005/0147442 A1 | 7/2005 | Walker et al. | |
| 2005/0190059 A1 | 9/2005 | Wehrenberg | |
| 2005/0197843 A1* | 9/2005 | Faisman | G10L 15/24 704/276 |
| 2005/0203768 A1 | 9/2005 | Florance et al. | |
| 2005/0239478 A1 | 10/2005 | Spirito | |
| 2005/0251331 A1 | 11/2005 | Kreft | |
| 2005/0253806 A1 | 11/2005 | Liberty et al. | |
| 2005/0270311 A1* | 12/2005 | Rasmussen | G06T 11/40 345/677 |
| 2006/0004304 A1 | 1/2006 | Parks | |
| 2006/0009235 A1* | 1/2006 | Sheynblat | G01S 19/48 455/456.1 |
| 2006/0017692 A1 | 1/2006 | Wehrenberg et al. | |
| 2006/0022048 A1 | 2/2006 | Johnson | |
| 2006/0026521 A1 | 2/2006 | Hotelling et al. | |
| 2006/0026535 A1 | 2/2006 | Hotelling et al. | |
| 2006/0026536 A1 | 2/2006 | Hotelling et al. | |
| 2006/0033724 A1 | 2/2006 | Chaudhri et al. | |

(56) References Cited

U.S. PATENT DOCUMENTS

| | | |
|---|---|---|
| 2006/0035632 A1* | 2/2006 | Sorvari ............ H04M 1/72547 455/418 |
| 2006/0047416 A1 | 3/2006 | Goldberg et al. |
| 2006/0047423 A1* | 3/2006 | Min ........................ G01C 21/30 701/533 |
| 2006/0058949 A1 | 3/2006 | Fogel et al. |
| 2006/0068808 A1 | 3/2006 | Karavias |
| 2006/0069503 A1* | 3/2006 | Suomela ............ H04M 1/72572 701/431 |
| 2006/0085767 A1 | 4/2006 | Hinckley et al. |
| 2006/0106850 A1* | 5/2006 | Morgan ................ H04W 48/16 |
| 2006/0109145 A1 | 5/2006 | Chen |
| 2006/0112350 A1* | 5/2006 | Kato ................... G06F 3/04845 715/781 |
| 2006/0132455 A1 | 6/2006 | Rimas-ribikauskas et al. |
| 2006/0143574 A1 | 6/2006 | Ito et al. |
| 2006/0181517 A1 | 8/2006 | Zadesky et al. |
| 2006/0192078 A1 | 8/2006 | Yang et al. |
| 2006/0197753 A1 | 9/2006 | Hotelling |
| 2006/0200305 A1 | 9/2006 | Sheha et al. |
| 2006/0200490 A1* | 9/2006 | Abbiss ................ G06F 16/9537 707/999.102 |
| 2006/0224311 A1 | 10/2006 | Watanabe et al. |
| 2006/0229802 A1 | 10/2006 | Vertelney et al. |
| 2006/0239248 A1 | 10/2006 | Hawk et al. |
| 2006/0242607 A1 | 10/2006 | Hudson |
| 2006/0247855 A1* | 11/2006 | de Silva ................ G01C 21/36 701/454 |
| 2006/0267958 A1 | 11/2006 | Kolmykov-zotov et al. |
| 2006/0271277 A1* | 11/2006 | Hu ........................ G01C 21/343 701/533 |
| 2006/0271280 A1* | 11/2006 | O'Clair ............... G06F 16/9537 701/455 |
| 2006/0271287 A1* | 11/2006 | Gold ................... G01C 21/3673 701/426 |
| 2006/0284825 A1 | 12/2006 | Teranishi |
| 2006/0284852 A1 | 12/2006 | Hofmeister et al. |
| 2006/0284858 A1* | 12/2006 | Rekimoto ............. G06F 3/0488 345/173 |
| 2007/0011150 A1 | 1/2007 | Frank |
| 2007/0033089 A1 | 2/2007 | Dharmarajan et al. |
| 2007/0037558 A1 | 2/2007 | Yu et al. |
| 2007/0046643 A1 | 3/2007 | Hillis et al. |
| 2007/0050129 A1* | 3/2007 | Salmre ................. G01C 21/367 701/408 |
| 2007/0061126 A1 | 3/2007 | Russo et al. |
| 2007/0064018 A1* | 3/2007 | Shoemaker ............ G09B 29/10 345/660 |
| 2007/0080958 A1 | 4/2007 | Chithambaram et al. |
| 2007/0083324 A1 | 4/2007 | Suzuki et al. |
| 2007/0083329 A1 | 4/2007 | Im |
| 2007/0083819 A1* | 4/2007 | Shoemaker ........... G06T 3/0018 715/767 |
| 2007/0088897 A1 | 4/2007 | Fernandez et al. |
| 2007/0112729 A1 | 5/2007 | Wiseman et al. |
| 2007/0118520 A1 | 5/2007 | Bliss et al. |
| 2007/0124062 A1* | 5/2007 | Janky ................... G01S 5/0027 701/468 |
| 2007/0130153 A1 | 6/2007 | Nachman ........... H04M 1/72427 |
| 2007/0143264 A1 | 6/2007 | Szeto |
| 2007/0152984 A1* | 7/2007 | Ording ................ G06F 3/04883 345/173 |
| 2007/0168888 A1* | 7/2007 | Jawerth ................... G06F 3/038 715/857 |
| 2007/0176796 A1 | 8/2007 | Bliss et al. |
| 2007/0189737 A1 | 8/2007 | Chaudhri et al. |
| 2007/0211151 A1* | 9/2007 | Baiping ................. G06F 16/50 348/231.2 |
| 2007/0225904 A1* | 9/2007 | Pantalone ............. G01C 21/367 701/455 |
| 2007/0233695 A1 | 10/2007 | Boudreau et al. |
| 2007/0236477 A1 | 10/2007 | Ryu et al. |
| 2007/0252821 A1* | 11/2007 | Hollemans ............ G06F 3/0444 345/173 |
| 2007/0256026 A1 | 11/2007 | Klassen et al. |
| 2007/0257891 A1 | 11/2007 | Esenther et al. |
| 2007/0262860 A1 | 11/2007 | Salinas et al. |
| 2007/0271255 A1 | 11/2007 | Pappo |
| 2007/0273664 A1 | 11/2007 | Kim et al. |
| 2007/0281689 A1* | 12/2007 | Altman ............... G06Q 30/0259 455/435.1 |
| 2007/0281690 A1 | 12/2007 | Altman et al. |
| 2007/0282621 A1 | 12/2007 | Altman et al. |
| 2007/0288480 A1 | 12/2007 | Caplan et al. |
| 2008/0030460 A1 | 2/2008 | Hildreth et al. |
| 2008/0036743 A1 | 2/2008 | Westerman et al. |
| 2008/0040315 A1 | 2/2008 | Auerbach et al. |
| 2008/0040678 A1 | 2/2008 | Crump |
| 2008/0052638 A1* | 2/2008 | Frank ................... G06K 9/00476 715/808 |
| 2008/0055257 A1* | 3/2008 | Peng .................... G01C 21/3664 345/173 |
| 2008/0055263 A1 | 3/2008 | Lemay et al. |
| 2008/0055269 A1 | 3/2008 | Lemay et al. |
| 2008/0059452 A1* | 3/2008 | Frank ................... G06F 16/954 |
| 2008/0072139 A1 | 3/2008 | Salinas et al. |
| 2008/0082262 A1 | 4/2008 | Silva et al. |
| 2008/0086356 A1 | 4/2008 | Glassman et al. |
| 2008/0088602 A1 | 4/2008 | Hotelling |
| 2008/0089587 A1* | 4/2008 | Kim .................... G06F 3/04815 382/190 |
| 2008/0091689 A1 | 4/2008 | Mansikkaniemi |
| 2008/0122796 A1 | 5/2008 | Jobs et al. |
| 2008/0132243 A1* | 6/2008 | Spalink ............... H04M 1/72457 455/456.1 |
| 2008/0147311 A1* | 6/2008 | Zoller .................. G09B 29/007 701/533 |
| 2008/0147730 A1 | 6/2008 | Lee et al. |
| 2008/0148177 A1* | 6/2008 | Lang ..................... G06F 3/0481 715/788 |
| 2008/0148321 A1* | 6/2008 | Hane ........................ H04N 7/20 725/71 |
| 2008/0154774 A1 | 6/2008 | Dennison et al. |
| 2008/0158249 A1* | 7/2008 | Jarczyk ................. G06F 3/0481 345/619 |
| 2008/0163130 A1* | 7/2008 | Westerman ......... G06F 3/04883 715/863 |
| 2008/0165144 A1 | 7/2008 | Forstall et al. |
| 2008/0165153 A1 | 7/2008 | Platzer et al. |
| 2008/0167809 A1 | 7/2008 | Geelen |
| 2008/0168396 A1 | 7/2008 | Matas et al. |
| 2008/0168398 A1 | 7/2008 | Geelen et al. |
| 2008/0172357 A1 | 7/2008 | Rechis et al. |
| 2008/0182598 A1* | 7/2008 | Bowman ................. G01C 21/26 455/466 |
| 2008/0208447 A1 | 8/2008 | Geelen et al. |
| 2008/0208456 A1 | 8/2008 | Jouline et al. |
| 2008/0209332 A1 | 8/2008 | Chevsky et al. |
| 2008/0228386 A1* | 9/2008 | Geelen .................. G01C 21/20 701/533 |
| 2008/0228393 A1* | 9/2008 | Geelen ............... G01C 21/3638 701/532 |
| 2008/0268876 A1 | 10/2008 | Gelfand et al. |
| 2008/0307661 A1* | 12/2008 | Hembree ............. G09B 29/001 701/469 |
| 2008/0320391 A1 | 12/2008 | Lemay et al. |
| 2008/0320419 A1 | 12/2008 | Matas et al. |
| 2009/0006543 A1 | 1/2009 | Smit |
| 2009/0012866 A1* | 1/2009 | Celik ................... G06Q 30/0277 705/14.48 |
| 2009/0024590 A1 | 1/2009 | Sturge et al. |
| 2009/0037101 A1 | 2/2009 | Koike et al. |
| 2009/0058820 A1 | 3/2009 | Hinckley |
| 2009/0064055 A1 | 3/2009 | Chaudhri et al. |
| 2009/0090567 A1 | 4/2009 | Tonouchi |
| 2009/0112457 A1* | 4/2009 | Sanchez ............... G06F 3/04842 701/533 |
| 2009/0132395 A1 | 5/2009 | Lam et al. |
| 2009/0172599 A1 | 7/2009 | Nezu |
| 2009/0177385 A1 | 7/2009 | Matas et al. |

(56) References Cited

U.S. PATENT DOCUMENTS

| | | |
|---|---|---|
| 2009/0178007 A1 | 7/2009 | Matas et al. |
| 2009/0244023 A1 | 10/2009 | Kim et al. |
| 2009/0271745 A1 | 10/2009 | Sakamoto et al. |
| 2009/0281724 A1 | 11/2009 | Blumenberg et al. |
| 2009/0289815 A1 | 11/2009 | Reed et al. |
| 2009/0295753 A1 | 12/2009 | King et al. |
| 2009/0299620 A1 | 12/2009 | Shin et al. |
| 2010/0002016 A1* | 1/2010 | Kim ............... G06F 3/0488 345/173 |
| 2010/0005061 A1 | 1/2010 | Basco et al. |
| 2010/0023255 A1* | 1/2010 | Nambata ......... G01C 21/3635 701/533 |
| 2010/0031186 A1 | 2/2010 | Tseng et al. |
| 2010/0057712 A1 | 3/2010 | Ranganathan |
| 2010/0094548 A1 | 4/2010 | Tadman et al. |
| 2010/0107099 A1 | 4/2010 | Frazier et al. |
| 2010/0114916 A1 | 5/2010 | Cooke |
| 2010/0121917 A1 | 5/2010 | Chevsky et al. |
| 2010/0225607 A1 | 9/2010 | Kim |
| 2010/0293186 A1 | 11/2010 | Nambata et al. |
| 2010/0309149 A1 | 12/2010 | Blumenberg et al. |
| 2010/0312462 A1 | 12/2010 | Gueziec et al. |
| 2011/0041084 A1 | 2/2011 | Karam |
| 2011/0045868 A1 | 2/2011 | Sheha et al. |
| 2011/0112754 A1 | 5/2011 | Reed et al. |
| 2011/0112755 A1 | 5/2011 | Reed et al. |
| 2011/0137813 A1* | 6/2011 | Stewart ............ H04W 64/003 705/319 |
| 2011/0163874 A1 | 7/2011 | Van Os |
| 2011/0164058 A1 | 7/2011 | Lemay |
| 2011/0184638 A1 | 7/2011 | Jouline et al. |
| 2011/0276591 A1 | 11/2011 | Bliss et al. |
| 2011/0289104 A1 | 11/2011 | Watt |
| 2012/0011137 A1 | 1/2012 | Sheha et al. |
| 2012/0011449 A1* | 1/2012 | Sasson ............ G06Q 30/0251 715/752 |
| 2012/0030308 A1 | 2/2012 | Jeffe et al. |
| 2012/0109509 A1 | 5/2012 | Nesbitt et al. |
| 2012/0197975 A1* | 8/2012 | Samson ............... H04L 51/14 709/203 |
| 2012/0221978 A1 | 8/2012 | Matas et al. |
| 2012/0262482 A1 | 10/2012 | Miwa |
| 2012/0287218 A1 | 11/2012 | Ok |
| 2012/0311478 A1 | 12/2012 | Van Os et al. |
| 2013/0055163 A1 | 2/2013 | Matas et al. |
| 2013/0080923 A1 | 3/2013 | Anzures et al. |
| 2013/0097173 A1 | 4/2013 | Stovicek et al. |
| 2013/0113739 A1* | 5/2013 | Lee ..................... G06Q 10/10 345/173 |
| 2013/0131973 A1 | 5/2013 | Friedler et al. |
| 2013/0321402 A1* | 12/2013 | Moore .............. G01C 21/367 345/419 |
| 2013/0325319 A1* | 12/2013 | Moore ............ G01C 21/3614 701/412 |
| 2013/0326380 A1* | 12/2013 | Lai ...................... G01C 21/32 715/765 |
| 2013/0326384 A1* | 12/2013 | Moore ............ G01C 21/3673 715/771 |
| 2013/0326407 A1* | 12/2013 | van Os ............... G06F 3/0482 715/810 |
| 2013/0326425 A1* | 12/2013 | Forstall ................ G06T 17/05 715/851 |
| 2014/0095073 A1 | 4/2014 | Matas et al. |
| 2014/0155096 A1* | 6/2014 | Niemenmaa .......... H04W 4/02 455/456.3 |
| 2014/0164921 A1 | 6/2014 | Salinas |
| 2014/0278067 A1 | 9/2014 | Gordon et al. |
| 2014/0365901 A1 | 12/2014 | Moha et al. |
| 2014/0365935 A1 | 12/2014 | Moha et al. |
| 2015/0032735 A1 | 1/2015 | Van Os |
| 2015/0081215 A1* | 3/2015 | Di Bernardo ......... G06T 3/4038 701/532 |
| 2015/0156073 A1 | 6/2015 | Bailiang et al. |
| 2015/0301795 A1* | 10/2015 | Lebrun ................ G10L 15/18 704/9 |
| 2016/0234635 A1 | 8/2016 | Chen et al. |
| 2016/0290818 A1 | 10/2016 | Kim et al. |
| 2017/0059340 A1 | 3/2017 | Kim et al. |
| 2019/0072390 A1* | 3/2019 | Wang ................ G06T 19/006 |
| 2020/0314234 A1* | 10/2020 | Matas ................ G06F 3/0488 |
| 2021/0360372 A1 | 11/2021 | Uzum Vella et al. |

FOREIGN PATENT DOCUMENTS

| | | |
|---|---|---|
| CN | 101033981 A | 9/2007 |
| CN | 101097152 A | 1/2008 |
| CN | 101270998 A | 9/2008 |
| CN | 101430697 A | 5/2009 |
| DE | 102005047648 A1 | 4/2007 |
| DE | 102008008948 A1 | 8/2009 |
| EP | 0908835 A2 | 4/1999 |
| EP | 1653376 A2 | 5/2006 |
| EP | 1840511 A1 | 10/2007 |
| EP | 2077436 A1 | 7/2009 |
| JP | 6-341849 A | 12/1994 |
| JP | H09-113295 A | 5/1997 |
| TW | 200942784 A | 10/2009 |
| WO | 1997/007467 A1 | 2/1997 |
| WO | 1998/007112 A2 | 2/1998 |
| WO | 2003/017120 A1 | 2/2003 |
| WO | 2004/076977 A1 | 9/2004 |
| WO | 2005/104039 A2 | 11/2005 |
| WO | 2007/131225 A2 | 11/2007 |
| WO | 2008/081521 A1 | 7/2008 |
| WO | 2009/002942 A2 | 12/2008 |
| WO | 2013/169849 A2 | 11/2013 |
| WO | 2014/105276 A1 | 7/2014 |

OTHER PUBLICATIONS

Advisory Action received for U.S. Appl. No. 13/662,370, dated Mar. 19, 2018, 2 pages.

Advisory Action received for U.S. Appl. No. 14/513,050, dated Jul. 9, 2018, 4 pages.

Advisory Action received for U.S. Appl. No. 14/513,050, dated Nov. 3, 2016, 3 pages.

Decision to Grant received for European Patent Application No. 10700013.5, dated Mar. 24, 2016, 2 pages.

Decision to Grant received for European Patent Application No. 12187505.8, dated Feb. 13, 2014, 2 pages.

European Search Report received for European Patent Application No. 12187505.8, dated Jan. 14, 2013, 3 pages.

Final Office Action received for U.S. Appl. No. 11/969,211, dated Aug. 17, 2011, 24 pages.

Final Office Action received for U.S. Appl. No. 12/143,752, dated Dec. 23, 2011, 17 pages.

Final Office Action received for U.S. Appl. No. 12/788,281, dated May 10, 2013, 12 pages.

Final Office Action received for U.S. Appl. No. 13/662,370, dated Apr. 14, 2016, 29 pages.

Final Office Action received for U.S. Appl. No. 13/662,370, dated Jul. 18, 2019, 27 pages.

Final Office Action received for U.S. Appl. No. 13/662,370, dated Nov. 17, 2017, 32 pages.

Final Office Action received for U.S. Appl. No. 14/101,205, dated Sep. 18, 2017, 19 pages.

Final Office Action received for U.S. Appl. No. 14/513,050, dated Apr. 5, 2016, 10 pages.

Final Office Action received for U.S. Appl. No. 14/513,050, dated Apr. 5, 2018, 16 pages.

Intention to Grant received for European Patent Application No. 10700013.5, dated Nov. 3, 2015, 5 pages.

Intention to Grant received for European Patent Application No. 12187505.8, dated Aug. 19, 2013, 7 pages.

International Preliminary Report on Patentability received for PCT Patent Application No. PCT/US2008/050295, dated Jul. 7, 2009, 12 pages.

(56) References Cited

OTHER PUBLICATIONS

International Preliminary Report on Patentability received for PCT Patent Application No. PCT/US2008/067925, dated Dec. 22, 2019, 13 pages.
International Preliminary Report on Patentability received for PCT Patent Application No. PCT/US2010020229, dated Jul. 19, 2012, 13 pages.
International Search Report and Written Opinion received for PCT Patent Application No. PCT/US2008/050295, dated Jan. 14, 2009.
International Search Report and Written Opinion received for PCT Patent Application No. PCT/US2008/067925, dated Dec. 17, 2008.
International Search Report and Written Opinion received for PCT Patent Application No. PCT/US2010020229, dated Apr. 12, 2012, corresponds to U.S. Appl. No. 12/788,281, 18 pages.
Invitation to Pay Addition Fees and Partial International Search Report received for PCT Patent Application No. PCT/US2008/067925, dated Oct. 13, 2008.
Invitation to Pay Additional Fees and Partial International Search Report received for PCT Patent Application No. PCT/US2008/050295, dated Jul. 29, 2008.
iPhone iOS3.1 user guide, Nov. 9, 2009, 172 pages (Official copy only).
Non-Final Office Action received for U.S. Appl. No. 14/101,205, dated Jan. 5, 2017, 17 pages.
Non-Final Office Action received for U.S. Appl. No. 11/969,211, dated Sep. 20, 2012, 27 pages.
Non-Final Office Action received for U.S. Appl. No. 12/143,752, dated May 17, 2011, 37 pages.
Non-Final Office Action received for U.S. Appl. No. 12/566,668, dated Jun. 18, 2012, 35 pages.
Non-Final Office Action received for U.S. Appl. No. 12/788,281, dated Feb. 17, 2012, 14 pages.
Non-Final Office Action received for U.S. Appl. No. 12/788,281, dated Oct. 15, 2013, 13 pages.
Non-Final Office Action received for U.S. Appl. No. 12/788,281, dated Sep. 26, 2012, 12 pages.
Non-Final Office Action received for U.S. Appl. No. 13/662,370, dated Dec. 10, 2014, 32 pages.
Non-Final Office Action received for U.S. Appl. No. 13/662,370, dated Jan. 25, 2019, 26 pages.
Non-Final Office Action received for U.S. Appl. No. 13/662,370, dated Mar. 13, 2017, 33 pages.
Non-Final Office Action received for U.S. Appl. No. 13/662,370, dated Mar. 25, 2014, 35 pages.
Non-Final Office Action received for U.S. Appl. No. 13/662,370, dated Sep. 2, 2015, 37 pages.
Non-Final Office Action received for U.S. Appl. No. 14/101,205, dated Jan. 8, 2019, 45 pages.
Non-Final Office Action received for U.S. Appl. No. 14/513,050, dated Aug. 26, 2015, 12 pages.
Non-Final Office Action received for U.S. Appl. No. 14/513,050, dated Oct. 13, 2017, 11 pages.
Notice of Allowance received for Australian Patent Application No. 2014202094, dated Apr. 19, 2016, 2 pages.
Notice of Allowance received for Chinese Patent Application No. 201510664750.3, dated Nov. 5, 2018, 2 pages (1 page of English Translation and 1 page of Official Copy).
Notice of Allowance received for Korean Patent Application No. 10-2012-7020652, dated Sep. 16, 2015, 3 pages (1 page of English Translation and 2 Pages of Official Copy).
Notice of Allowance received for Korean Patent Application No. 10-2012-7022248, dated Apr. 29, 2015, 2 pages (Official copy only).
Notice of Allowance received for Korean Patent Application No. 10-2015-7035252, dated Mar. 2, 2016, 3 pages (1 page English Translation and 2 pages of Official Copy).
Notice of Allowance received for Korean Patent Application No. 10-2016-014723, dated Oct. 4, 2016, 3 pages (1 page of English Translation and 2 pages of Official Copy).
Notice of Allowance received for U.S. Appl. No. 11/969,211, dated May 15, 2013, 25 pages.
Notice of Allowance received for U.S. Appl. No. 12/143,741, dated Dec. 30, 2011, 5 pages.
Notice of Allowance received for U.S. Appl. No. 12/143,741, dated Jul. 12, 2011, 5 pages.
Notice of Allowance received for U.S. Appl. No. 12/143,752, dated Sep. 17, 2012, 11 pages.
Notice of Allowance received for U.S. Appl. No. 12/566,668, dated Feb. 7, 2013, 9 pages.
Notice of Allowance received for U.S. Appl. No. 12/566,668, dated Oct. 23, 2012, 10 pages.
Notice of Allowance received for U.S. Appl. No. 12/788,281, dated Jun. 4, 2014, 9 pages.
Notice of Allowance received for U.S. Appl. No. 12/789,440, dated Apr. 23, 2013, 2 pages.
Notice of Allowance received for U.S. Appl. No. 12/789,440, dated Jan. 14, 2013, 7 pages.
Notice of Allowance received for U.S. Appl. No. 12/789,440, dated Jun. 26, 2012, 9 pages.
Notice of Allowance received for U.S. Appl. No. 13/662,370, dated Feb. 14, 2020, 20 pages.
Notice of Allowance received for U.S. Appl. No. 13/666,944, dated Aug. 18, 2015, 5 pages.
Notice of Allowance received for U.S. Appl. No. 13/666,944, dated Jul. 31, 2015, 2 pages.
Notice of Allowance received for U.S. Appl. No. 13/666,944, dated Sep. 17, 2015, 2 pages.
Notice of Allowance received for U.S. Appl. No. 14/513,050, dated Sep. 5, 2018, 10 pages.
Notice of Grant received for Chinese Patent Application No. 201080001767.6, dated Jul. 20, 2015, 6 pages (2 pages English Translation and 4 pages of Official Copy only).
Office Action received for Australian Patent Application No. 2010340369, dated Apr. 15, 2013, 5 pages.
Office Action received for Australian Patent Application No. 2014202094, dated Apr. 21, 2015, 3 pages.
Office Action received for Chinese Patent Application No. 201080001767.6, dated Sep. 16, 2014, 11 pages.
Office Action received for Chinese Patent Application No. 201510664750.3, dated Aug. 1, 2018, 7 pages (4 pages of English Translation and 3 pages of Official Copy).
Office Action received for Chinese Patent Application No. 201510664750.3, dated Nov. 30, 2017, 13 pages (6 pages of English Translation and 7 pages of Official Copy).
Office Action received for European Patent Application No. 12187505.8, dated Feb. 12, 2013, 5 pages.
Office Action received for Korean Patent Application No. 10-2012-7020652, dated Aug. 4, 2014, 5 pages (2 pages of English Translation and 3 pages of Official copy).
Office Action received for Korean Patent Application No. 10-2012-7020652, dated Sep. 24, 2013, 7 pages (3 pages of English Translation and 4 pages of Official copy).
Office Action received for Korean Patent Application No. 10-2012-7022248, dated Jun. 12, 2014, 7 pages (3 pages of English Translation and 4 pages of Official Copy).
Office Action received for Korean Patent Application No. 10-2012-7022253, dated Apr. 29, 2015, 4 pages (Official copy only).
Office Action received for Korean Patent Application No. 10-2012-7022253, dated Aug. 24, 2015, 7 pages (3 pages of English Translation and 4 pages of Official Copy).
Office Action received for Korean Patent Application No. 10-2012-7022253, dated Jun. 12, 2014, 8 pages (4 pages of English Translation and 4 pages of Official Copy).
Non-Final Office Action received for U.S. Appl. No. 11/969,211, dated Feb. 25, 2011, 21 pages.
Non-Final Office Action received for U.S. Appl. No. 12/143,741, dated Jan. 25, 2011, 18 pages.
Windows Moblile 6 Professional Video Tour, Available online at: <http://gizmodo.com/gadges/cellphones/windowsmobile-6-professional-video-tour-237039.php>, Mar. 11, 2007, 4 pages.
apple.com, "Maps with GPS", Apple.com, Availaible online at: <https://www.apple.com/iphone/features/maps.html>, May 2009, 2 pages.

(56) References Cited

OTHER PUBLICATIONS

AV Bros, "AV Bros. Page Curl 2.0 for Windows and Mac OS X", AV Bros. Curl 2.0 User Guide, Available online at: <http://c0002649.cdn2.cloudfiles.racksoacecloud.com/avoaaecurl20.pdf>, 2004, 26 pages.
Carew S, "Phones that tell you where to Drive, Meet, Eat", May 26, 2007, 2 pages.
Daimlercrysler, "Usecases Overview Map", 1 page.
Dalrymple J, "Google Maps Adds Locator, but not for iPhone", Available online at: <http://news.yahoo.com/s/macworld/20071130/tc_macworld/googlemaps200711300&printer=1; ylt+Auvt3s6LQKp)aitb954TDQni6gB>, 2007, 1 page.
Designing Interfaces, "Animated Transition", Available online at: <http://designinginterfaces.com/Animated_Transition>, Accessed on Sep. 4, 2014, 2 pages.
Dornfest, "Google Hacks", Third Edition, O'Reilly Media, Inc, Aug. 3, 2006, 5 pages.
Flipping Book, "Premium Page Flipping", Flipping Book.com, Available online at: <http://web.archive.orn/web/20041207072330/httn://www.oa!!e-:flio.com>, Nov. 12, 2009, 1 page.
Google, "Google Maps in Search History", Available online at: <http://googlesystem.blogsot.com/2006/11/google-maps-in-search-history.html>, Apr. 2005, 1 page.
Google, "Google Maps Shows Real-Time Traffic Data", Google Operating System, Available online at:<http://googlesytstem.blogsot.com/2007/02/google-maps-shows-real-time-traffic>, Feb. 28, 2007, 1 page.
Google, "Review Guide-Google Maps for Mobile (Beta)", 2006, 7 pages.
Gralla, "Google Search and Tools in a Snap", Sams, Apr. 4, 2006, 15 pages.
Holthe et al., "Vidoe Browsing Techniques for WebInterfaces", Available online at: <http://ieeexplore.ieee.org/Xplore/login.jsp?url=http%3A%2F%Fieeexplore.ieee.org%2Fstamp.jso%Farnumber%3D01593233&authDecision=-203>, 2005, 5 pages.
Iphone Hacks, "iPhone Software/Hardware Hack: LocoGPS—GPS Add-on for the iPhone", Available online at: <http://www.iphonehacks.com/iphone applications/index.html>, Dec. 25, 2007, 41 pages.
Kim, "Video-In Magnetometers Could Introduce Interesting iPhone App Possibilities", Mac Rumours, Availaible online at: <http://www.macrumours.com/2009/04/08/video-in-and-magnetometers-could-introduce-interesting-iphone-app-possibilities/>, Apr. 8, 2009, 5 pages.
Microsoft, "Windows Mobile Fact Sheet", Available online at: <http://www.WindowsMobile.com>, 2007, 2 pages.
Mio, "27 Countries in Your Pocket", Mio Technology, Available online at: <http://www.miotech.be/en/printview/press-releases-2005-09-29.htm>, Sep. 2005.
Mio, "Mio 269+ User's Manual", Mio Technology, Available online at: <http://www.miotech.be/Manuals/269+/Device-Manual/268-olus-269-olus-Device-Manual>, Aug. 2005.
Mio ,"MioMap 269", User's Manual, Aug. 2005, 44 pages.
Mio, "User's Manual MioMap 2.0", Mio Technology, Available online at: <http://web.archive.orgLweb/200612 | 40000736/http://www.miotech.be/Manuals/269+/MioMan V2-Manual/268+ 269+ miomap Manual>, Aug. 2005.
Navigation software for Mio DigiWalker C310, US English version, last accessed on: <http://www.gpspassion.com/upload/MioMap_englishUS.pdf>, Aug. 2006.

Mol H, "Plan Your Trip With Google Maps", Visual Steps, Available on internet at: <http://www.visualsteps.com/downloads/Free guide google maps. pdf>, Dec. 2009, 36 pages.
Navizon, "FAQ, Peer-to Peer Wireless Positioning", Available online at: <http://www.navizon.com/F AQ.htm>, Nov. 30, 2007, 8 pages.
Navizon, "How it Works", Available online at: <http://www.navizon.com/FullFeatures.htm>, Nov. 30, 2007, 7 pages.
Navizon, "The First Positioning System that Combines GPS, WiFi and Phone Positioning", Available online at: <http://www.navizon.com>, Nov. 30, 2007, 2 pages.
Pixlewit, "PageFlip", Available online at: <http://web.archive.org/web/20070419035158/http://www.oixelwit.com/blog/page-flip/>, Apr. 11, 2007, 1 page.
The Boy Genius, "Magnetometer in next iPhone confirmed?", The Boy Genius Report, Availaible online at: <http://www.boygeniusreport.com/2009/05/07/magnetometer-in-next-iphone-confirmed/>, May 7, 2009, 15 pages.
Tidwell J, "Designing interfaces", O'Relly media Inc., 2006, 348 pages.
Tidwell Jenifer, "Animated Transition", Designing Interfaces, Patterns for effective Interaction Design, First Edition, O'Reilly Media, Inc., Nov. 2005, 4 Pages.
Waypoints Maplist View, "Featured Projects", Available online at: <http://eric.wahlforss.com/folio>, Jun. 14, 2007, 3 pages.
Westerman W, "Hand Tracking Finger Identification and Chordic Manipulation on a Multi Touch Surface", Doctoral Dissertation, 1999, 363 pages.
Fact Sheet, Available online at: <www.WindowsMobile.com>, 2007, 2 pages.
Windows Moblile Map Contact List, "Windows Live Search for Mobile Goes Final, Still Great", Available online at: <http://gizmodo.com/gadgets/software/windows-live-search-for-mobile-goes-final-still-great-236002.php>, Mar. 11, 2007.
Youtube, "G-Map for iPhone Demo: 3-Way Map Mode", At 1:03/1:34 Heading-up Mode, 1:34 video uploaded to YouTube by navi0808, Availaible online at: <http://www.youtube.com/watch?v=QQUsXdlXarl&feature=related>, Feb. 13, 2009, 2 pages.
Youtube, "G-Map for iPhone: About menus and basic functions", At 1:37/5:49 Heading Up Map View Mode, 5:49 video uploaded to YouTube by navi0808, Available online at: <http://www.youtube.com/watch?v=tN8uWrMOQ>, Feb. 24, 2009, 1 page.
Youtube, "G-Map for iPhone: About menus and book functions", At 1:45/5:49 North-up Map View Mode, 5:49 video uploaded to YouTube by navi0808, Available online at: <http://www.youtube.com/watch?v=tN8uW_rMOQ>, 1 page.
Youtube, "G-Map U.S. iPhone Review", 6:29 video uploaded to YouTube by TapCritic, Available online at: <http://www.youtube.com/watch?v=xrWUKwXQwlQ&feature=related>, Mar. 10, 2009, 1 page.
Invitation to Pay Additional Fees dated Dec. 1, 2011, received for PCT Patent Application No. PCT/US2010/020229, which corresponds to U.S. Appl. No. 12/788,281 (van Os), 4 pages.
Non-Final Office Action received for U.S. Appl. No. 17/323,944, dated Jun. 15, 2022, 19 Pages.
Garmin, "Garmin Driveassist 51 Owner's Manual", Available online at: <https://www8.garmin.com/manuals/webhelp/driveassist51/EN-US/DriveAssist_51_OM_WebHelp_EN-US.pdf>, [retrieved from Internet on May 6, 2022]., 2017, 34 Pages.

\* cited by examiner

Move Map:

Display user selectable region for obtaining information associated with marker:

Move Marker:
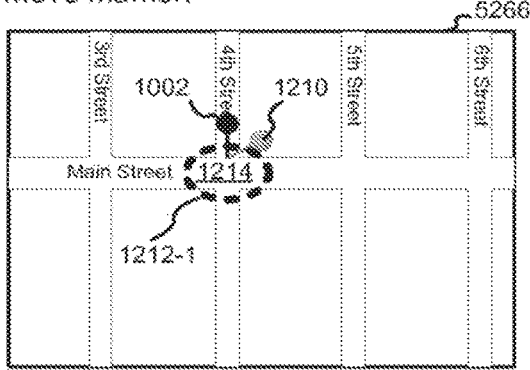
Figure 12C(1)
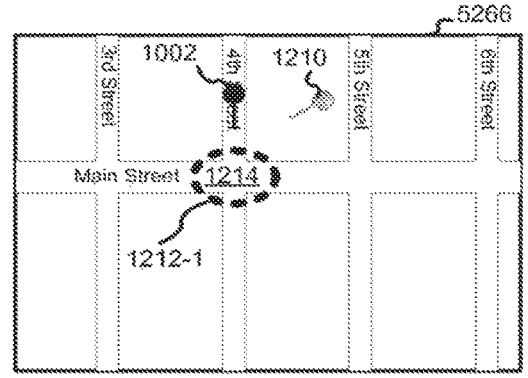
Figure 12C(2)
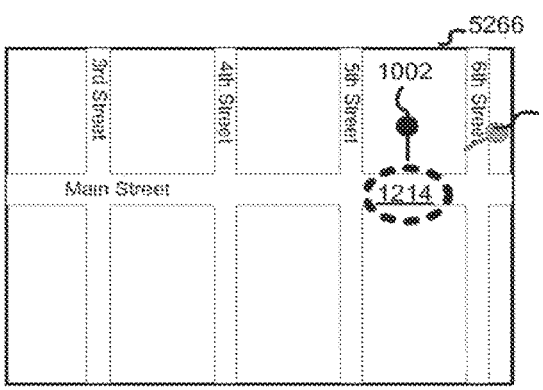
Figure 12C(4)
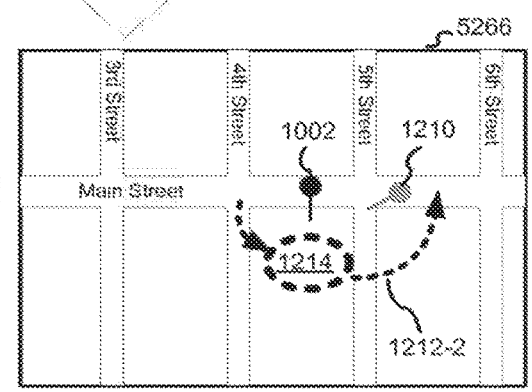
Figure 12C(3)
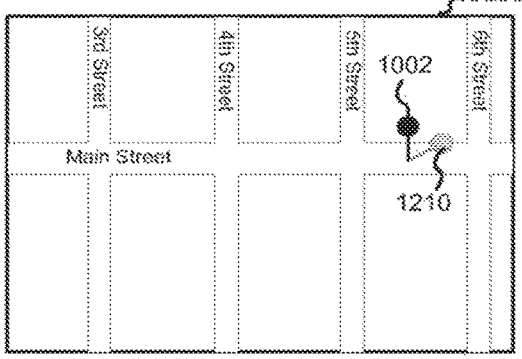
Figure 12C(5)

TOUCH SCREEN DEVICE, METHOD, AND GRAPHICAL USER INTERFACE FOR PROVIDING MAPS, DIRECTIONS, AND LOCATION-BASED INFORMATION

RELATED APPLICATIONS

This application is a continuation of U.S. application Ser. No. 13/662,370, filed Oct. 26, 2012, entitled "Touch Screen Device, Method, and Graphical User Interface for Providing Maps, Directions, and Location-Based Information," which is a divisional of U.S. application Ser. No. 12/143,752, filed Jun. 20, 2008, entitled "Touch Screen Device, Method, and Graphical User Interface for Providing Maps, Directions, and Location-Based Information," which claims priority to U.S. Provisional Patent Application Ser. No. 61/019,296, entitled "Portable Multifunction Device, Method, and Graphical User Interface for Providing Maps, Directions, and Location-Based Information," filed Jan. 6, 2008; U.S. Provisional Patent Application Ser. No. 61/019,295, entitled "Portable Multifunction Device, Method, and Graphical User Interface for Displaying and Selecting Application Options," filed Jan. 6, 2008; U.S. Provisional Patent Application Ser. No. 60/937,993, entitled "Portable Multifunction Device," filed Jun. 29, 2007; and U.S. Provisional Patent Application Ser. No. 60/936,725, entitled "Portable Multifunction Device, Method, and Graphical User Interface for Providing Maps and Directions," filed Jun. 22, 2007. All of these applications are incorporated by reference herein in their entirety.

This application is related to the following applications: (1) U.S. patent application Ser. No. 10/188,182, "Touch Pad For Handheld Device," filed Jul. 1, 2002; (2) U.S. patent application Ser. No. 10/722,948, "Touch Pad For Handheld Device," filed Nov. 25, 2003; (3) U.S. patent application Ser. No. 10/643,256, "Movable Touch Pad With Added Functionality," filed Aug. 18, 2003; (4) U.S. patent application Ser. No. 10/654,108, "Ambidextrous Mouse," filed Sep. 2, 2003; (5) U.S. patent application Ser. No. 10/840,862, "Multipoint Touchscreen," filed May 6, 2004; (6) U.S. patent application Ser. No. 10/903,964, "Gestures For Touch Sensitive Input Devices," filed Jul. 30, 2004; (7) U.S. patent application Ser. No. 11/038,590, "Mode-Based Graphical User Interfaces For Touch Sensitive Input Devices" filed Jan. 18, 2005; (8) U.S. patent application Ser. No. 11/057,050, "Display Actuator," filed Feb. 11, 2005; (9) U.S. patent application Ser. No. 11/969,211, "Portable Multifunction Device, Method, and Graphical User Interface for Providing Maps and Directions," filed Jan. 3, 2008; (10) U.S. Provisional Patent Application No. 61/019,295, "Portable Multifunction Device, Method, and Graphical User Interface for Displaying and Selecting Application Options," filed Jan. 6, 2008; and (11) U.S. patent application Ser. No. 12/143,741, "Portable Multifunction Device, Method, and Graphical User Interface for Displaying and Selecting Application Options," filed Jun. 20, 2008. All of these applications are incorporated by reference herein in their entirety.

TECHNICAL FIELD

The disclosed embodiments relate generally to devices with touch screen displays, and more particularly, to devices with touch screen displays that provide maps and directions.

BACKGROUND

As portable electronic devices become more compact, and the number of functions performed by a given device increase, it has become a significant challenge to design a user interface that allows users to easily interact with a multifunction device. This challenge is particular significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This is unfortunate because it may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

For example, mapping applications are available for mobile phones (e.g., Google maps for mobile, available at www.google.com/gmm). But navigating in such applications using physical push buttons (e.g., the number keys on a hard keyboard) or touch screens in existing mobile phones is cumbersome for most users. Thus, at present, relatively few people use mapping applications in mobile phones and other portable devices.

Accordingly, there is a need for devices with touch screen displays that have more transparent and intuitive user interfaces for providing maps, directions, and location-based information. Such interfaces increase the effectiveness, efficiency and user satisfaction with such devices.

SUMMARY

The above deficiencies and other problems associated with user interfaces for devices with touch screen displays are reduced or eliminated by the disclosed multifunction device. In some embodiments, the device is portable. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include providing maps and directions, telephoning, video conferencing, e-mailing, instant messaging, blogging, digital photographing, digital videoing, web browsing, digital music playing, and/or digital video playing. Instructions for performing these functions may be included in a computer readable storage medium or other computer program product configured for execution by one or more processors.

In accordance with some embodiments, a device having a touch screen display is configured to display a map application, which is configured to separately display a list of bookmarked locations, a list of recent queries by a user, and a list of contacts for the user. In response to detecting a finger gesture on an input icon associated with a search term input area, the map application displays at least one of the list of bookmarked locations, the list of recent queries by a user, and the list of contacts for the user. In response to detecting a finger gesture on a bookmarked location in the list of bookmarked locations, an area corresponding to the bookmarked location is displayed on a digital map. In response to detecting a finger gesture on a recent query in the list of recent queries by the user, one or more results corresponding to the recent query are displayed on a digital map. And in response to detecting a finger gesture on a contact in the list of contacts, an area associated with the contact is displayed on a digital map.

In accordance with some embodiments, a device having a touch screen display is configured to display a map application. The map application is configured to simultaneously display a bookmark list display icon, a recent query list display icon, and a contact list display icon, and is also configured to separately display a list of bookmarked locations, a list of recent queries by a user, and a list of contacts for the user. In response to detecting a finger gesture on the bookmark list display icon, the map application displays the list of bookmarked locations. In response to detecting a finger gesture on a bookmarked location in the list of bookmarked locations, the map application displays an area corresponding to the bookmarked location on a digital map. In response to detecting a finger gesture on the recent query list display icon, the map application displays the list of recent queries by the user. And in response to detecting a finger gesture on a recent query in the list of recent queries by the user, the map application displays one or more results corresponding to the recent query on a digital map.

In accordance with some embodiments, a computing device having a touch screen display is configured to operate as follows. In response to detecting a finger gesture on a route search initiation icon, the device sends a first location and a second location to a remote computer, receives routing information between the first location and the second location, and displays at least some of the routing information between the first location and the second location on a digital map. In response to detecting a finger gesture on a list icon, the device displays an itemized list of the routing information, and in response to detecting a finger gesture on a particular item in the itemized list of the routing information, the device shows a corresponding portion of routing information on the digital map.

In accordance with some embodiments, a computer-implemented method is performed at a computing device with a touch screen display. In the method, a map application is displayed. The map application is configured to display a map. A first finger gesture on an icon for adding a user-moveable location marker to the map is detected. The user-moveable location marker is displayed on the map. In response to detecting a second finger gesture on the user-moveable location marker, the user-moveable location marker is moved on the map in accordance with the second finger gesture. While displaying the map and the user-moveable location marker, a user-selectable region for obtaining information associated with a current location of the user-moveable location marker is displayed on the map. In response to detecting a third finger gesture on the user-selectable region for obtaining information, the display of the map and the user-moveable location marker is replaced with a display of a plurality of option icons. The plurality of option icons includes a first icon, a second icon, and a third icon. In response to detection of a finger gesture on the first icon, the display of the plurality of icons is replaced with a display of a user interface for adding an entry to a set of bookmarked locations, the added entry corresponding to the current location of the user-moveable location marker on the map. In response to detection of a finger gesture on the second icon, the display of the plurality of icons is replaced with a display of a user interface for getting directions to the current location of the user-moveable location marker on the map from another location. In response to detection of a finger gesture on the third icon, the display of the plurality of icons is replaced with a display of a user interface for getting directions from the current location of the user-moveable location marker on the map to another location.

In accordance with some embodiments, a computing device comprises a touch screen display one or more processors, memory; and one or more programs. The one or more programs are stored in the memory and configured to be executed by the one or more processors. The one or more programs include instructions for displaying a map application. The map application is configured to display a map. The programs also instructions for detecting a first finger gesture on an icon for adding a user-moveable location marker to the map and for displaying the user-moveable location marker on the map. The programs further include instructions for moving the user-moveable location marker on the map in response to detecting a second finger gesture on the user-moveable location marker, in accordance with the second finger gesture. The programs further include instructions for, while displaying the map and the user-moveable location marker, displaying a user-selectable region for obtaining information associated with a current location of the user-moveable location marker on the map. The programs further include instructions for, in response to detecting a third finger gesture on the user-selectable region for obtaining information, replacing the display of the map and the user-moveable location marker with a display of a plurality of option icons. The plurality of option icons include a first icon, a second icon, and a third icon. In response to detection of a finger gesture on the first icon, the display of the plurality of icons is replaced with a display of a user interface for adding an entry to a set of bookmarked locations, the added entry corresponding to the current location of the user-moveable location marker on the map. In response to detection of a finger gesture on the second icon, the display of the plurality of icons is replaced with a display of a user interface for getting directions to the current location of the user-moveable location marker on the map from another location. In response to detection of a finger gesture on the third icon, the display of the plurality of icons is replaced with a display of a user interface for getting directions from the current location of the user-moveable location marker on the map to another location.

In accordance with some embodiments, a computer readable storage medium has stored instructions, which when executed by a device with a touch screen display cause the device to display a flat version of an application interface. The instructions also cause the device to display a map application. The map application is configured to display a map. The instructions also cause the device to detect first finger gesture on an icon for adding a user-moveable location marker to the map and display the user-moveable location marker on the map. The instructions also cause the device to, in response to detecting a second finger gesture on the user-moveable location marker, move the user-moveable location marker on the map in accordance with the second finger gesture. The instructions also cause the device to, while displaying the map and the user-moveable location marker, display a user-selectable region for obtaining information associated with a current location of the user-moveable location marker on the map. In response to detecting a third finger gesture on the user-selectable region for obtaining information, the instructions cause the device to replace the display of the map and the user-moveable location marker with a display of a plurality of option icons. The plurality of option icons include a first icon, a second icon, and a third icon. In response to detection of a finger gesture on the first icon, the instructions cause the device to replace the display of the plurality of icons with a display of a user interface for adding an entry to a set of bookmarked locations, the added entry corresponding to the current location of the user-moveable location marker on the map. In response to detection of a finger gesture on the second icon, the instructions cause device to replace the display of the plurality of icons with a display of a user interface for getting directions to the current location of the user-moveable location marker on the map from another location. In response to detection of a finger gesture on the third icon, the instructions cause the device to replace the display of the plurality of icons with a display of a user interface for getting directions from the current location of the user-moveable location marker on the map to another location.

In accordance with some embodiments, a graphical user interface (GUI) on a device with a touch screen display comprises a map application, wherein the map application is configured to display a map, an icon for adding a user-moveable location marker to the map, a user-selectable region for obtaining information associated with a current location of the user-moveable location marker, a plurality of option icons, including a first icon, a second icon, and a third icon. When a first finger gesture is detected on the icon for adding a user-moveable location marker to the map, the user-moveable location marker on the map is displayed on the map. In response to detecting a second finger gesture on the user-moveable location marker, the user-moveable location marker on the map is moved in accordance with the second finger gesture. While displaying the map and the user-moveable location marker, the user-selectable region for obtaining information associated with a current location of the user-moveable location marker is displayed on the map. In response to detecting a third finger gesture on the user-selectable region for obtaining information, the display of the map and the user-moveable location marker is replaced with a display of the plurality of option icons; the first icon, the second icon, and the third icon. In response to detection of a finger gesture on the first icon, the display of the plurality of icons is replaced with a display of a user interface for adding an entry to a set of bookmarked locations, the added entry corresponding to the current location of the user-moveable location marker on the map. In response to detection of a finger gesture on the second icon, the display of the plurality of icons is replaced with a display of a user interface for getting directions to the current location of the user-moveable location marker on the map from another location. In response to detection of a finger gesture on the third icon, the display of the plurality of icons is replaced with a display of a user interface for getting directions from the current location of the user-moveable location marker on the map to another location.

In accordance with some embodiments, a device with a touch screen display comprises means for displaying a map application, wherein the map application is configured to display a map, and means for detecting a first finger gesture on an icon for adding a user-moveable location marker to the map. The device also comprises means for displaying the user-moveable location marker on the map and means for, in response to detecting a second finger gesture on the user-moveable location marker, moving the user-moveable location marker on the map in accordance with the second finger gesture. The device further comprises means for, while displaying the map and the user-moveable location marker, displaying a user-selectable region for obtaining information associated with a current location of the user-moveable location marker on the map, and means for, in response to detecting a third finger gesture on the user-selectable region for obtaining information, replacing the display of the map and the user-moveable location marker with a display of a plurality of option icons. The plurality of option icons include a first icon, a second icon, and a third icon. In response to detection of a finger gesture on the first icon, the display of the plurality of icons is replaced with a display of a user interface for adding an entry to a set of bookmarked locations, the added entry corresponding to the current location of the user-moveable location marker on the map. In response to detection of a finger gesture on the second icon, the display of the plurality of icons is replaced with a display of a user interface for getting directions to the current location of the user-moveable location marker on the map from another location; and in response to detection of a finger gesture on the third icon, the display of the plurality of icons is replaced with a display of a user interface for getting directions from the current location of the user-moveable location marker on the map to another location.

In accordance with some embodiments, a computer-implemented method is performed at a computing device with a touch screen display. In the method, in response to detecting a first finger gesture on a marker on a digital map on the touch screen display, the digital map on the touch screen display is moved. The first finger gesture moves a finger contact area more than a first predetermined distance in a first predetermined time when a finger in the first finger gesture initially touches the touch screen display. In response to detecting a second finger gesture on the marker on the digital map on the touch screen display, a user-selectable region for obtaining information associated with the marker is displayed on the touch screen display. The second finger gesture is a single tap gesture that moves a finger contact area less than a second predetermined distance and lasts less than a second predetermined time. In response to detecting a third finger gesture on a user-moveable location marker on the digital map on the touch screen display, the user-moveable location marker is moved on the digital map in accordance with the third finger gesture. The third finger gesture includes a substantially stationary contact. The substantially stationary contact moves a finger contact area less than a third predetermined distance and lasts more than the second predetermined time, followed by translation of the finger contact area on the touch screen display after the second predetermined time ends.

In accordance with some embodiments, a computing device comprises a touch screen display, one or more processors, memory, and one or more programs. The one or more programs are stored in the memory and configured to be executed by the one or more processors. The one or more programs include instructions for moving the digital map on the touch screen display in response to detecting a first finger gesture on a marker on a digital map on the touch screen display. The first finger gesture moves a finger contact area more than a first predetermined distance in a first predetermined time when a finger in the first finger gesture initially touches the touch screen display. The programs also include instructions for, in response to detecting a second finger gesture on the marker on the digital map on the touch screen display, displaying a user-selectable region for obtaining information associated with the marker on the touch screen display. The second finger gesture is a single tap gesture that moves a finger contact area less than a second predetermined distance and lasts less than a second predetermined time. The one or more programs also include instructions for, in response to detecting a third finger gesture on a user-moveable location marker on the digital map on the touch screen display, moving the user-moveable location marker on the digital map in accordance with the third finger gesture. The third finger gesture includes a substantially stationary contact. The substantially stationary contact moves a finger contact area less than a third predetermined distance and lasts more than the second predetermined time, followed by translation of the finger contact area on the touch screen display after the second predetermined time ends.

In accordance with some embodiments, a computer readable storage medium has stored instructions, which when executed by a device with a touch screen display cause the device to, in response to detecting a first finger gesture on a marker on a digital map on the touch screen display, move the digital map on the touch screen display. The first finger gesture moves a finger contact area more than a first predetermined distance in a first predetermined time when a finger in the first finger gesture initially touches the touch screen display. The instructions when executed by the device also cause the device to, in response to detecting a second finger gesture on the marker on the digital map on the touch screen display, display a user-selectable region for obtaining information associated with the marker on the touch screen display. The second finger gesture is a single tap gesture that moves a finger contact area less than a second predetermined distance and lasts less than a second predetermined time. The instructions when executed by the device also cause the device to in response to detecting a third finger gesture on a user-moveable location marker on the digital map on the touch screen display, move the user-moveable location marker on the digital map in accordance with the third finger gesture. The third finger gesture includes a substantially stationary contact. The substantially stationary contact moves a finger contact area less than a third predetermined distance and lasts more than the second predetermined time, followed by translation of the finger contact area on the touch screen display after the second predetermined time ends.

In accordance with some embodiments, a graphical user interface (GUI) on a device with a touch screen display comprises a marker on a digital map, and a user-selectable region for obtaining information associated with the marker on the touch screen display. In response to detecting a first finger gesture on the marker on the digital map on the touch screen display, the digital map on the touch screen display is moved. The first finger gesture moves a finger contact area more than a first predetermined distance in a first predetermined time when a finger in the first finger gesture initially touches the touch screen display. In response to detecting a second finger gesture on the marker on the digital map on the touch screen display, the user-selectable region for obtaining information associated with the marker is displayed on the touch screen display. The second finger gesture is a single tap gesture that moves a finger contact area less than a second predetermined distance and lasts less than a second predetermined time. In response to detecting a third finger gesture on a user-moveable location marker on the digital map on the touch screen display, the user-moveable location marker is moved on the digital map in accordance with the third finger gesture. The third finger gesture includes a substantially stationary contact. The substantially stationary contact moves a finger contact area less than a third predetermined distance and lasts more than the second predetermined time, followed by translation of the finger contact area on the touch screen display after the second predetermined time ends.

In accordance with some embodiments, a device with a touch screen display comprises means for, in response to detecting a first finger gesture on a marker on a digital map on the touch screen display, moving the digital map on the touch screen display, wherein the first finger gesture moves a finger contact area more than a first predetermined distance in a first predetermined time when a finger in the first finger gesture initially touches the touch screen display. The device also comprises means for, in response to detecting a second finger gesture on the marker on the digital map on the touch screen display, displaying a user-selectable region for obtaining information associated with the marker on the touch screen display, wherein the second finger gesture is a single tap gesture that moves a finger contact area less than a second predetermined distance and lasts less than a second predetermined time. The device further comprises means for, in response to detecting a third finger gesture on a user-moveable location marker on the digital map on the touch screen display, moving the user-moveable location marker on the digital map in accordance with the third finger gesture, wherein the third finger gesture includes a substantially stationary contact. The substantially stationary contact moves a finger contact area less than a third predetermined distance and lasts more than the second predetermined time, followed by translation of the finger contact area on the touch screen display after the second predetermined time ends.

In accordance with some embodiments, a computer-implemented method is performed at a computing device with a touch screen display. In the method, a map application is displayed, wherein the map application is configured to display a map. Location information for the computing device is received. In response to detecting a user gesture on a view location icon while the map application is displayed, a first visual indicator is displayed on a portion of the displayed map that indicates an approximate region in which the computing device is located in accordance with the received location information when the approximate region lies within the displayed map, and a second visual indicator is displayed around a perimeter of the displayed map when the approximate region includes the displayed map and also extends beyond the displayed map. The displayed first visual indicator is changed to the second visual indicator in response to magnifying an area of the map that includes the approximate region in which the computing device is located. The displayed second visual indicator is changed to the first visual indicator in response to demagnifying an area of the map that includes the approximate region in which the computing device is located.

In accordance with some embodiments, a computing device comprises a touch screen display, one or more processors, memory, and one or more programs. The one or more programs are stored in the memory and configured to be executed by the one or more processors. The one or more programs include instructions for displaying a map application, wherein the map application is configured to display a map. The one or more programs also include instructions for receiving location information for the computing device, and instructions for, in response to detecting a user gesture on a view location icon while the map application is displayed, displaying a first visual indicator on a portion of the displayed map that indicates an approximate region in which the computing device is located in accordance with the received location information when the approximate region lies within the displayed map, and displaying a second visual indicator around a perimeter of the displayed map when the approximate region includes the displayed map and also extends beyond the displayed map. The one or more programs also include instructions for changing from displaying the first visual indicator to displaying the second visual indicator in response to magnifying an area of the map that includes the approximate region in which the computing device is located, and instructions for changing from displaying the second visual indicator to displaying the first visual indicator in response to demagnifying an area of the map that includes the approximate region in which the computing device is located.

In accordance with some embodiments, a computer readable storage medium has stored instructions, which when executed by a device with a touch screen display cause the device to display a map application, wherein the map application is configured to display a map. The instructions, when executed by the device also cause the device to receive location information for the computing device, and in response to detecting a user gesture on a view location icon while the map application is displayed, display a first visual indicator on a portion of the displayed map that indicates an approximate region in which the computing device is located in accordance with the received location information when the approximate region lies within the displayed map, and display a second visual indicator around a perimeter of the displayed map when the approximate region includes the displayed map and also extends beyond the displayed map. The instructions, when executed by the device also cause the device to change from displaying the first visual indicator to displaying the second visual indicator in response to magnifying an area of the map that includes the approximate region in which the computing device is located, and change from displaying the second visual indicator to displaying the first visual indicator in response to demagnifying an area of the map that includes the approximate region in which the computing device is located.

In accordance with some embodiments, a graphical user interface (GUI) on a device with a touch screen display comprises a map application. The map application is configured to display a map. The GUI also comprises a view location icon, a first visual indicator, and a second visual indicator. Location information for the computing device is received. In response to detecting a user gesture on the view location icon while the map application is displayed, the first visual indicator is displayed on a portion of the displayed map that indicates an approximate region in which the computing device is located in accordance with the received location information when the approximate region lies within the displayed map. Also in response to detecting a user gesture on the view location icon while the map application is displayed, a second visual indicator is displayed around a perimeter of the displayed map when the approximate region includes the displayed map and also extends beyond the displayed map. In response to magnifying an area of the map that includes the approximate region in which the computing device is located, the displayed first visual indicator is changed to the second visual indicator. In response to demagnifying an area of the map that includes the approximate region in which the computing device is located, the displayed second visual indicator is changed to the first visual indicator.

In accordance with some embodiments, a device with a touch screen display comprises means for displaying a map application. The map application is configured to display a map. The device also comprises means for receiving location information for the computing device. The device also comprises means for, in response to detecting a user gesture on a view location icon while the map application is displayed, displaying a first visual indicator on a portion of the displayed map that indicates an approximate region in which the computing device is located in accordance with the received location information when the approximate region lies within the displayed map, and displaying a second visual indicator around a perimeter of the displayed map when the approximate region includes the displayed map and also extends beyond the displayed map. The device further comprises means for changing from displaying the first visual indicator to displaying the second visual indicator in response to magnifying an area of the map that includes the approximate region in which the computing device is located, and means for changing from displaying the second visual indicator to displaying the first visual indicator in response to demagnifying an area of the map that includes the approximate region in which the computing device is located.

In accordance with some embodiments, a computer-implemented method is performed at a computing device with a touch screen display. In the method, a map application is displayed, wherein the map application is configured to separately display: a list of bookmarked locations, wherein a current location of the device is displayed at the top of the list of bookmarked locations; a list of recent queries by a user; a list of contacts for the user; and a keyboard with a route search initiation icon. A first area fir entering a first location is displayed. A second area for entering a second location is also displayed. In response to detecting a finger gesture on an input icon associated with the first area, the device displays: the list of bookmarked locations, wherein in response to detecting a finger gesture on a bookmarked location in the list of bookmarked locations, the map application receives an address or name, corresponding to the bookmarked location, when the address or name is entered in the first area; the list of recent queries by the user, wherein in response to detecting a finger gesture on a location in the list of recent queries by the user, the map application receives an address corresponding to the location when the address is entered in the first area; or the list of contacts for the user, wherein in response to detecting a finger gesture on a contact in the list of contacts for the user, the map application receives an address associated with the contact when the address is entered in the first area. In response to detecting a finger gesture on an input icon associated with the second area, the device displays: the list of bookmarked locations, wherein in response to detecting a finger gesture on a bookmarked location in the list of bookmarked locations, the map application receives an address or name, corresponding to the bookmarked location, when the address or name corresponding to the bookmarked location is entered in the second area; the list of recent queries by the user, wherein in response to detecting a finger gesture on a location in the list of recent queries by the user, the map application receives an address corresponding to the location when the address corresponding to the location is entered in the second area; or the list of contacts for the user, wherein in response to detecting an finger gesture on a contact in the list of contacts for the user, the map application receives an address associated with the contact when the address associated with the contact is entered in the second area. In response to detecting a finger gesture on the route search initiation icon; the device sends the first location and the second location to a remote computer; receives routing information between the first location and the second location; and displays at least some of the routing information between the first location and the second location on a digital map.

In accordance with some embodiments, a computing device comprises a touch screen display, one or more processors, memory, and one or more programs. The one or more programs are stored in the memory and configured to be executed by the one or more processors. The one or more programs include instructions for displaying a map application. The map application is configured to separately display: a list of bookmarked locations, wherein a current location of the device is displayed at the top of the list of bookmarked locations; a list of recent queries by a user, a list of contacts for the user, and a keyboard with a route search initiation icon. The one or more programs also include instructions for: displaying a first area for entering a first location; displaying a second area for entering a second location; in response to detecting a finger gesture on an input icon associated with the first area, displaying: the list of bookmarked locations, wherein in response to detecting a finger gesture on a bookmarked location in the list of bookmarked locations, the map application receives an address or name, corresponding to the bookmarked location, when the address or name is entered in the first area; the list of recent queries by the user, wherein in response to detecting a finger gesture on a location in the list of recent queries by the user, the map application receives an address corresponding to the location when the address is entered in the first area; or the list of contacts for the user, wherein in response to detecting a finger gesture on a contact in the list of contacts for the user, the map application receives an address associated with the contact when the address is entered in the first area; in response to detecting a finger gesture on an input icon associated with the second area, displaying: the list of bookmarked locations, wherein in response to detecting a finger gesture on a bookmarked location in the list of bookmarked locations, the map application receives an address or name, corresponding to the bookmarked location, when the address or name corresponding to the bookmarked location is entered in the second area; the list of recent queries by the user, wherein in response to detecting a finger gesture on a location in the list of recent queries by the user, the map application receives an address corresponding to the location when the address corresponding to the location is entered in the second area; or the list of contacts for the user, wherein in response to detecting an finger gesture on a contact in the list of contacts for the user, the map application receives an address associated with the contact when the address associated with the contact is entered in the second area; and in response to detecting a finger gesture on the route search initiation icon: sending the first location and the second location to a remote computer; receiving routing information between the first location and the second location; and displaying at least some of the muting information between the first location and the second location on a digital map.

In accordance with some embodiments, a computer readable storage medium has stored therein instructions, which when executed by a device with a touch screen display, cause the device to display a map application. The map application is configured to separately display: a list of bookmarked locations, wherein a current location of the device is displayed at the top of the list of bookmarked locations; a list of recent queries by a user; a list of contacts for the user; and a keyboard with a mute search initiation icon, the instructions also cause the device to: display a first area for entering a first location; display a second area for entering a second location; in response to detecting a finger gesture on an input icon associated with the first area, display: the list of bookmarked locations, wherein in response to detecting a finger gesture on a bookmarked location in the list of bookmarked locations, the map application receives an address or name, corresponding to the bookmarked location, when the address or name is entered in the first area; the list of recent queries by the user, wherein in response to detecting a finger gesture on a location in the list of recent queries by the user, the map application receives an address corresponding to the location when the address is entered in the first area; or the list of contacts for the user, wherein in response to detecting a finger gesture on a contact in the list of contacts for the user, the map application receives an address associated with the contact when the address is entered in the first area; in response to detecting a finger gesture on an input icon, associated with the second area, display: the list of bookmarked locations, wherein in response to detecting a finger gesture on a bookmarked location in the list of bookmarked locations, the map application receives an address or name, corresponding to the bookmarked location, when the address or name corresponding to the bookmarked location is entered in the second area; the list of recent queries by the user, wherein in response to detecting a finger gesture on a location in the list of recent queries by the user, the map application receives an address corresponding to the location when the address corresponding to the location is entered in the second area; or the list of contacts for the user, wherein in response to detecting an finger gesture on a contact in the list of contacts for the user, the map application receives an address associated with the contact when the address associated with the contact is entered in the second area; and in response to detecting a finger gesture on the route search initiation icon: send the first location and the second location to a remote computer, receive routing information between the first location and the second location; and display at least some of the muting information between the first location and the second location on a digital map.

In accordance with some embodiments, a graphical user interface for a map application on a device with a touch screen display, includes: a digital map; a list of bookmarked locations, wherein a current location of the device is displayed at the top of the list of bookmarked locations; a list of recent queries by a user, a list of contacts for the user; a keyboard with a route search initiation icon; a first area for entering a first location; an input icon associated with the first area; a second area for entering a second location; and an input icon associated with the second area. In response to detecting a finger gesture on the input icon associated with the first area; the list of bookmarked locations is displayed, wherein in response to detecting a finger gesture on a bookmarked location in the list of bookmarked locations, the map application receives an address or name, corresponding to the bookmarked location, when the address or name is entered in the first area; the list of recent queries by the user is displayed, wherein in response to detecting a finger gesture on a location in the list of recent queries by the user, the map application receives an address corresponding to the location when the address is entered in the first area; or the list of contacts for the user is displayed, wherein in response to detecting a finger gesture on a contact in the list of contacts for the user, the map application receives an address associated with the contact when the address is entered in the first area. In response to detecting a finger gesture on the input icon associated with the second area; the list of bookmarked locations is displayed, wherein in response to detecting a finger gesture on a bookmarked location in the list of bookmarked locations, the map application receives an address or name, corresponding to the bookmarked location, when the address or name corresponding to the bookmarked location is entered in the second area; the list of recent queries by the user is displayed, wherein in response to detecting a finger gesture on a location in the list of recent queries by the user, the map application receives an address corresponding to the location when the address corresponding to the location is entered in the second area; or the list of contacts for the user is displayed, wherein in response to detecting an finger gesture on a contact in the list of contacts for the user, the map application receives an address associated with the contact when the address associated with the contact is entered in the second area. In response to detecting a finger gesture on the route search initiation icon: the first location and the second location is sent to a remote computer; muting information between the first location and the second location is received; and at least some of the routing information between the first location and the second location is displayed on the digital map.

In accordance with some embodiments, a device with a touch screen display, includes: means for displaying a map application. The map application is configured to separately display: a list of bookmarked locations, wherein a current location of the device is displayed at the top of the list of bookmarked locations; a list of recent queries by a user; a list of contacts for the user; and a keyboard with a mute search initiation icon. The device also includes: means for displaying a first area for entering a first location; means for displaying a second area for entering a second location; means for, in response to detecting a finger gesture on an input icon associated with the first area, displaying: the list of bookmarked locations, wherein in response to detecting a finger gesture on a bookmarked location in the list of bookmarked locations, the map application receives an address or name, corresponding to the bookmarked location, when the address or name is entered in the first area; the list of recent queries by the user, wherein in response to detecting a finger gesture on a location in the list of recent queries by the user, the map application receives an address corresponding to the location when the address is entered in the first area; or the list of contacts for the user, wherein in response to detecting a finger gesture on a contact in the list of contacts for the user, the map application receives an address associated with the contact when the address is entered in the first area; means for, in response to detecting a finger gesture on an input icon associated with the second area, displaying: the list of bookmarked locations, wherein in response to detecting a finger gesture on a bookmarked location in the list of bookmarked locations, the map application receives an address or name, corresponding to the bookmarked location, when the address or name corresponding to the bookmarked location is entered in the second area; the list of recent queries by the user, wherein in response to detecting a finger gesture on a location in the list of recent queries by the user, the map application receives an address corresponding to the location when the address corresponding to the location is entered in the second area; or the list of contacts for the user, wherein in response to detecting an finger gesture on a contact in the list of contacts for the user, the map application receives an address associated with the contact when the address associated with the contact is entered in the second area; and means for, in response to detecting a finger gesture on the route search initiation icon: sending the first location and the second location to a remote computer receiving routing information between the first location and the second location; and displaying at least some of the muting information between the first location and the second location on a digital map.

In accordance with some embodiments, a computer-implemented method is performed at a computing device with a touch screen display. In the method, a map application is displayed. The map application is configured to display a map. In response to detecting a stationary first finger gesture on the displayed map for greater than a predetermined time, a user-moveable location marker is displayed on the map. In response to detecting a second finger gesture on the user-moveable location marker, the user-moveable location marker is moved on the map in accordance with the second finger gesture. While displaying the map and the user-moveable location marker, a user-selectable region for obtaining information associated with a current location of the user-moveable location marker is displayed on the map. In response to detecting a third finger gesture on the user-selectable region for obtaining information, the display of the map and the user-moveable location marker is replaced with a display of a plurality of option icons. The plurality of option icons include a first icon, a second icon, and a third icon. In response to detection of a finger gesture on the first icon, the display of the plurality of icons is replaced with a display of a user interface for adding an entry to a set of bookmarked locations, the added entry corresponding to the current location of the user-moveable location marker on the map. In response to detection of a finger gesture on the second icon, the display of the plurality of icons is replaced with a display of a user interface for getting directions to the current location of the user-moveable location marker on the map from another location. In response to detection of a finger gesture on the third icon, the display of the plurality of icons is replaced with a display of a user interface for getting directions from the current location of the user-moveable location marker on the map to another location.

In accordance with some embodiments, a computing device comprises a touch screen display, one or more processors, memory, and one or more programs. The one or more programs are stored in the memory and configured to be executed by the one or more processors. The one or more programs include instructions for displaying a map application. The map application is configured to display a map. The programs also include instructions for, in response to detecting a stationary first finger gesture on the displayed map for greater than a predetermined time, displaying a user-moveable location marker on the map. The programs also include instructions for, in response to detecting a second finger gesture on the user-moveable location marker, moving the user-moveable location marker on the map in accordance with the second finger gesture. The programs also include instructions for, while displaying the map and the user-moveable location marker, displaying a user-selectable region for obtaining information associated with a current location of the user-moveable location marker on the map. The programs also include instructions for, in response to detecting a third finger gesture on the user-selectable region for obtaining information, replacing the display of the map and the user-moveable location marker with a display of a plurality of option icons. The plurality of option icons include a first icon, a second icon, and a third icon. The programs also include instructions for, in response to detection of a finger gesture on the first icon, replacing the display of the plurality of icons with a display of a user interface for adding an entry to a set of bookmarked locations, the added entry corresponding to the current location of the user-moveable location marker on the map. The programs also include instructions for, in response to detection of a finger gesture on the second icon, replacing the display of the plurality of icons with a display of a user interface for getting directions to the current location of the user-moveable location marker on the map from another location. The programs further include instructions for, in response to detection of a finger gesture on the third icon, replacing the display of the plurality of icons with a display of a user interface for getting directions from the current location of the user-moveable location marker on the map to another location.

In accordance with some embodiments, a computer readable storage medium has stored instructions, which when executed by a device with a touch screen display cause the device to display a map application, wherein the map application is configured to display a map. The instructions, when executed by the device also cause the device to, in response to detecting a stationary first finger gesture on the displayed map for greater than a predetermined time, display a user-moveable location marker on the map. The instructions, when executed by the device also cause the device to, in response to detecting a second finger gesture on the user-moveable location marker, move the user-moveable location marker on the map in accordance with the second finger gesture. The instructions, when executed by the device also cause the device to, while displaying the map and the user-moveable location marker, display a user-selectable region for obtaining information associated with a current location of the user-moveable location marker on the map. The instructions, when executed by the device also cause the device to, in response to detecting a third finger gesture on the user-selectable region for obtaining information, replace the display of the map and the user-moveable location marker with a display of a plurality of option icons. The plurality of option icons include a first icon, a second icon, and third icon. The instructions, when executed by the device also cause the device to, in response to detection of a finger gesture on the first icon, replace the display of the plurality of icons with a display of a user interface for adding an entry to a set of bookmarked locations, the added entry corresponding to the current location of the user-moveable location marker on the map. The instructions, when executed by the device also cause the device to, in response to detection of a finger gesture on the second icon, replace the display of the plurality of icons with a display of a user interface for getting directions to the current location of the user-moveable location marker on the map from another location. The instructions, when executed by the device also cause the device to, in response to detection of a finger gesture on the third icon, replace the display of the plurality of icons with a display of a user interface for getting directions from the current location of the user-moveable location marker on the map to another location.

In accordance with some embodiments, a graphical user interface (GUI) on a device with a touch screen display comprises a map application, wherein the map application is configured to display a map. The GUI also comprises a user-moveable location marker, a user-selectable region for obtaining information associated with a current location of the user-moveable location marker on the map, and a plurality of option icons, wherein the plurality of option icons include a first icon, a second icon, and a third icon. In response to detecting a stationary first finger gesture on the displayed map for greater than a predetermined time, the user-moveable location marker is displayed on the map. In response to detecting a second finger gesture on the user-moveable location marker, the user-moveable location marker is moved on the map in accordance with the second finger gesture. While displaying the map and the user-moveable location marker, the user-selectable region is displayed on the map. In response to detecting a third finger gesture on the user-selectable region for obtaining information, the display of the map and the user-moveable location marker is replaced with a display of the plurality of option icons. In response to detection of a finger gesture on the first icon, the display of the plurality of icons is replaced with a display of a user interface for adding an entry to a set of bookmarked locations, the added entry corresponding to the current location of the user-moveable location marker on the map. In response to detection of a finger gesture on the second icon, the display of the plurality of icons is replaced with a display of a user interface for getting directions to the current location of the user-moveable location marker on the map from another location. In response to detection of a finger gesture on the third icon, the display of the plurality of icons is replaced with a display of a user interface for getting directions from the current location of the user-moveable location marker on the map to another location.

In accordance with some embodiments, a device with a touch screen display comprises means for displaying a map application, wherein the map application is configured to display a map. The device also comprises means for, in response to detecting a stationary first finger gesture on the displayed map for greater than a predetermined time, displaying a user-moveable location marker on the map, and means for, in response to detecting a second finger gesture on the user-moveable location marker, moving the user-moveable location marker on the map in accordance with the second finger gesture. The device also comprises means for, while displaying the map and the user-moveable location marker, displaying a user-selectable region for obtaining information associated with a current location of the user-moveable location marker on the map. The device also comprises means for, in response to detecting a third finger gesture on the user-selectable region for obtaining information, replacing the display of the map and the user-moveable location marker with a display of a plurality of option icons, wherein the plurality of option icons include a first icon, a second icon, and a third icon. The device also comprises, means for in response to detection of a finger gesture on the first icon, replacing the display of the plurality of icons with a display of a user interface for adding an entry to a set of bookmarked locations, the added entry corresponding to the current location of the user-moveable location marker on the map. The device also comprises means for, in response to detection of a finger gesture on the second icon, replacing the display of the plurality of icons with a display of a user interface for getting directions to the current location of the user-moveable location marker on the map from another location. The device also comprises means for, in response to detection of a finger gesture on the third icon, replacing the display of the plurality of icons with a display of a user interface for getting directions from the current location of the user-moveable location marker on the map to another location.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 12A-12E illustrate examples of user interactions with a displayed map, a user-moveable location marker, and information associated with the location marker via finger gestures in accordance with some embodiments.

DESCRIPTION OF EMBODIMENTS

Figure 1A:
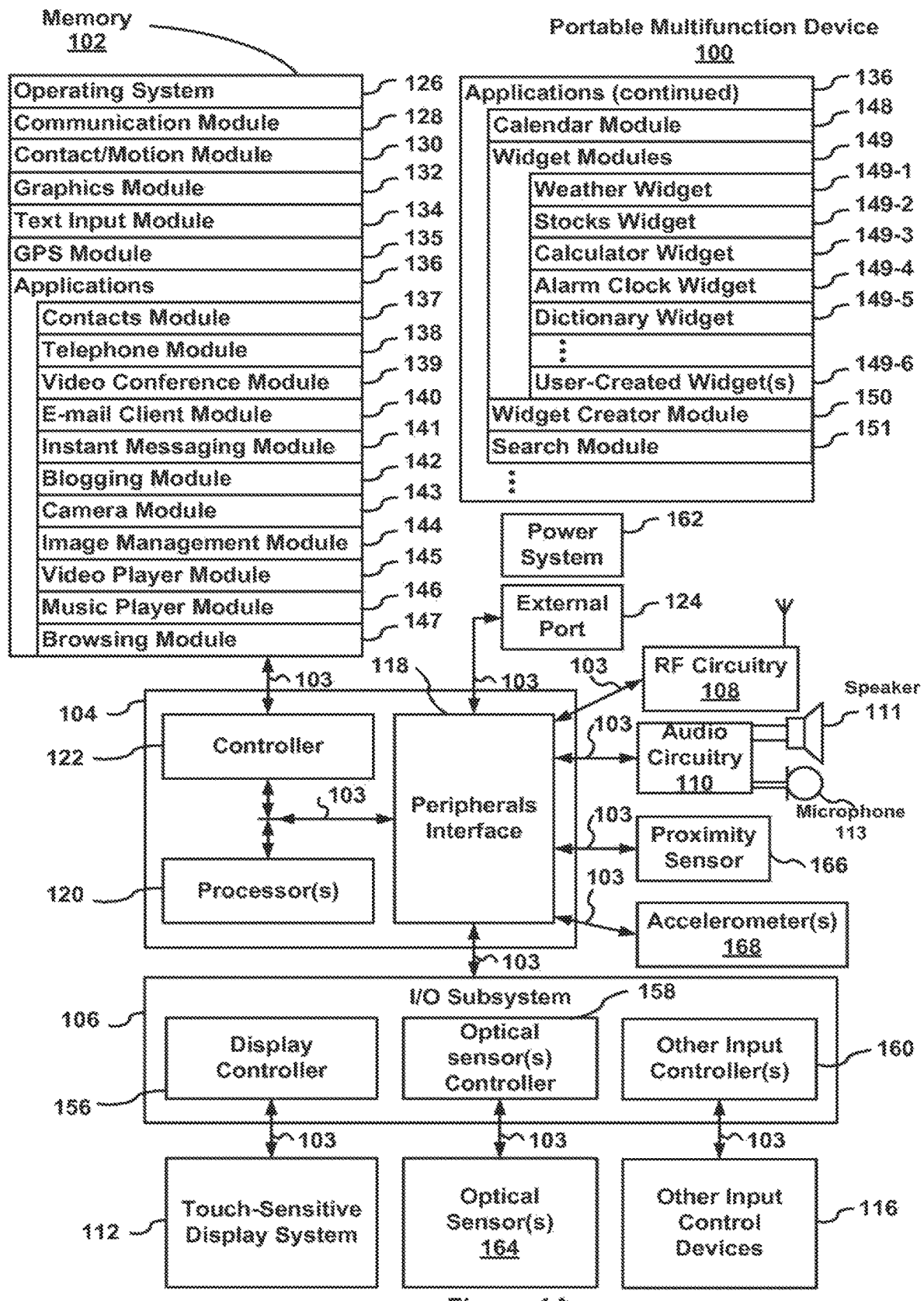
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, which may include one or more other physical user-interface devices, such as a physical click wheel, a physical keyboard, a mouse and/or a joystick.

The device supports a variety of applications, such as one or more of the following: a telephone application, a video conferencing application, an e-mail application, an instant messaging application, a blogging application, a photo management application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
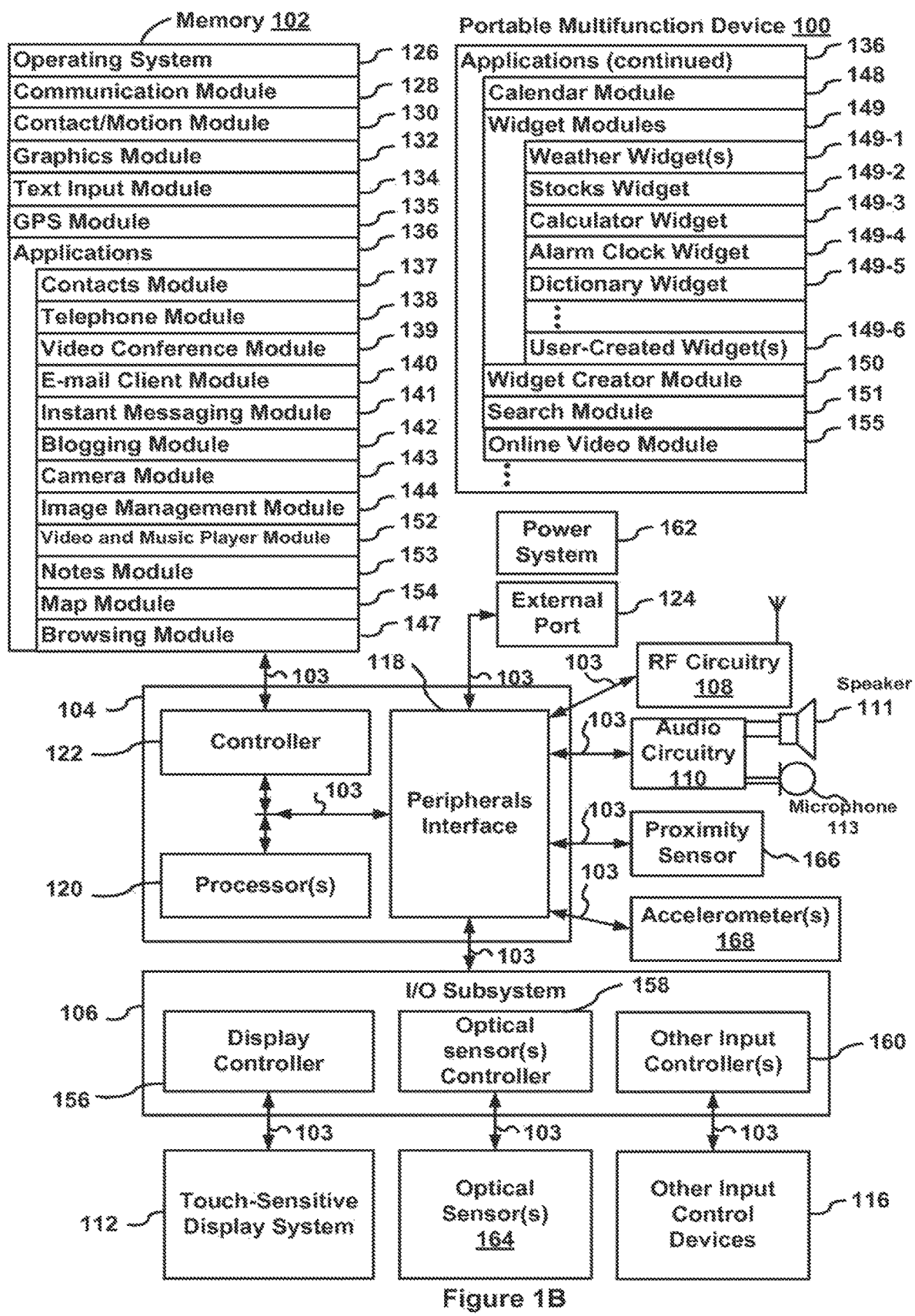

Attention is now directed towards embodiments of the device. FIGS. 1A and 1B are block diagrams illustrating portable multifunction devices 100 with touch-sensitive displays 112 in accordance with some embodiments. The touch-sensitive display 112 is sometimes called a "touch screen" for convenience, and may also be known as or called a touch-sensitive display system. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIGS. 1A and 1B may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch sensitive tablets do not provide visual output.

A touch-sensitive display in some embodiments of the touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 112 may have a resolution in excess of 100 dpi. In an exemplary embodiment, the touch screen has a resolution of approximately 160 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIGS. 1A and 1B show an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIGS. 1A and 1B show a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device," filed Sep. 30, 3005; Ser. No. 11/240,788, "Proximity Detector In Handheld Device," filed Sep. 30, 3005; Ser. No. 11/620,702, "Using Ambient Light Sensor To Augment Proximity Sensor Output"; Ser. No. 11/586,862, "Automated Response To And Sensing Of User Activity In Portable Devices," filed Oct. 24, 2006; and Ser. No. 11/638,251, "Methods And Systems For Automatic Configuration Of Peripherals," which are hereby incorporated by reference in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The device 100 may also include one or more accelerometers 168. FIGS. 1A and 1B show an accelerometer 168 coupled to the peripherals interface 118. Alternately, the accelerometer 168 may be coupled to an input controller 160 in the I/O subsystem 106. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:
  a contacts module 137 (sometimes called an address book or contact list);
  a telephone module 138;
  a video conferencing module 139;
  an e-mail client module 140;
  an instant messaging (IM) module 141;
  a blogging module 142;
  a camera module 143 for still and/or video images;
  an image management module 144;
  a video player module 145;
  a music player module 146;
  a browser module 147;
  a calendar module 148;
  widget modules 149, which may include weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which merges video player module 145 and music player module 146;
  notes module 153;
  map module 154; and/or
  online video module 155.

Examples of other applications 136 that may be stored in memory 102 include other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the videoconferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124).

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files stored in one or more file formats, such as MP3 or AAC files. In some embodiments, the device 100 may include the functionality of an MP3 player, such as an iPod (trademark of Apple Computer, Inc.).

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

In conjunction with touch screen 112, display controller 156, contact module 130, graphics module 132, and text input module 134, the notes module 153 may be used to create and manage notes, to do lists, and the like.

In conjunction with RF circuitry 108, touch screen 112, display system controller 156, contact module 130, graphics module 132, text input module 134, GPS module 135, and browser module 147, the map module 154 may be used to receive, display, modify, and store maps and data associated with maps (e.g., driving directions; data on stores and other points of interest at or near a particular location; and other location-based data).

In conjunction with touch screen 112, display system controller 156, contact module 130, graphics module 132, audio circuitry 110, speaker 111, RF circuitry 108, text input module 134, e-mail client module 140, and browser module 147, the online video module 155 allows the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device. Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
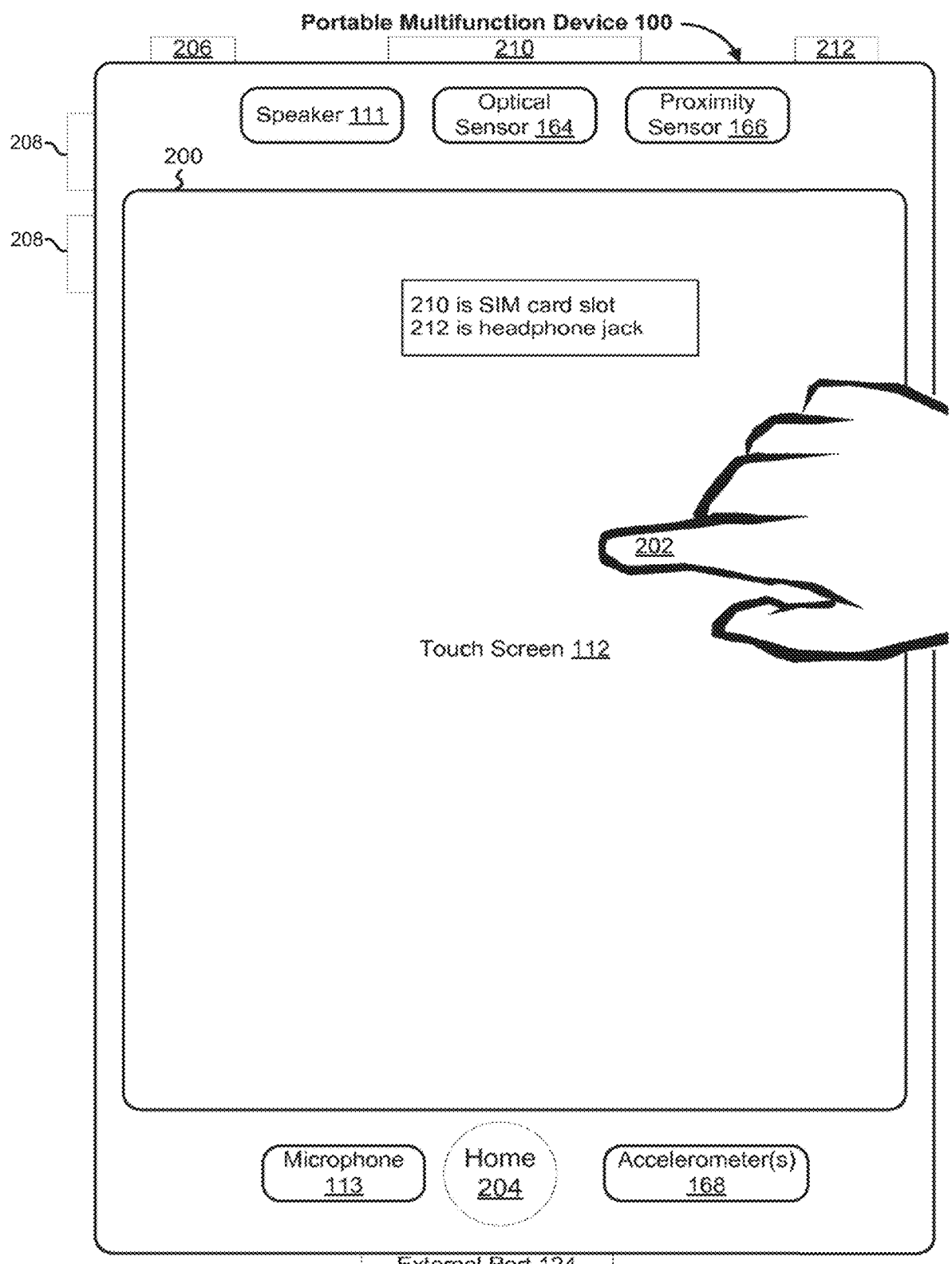
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, volume adjustment button(s) 208, a Subscriber Identity Module (SIM) card slot 210, a head set jack 212, and a docking/charging external port 124. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
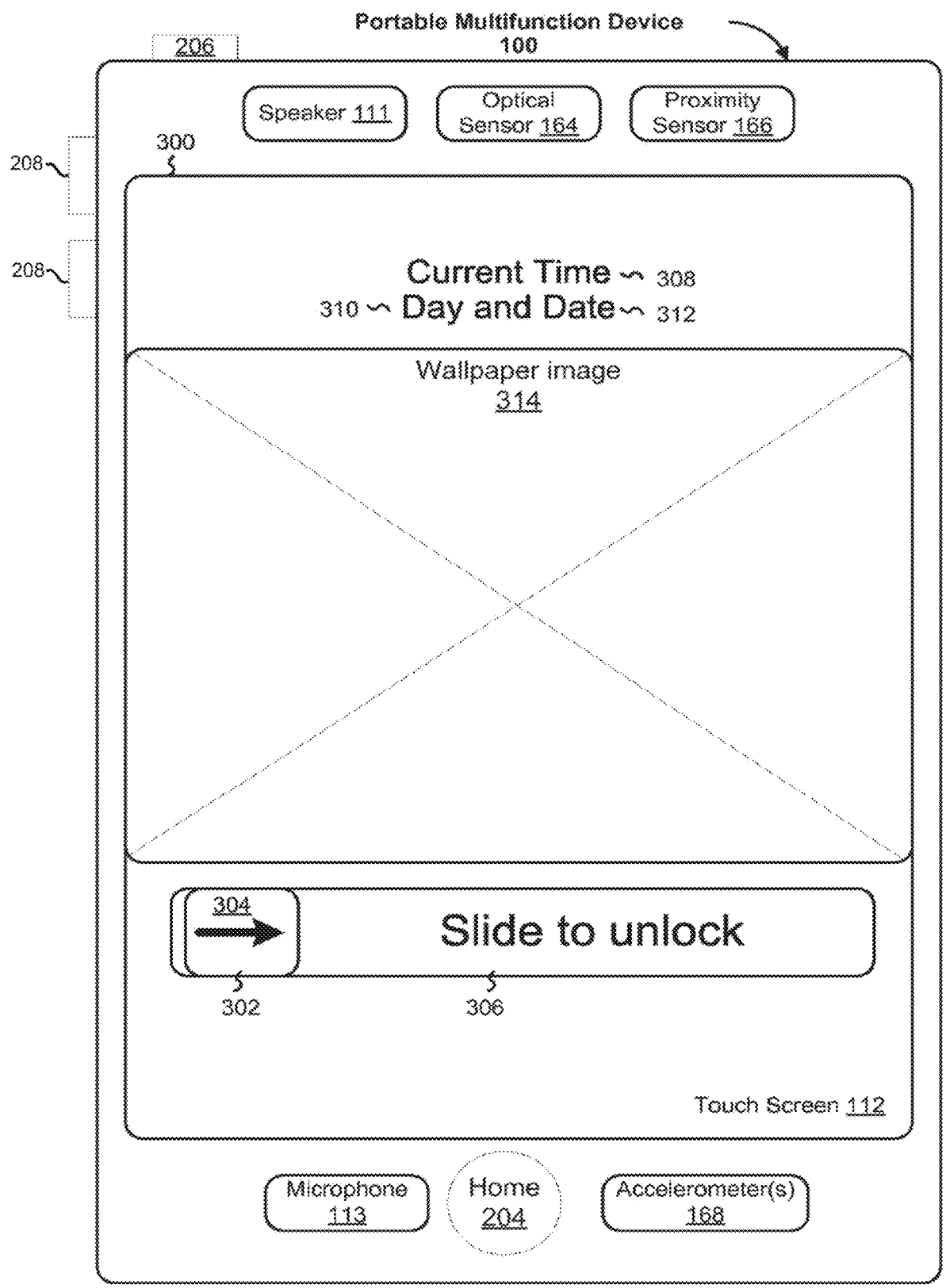
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:
Unlock image 302 that is moved with a finger gesture to unlock the device;
Arrow 304 that provides a visual cue to the unlock gesture;
Channel 306 that provides additional cues to the unlock gesture;
Time 308;
Day 310;
Date 312; and
Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. No. 11/322,549, "Unlocking A Device By Performing Gestures On An Unlock Image," filed Dec. 23, 2005, and Ser. No. 11/322,550, "Indication Of Progress Towards Satisfaction Of A User Input Condition," filed Dec. 23, 2005, which are hereby incorporated by reference in their entirety.

Figure 4A:
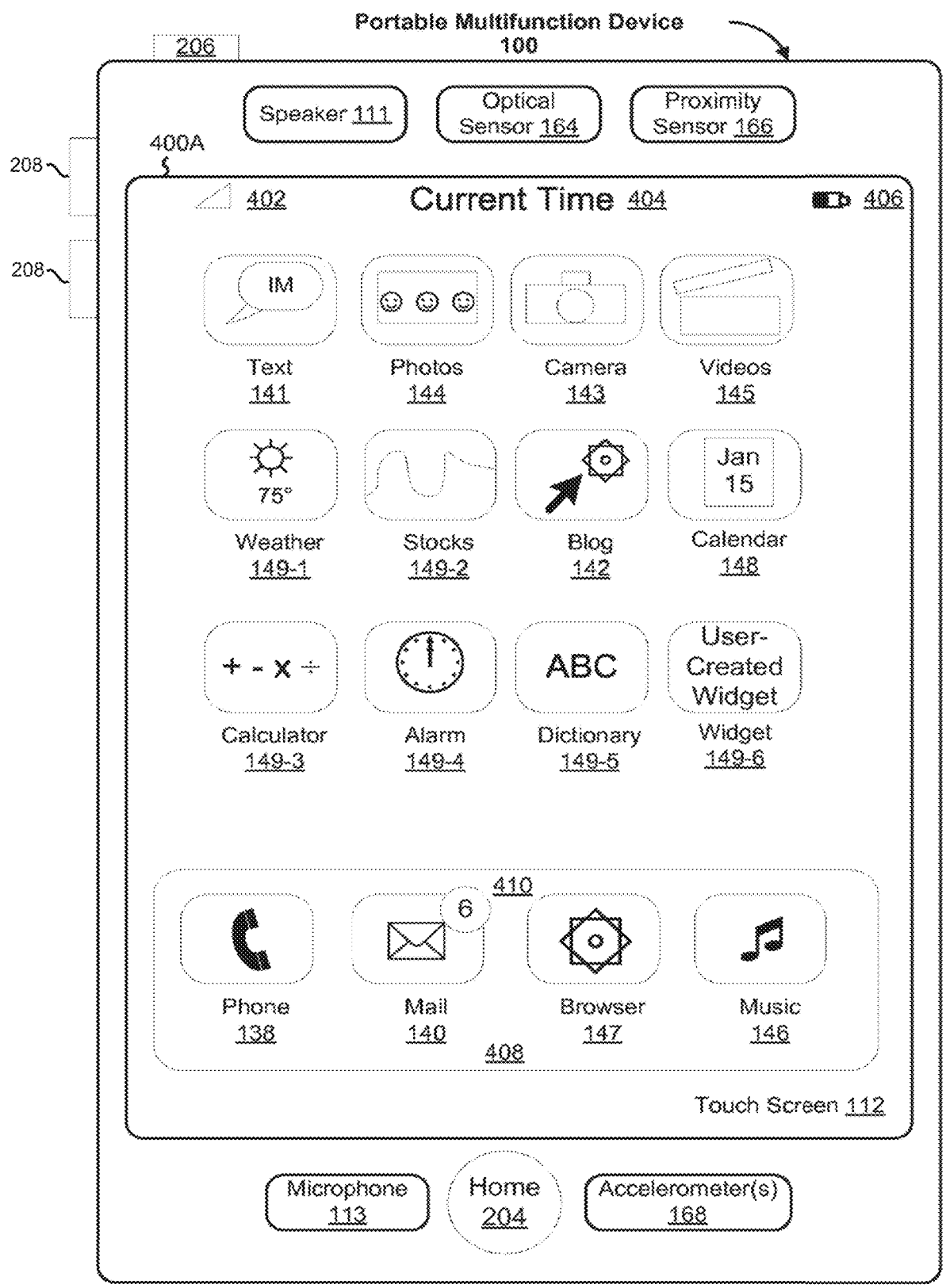
FIGS. 4A and 4B illustrate exemplary user interfaces for a menu of applications on a portable multifunction device in accordance with some embodiments.
Figure 4B:
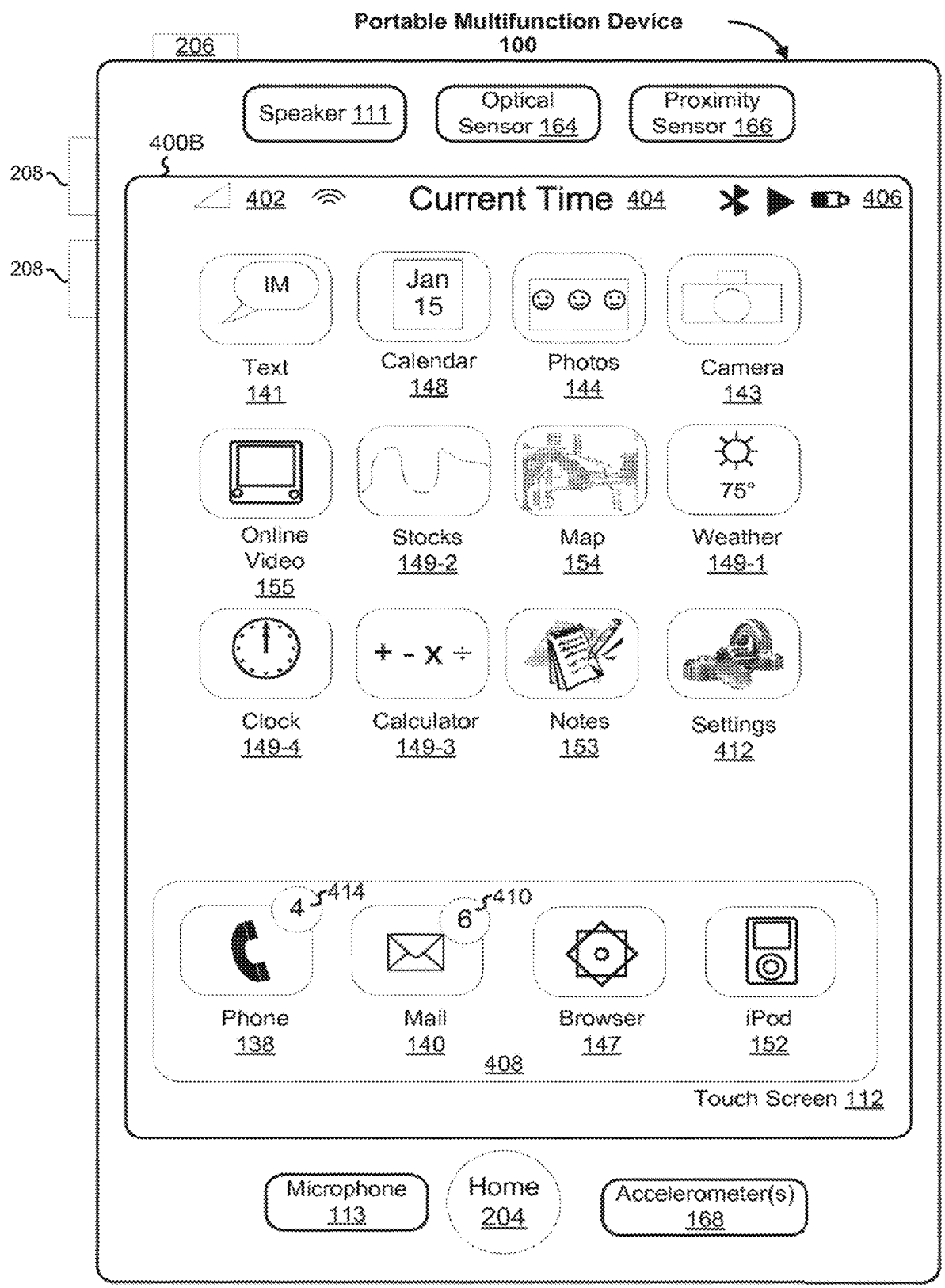

FIGS. 4A and 4B illustrate exemplary user interfaces for a menu of applications on a portable multifunction device in accordance with some embodiments. In some embodiments, user interface 400A includes the following elements, or a subset or superset thereof:
Signal strength indicator(s) 402 for wireless communication(s), such as cellular and Wi-Fi signals;
Time 404;
Battery status indicator 406;
Tray 408 with icons for frequently used applications, such as:
Phone 138, which may include an indicator 414 of the number of missed calls or voicemail messages;
E-mail client 140, which may include an indicator 410 of the number of unread e-mails;
Browser 147; and
Music player 146; and
Icons for other applications, such as:
IM 141;
Image management 144;
Camera 143;
Video player 145;
Weather 149-1;
Stocks 149-2;
Blog 142;
Calendar 148;
Calculator 149-3;
Alarm clock 149-4;
Dictionary 149-5; and
User-created widget 149-6.

In some embodiments, user interface 400B includes the following elements, or a subset or superset thereof:
402, 404, 406, 141, 148, 144, 143, 149-3, 149-2, 149-1, 149-4, 410, 414, 138, 140, and 147, as described above;
Bluetooth indicator 405;
Map 154;
Notes 153;
Settings 412, which provides access to settings for the device 100 and its various applications 136, as described further below;
Video and music player module 152, also referred to as iPod (trademark of Apple Computer, Inc.) module 152; and
Online video module 155, also referred to as YouTube (trademark of Google, Inc.) module 155.

In some embodiments, UI 400A or 400B displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400A or 400B provides integrated access to both widget-based applications and non-widget-based applications. In some embodiments, all of the widgets, whether user-created or not, are displayed in UI 400A or 400B. In other embodiments, activating the icon for user-created widget 149-6 may lead to another UI that contains the user-created widgets or icons corresponding to the user-created widgets.

In some embodiments, a user may rearrange the icons in UI 400A or 400B, e.g., using processes described in U.S. patent application Ser. No. 11/459,602, "Portable Electronic Device With Interface Reconfiguration Mode," filed Jul. 24, 2006, which is hereby incorporated by reference in its entirety. For example, a user may move application icons in and out of tray 408 using finger gestures.

In some embodiments, UI 400A or 400B includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference in its entirety.

Figure 5A:
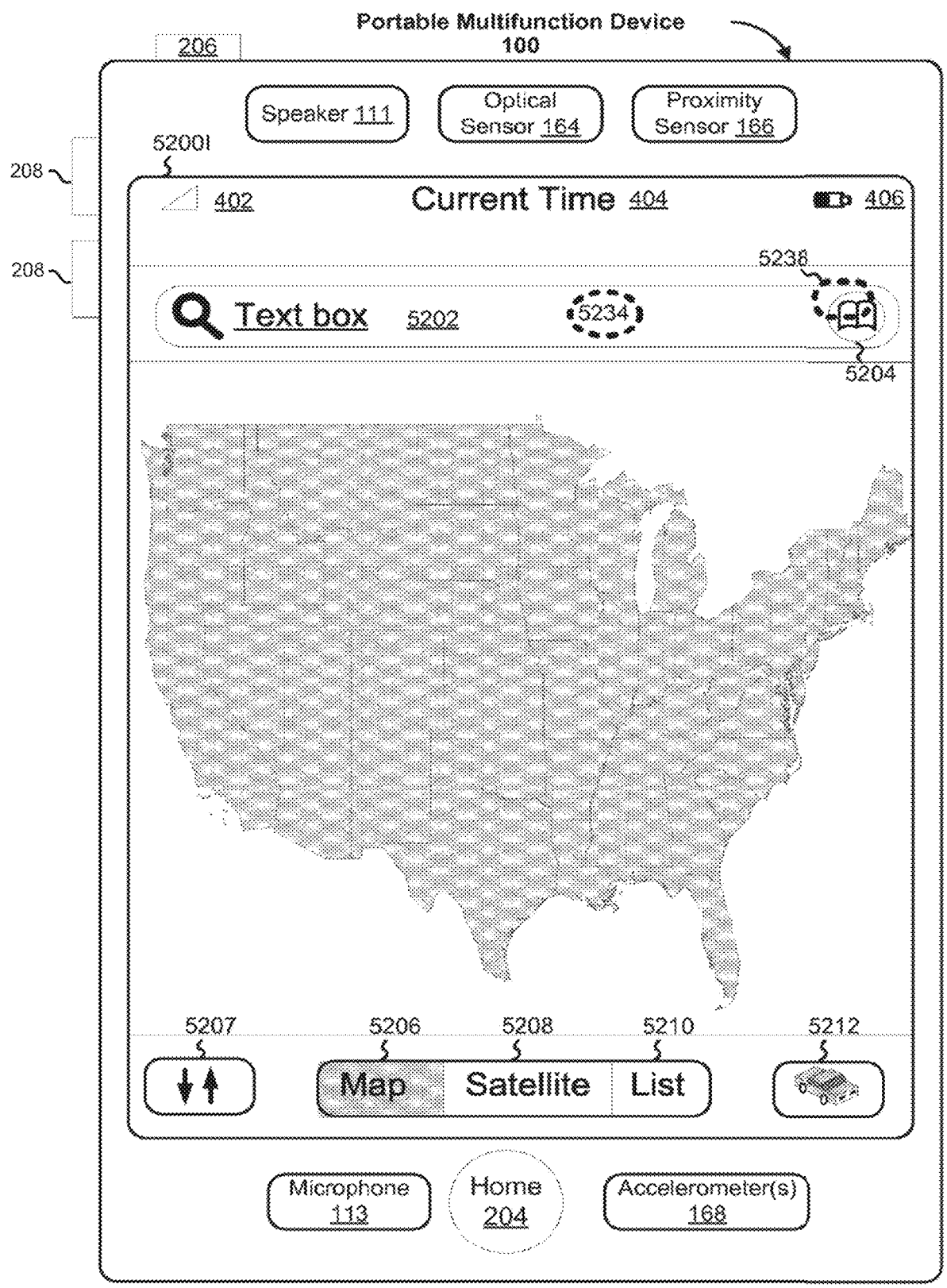
FIGS. 5A-5AA illustrate exemplary user interfaces for a map application in accordance with some embodiments.

FIGS. 5A-5AA illustrate exemplary user interfaces for a map application in accordance with some embodiments.

In some embodiments, a computer-implemented method is performed at a portable electronic device (e.g., 100) with a touch screen display 112.

In some embodiments, in response to detecting a finger gesture 5230 (e.g., a finger tap gesture) on a search icon 5232 (FIG. 5C), the device displays a search term input area 5202 (e.g., text input box, FIG. 5A) for entering one or more search terms.

In some embodiments, in response to detecting a finger gesture 5234 (e.g., a finger tap gesture) on the search term input area, the device displays a keyboard 5236 for entering the one or more search terms.

Figure 5B:
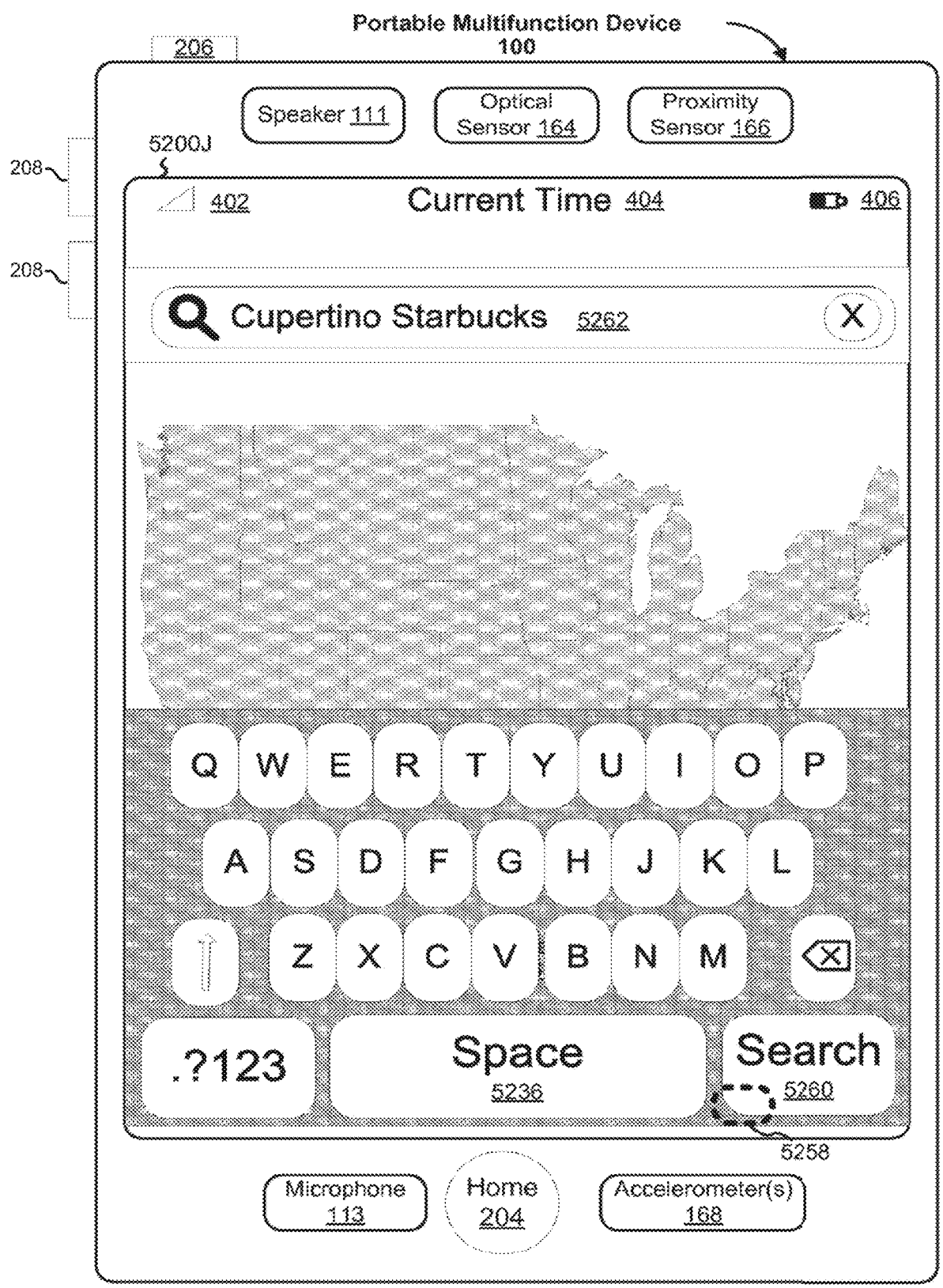

In some embodiments, in response to detecting a finger gesture 5238 (e.g., a finger tap gesture) on an input icon 5204 (FIG. 5A) associated with the search term input area 5202, the device displays a list 5240 (FIG. 5F) of bookmarked locations 5242. In response to detecting a finger gesture 5244 (e.g., a finger tap gesture) on a bookmarked location (e.g., 5242-3) in the list 5240 of bookmarked locations, an area corresponding to the bookmarked location is displayed on a digital map (not shown).

In some embodiments, in response to detecting a finger gesture 5238 (e.g., a finger tap gesture) on an input icon 5204 associated with the search term input area 5202, the device displays a list 5246 (FIG. 5H) of recent queries 5248 by a user. In response to detecting a finger gesture 5250 (e.g., a finger tap gesture) on a recent query (e.g., 5248-6) in the list 5246 of recent queries by a user, results corresponding to the recent query are displayed on a digital map (not shown).

In some embodiments, in response to detecting a finger gesture 5238 (e.g., a finger tap gesture) on an input icon 5204 (FIG. 5A) associated with the search term input area 5202, the device displays a list 5252 (FIG. 5J) of contacts 5254. In response to detecting a finger gesture 5256 (e.g., a finger tap gesture) on a contact (e.g., 5254-3) in the list of contacts, an area associated with the contact (e.g., an area that includes an address associated with the contact 5254-3 in the contact list) is displayed on a digital map (not shown).

In some embodiments, in response to detecting a finger gesture 5238 (e.g., a finger tap gesture) on an input icon 5204 (FIG. 5A) associated with the search term input area 5202, the device displays either:
- a list 5240 (FIG. 5F) of bookmarked locations 5242, wherein in response to detecting a finger gesture 5244 (e.g., a finger tap gesture) on a bookmarked location (e.g., 5242-3) in the list 5240 of bookmarked locations, an area corresponding to the bookmarked location is displayed on a digital map (not shown);
- a list 5246 (FIG. 5H) of recent queries 5248 by a user, wherein in response to detecting a finger gesture 5250 (e.g., a finger tap gesture) on a recent query (e.g., 5248-6) in the list 5246 of recent queries by a user, results corresponding to the recent query are displayed on a digital map (not shown); or
- a list 5252 (FIG. 5J) of contacts 5254, wherein in response to detecting a finger gesture 5256 (e.g., a finger tap gesture) on a contact (e.g., 5254-3) in the list of contacts, an area associated with the contact (e.g., an area that includes an address associated with the contact 5254-3 in the contact list) is displayed on a digital map (not shown).

In some embodiments, the list (i.e., 5240, 5246, or 5252) which is displayed in response to finger gesture 5238 (e.g., a finger tap gesture) on input icon 5204 corresponds to the list (i.e., 5240, 5246, or 5252) that was most recently displayed prior to finger gesture 5238.

Figure 5C:
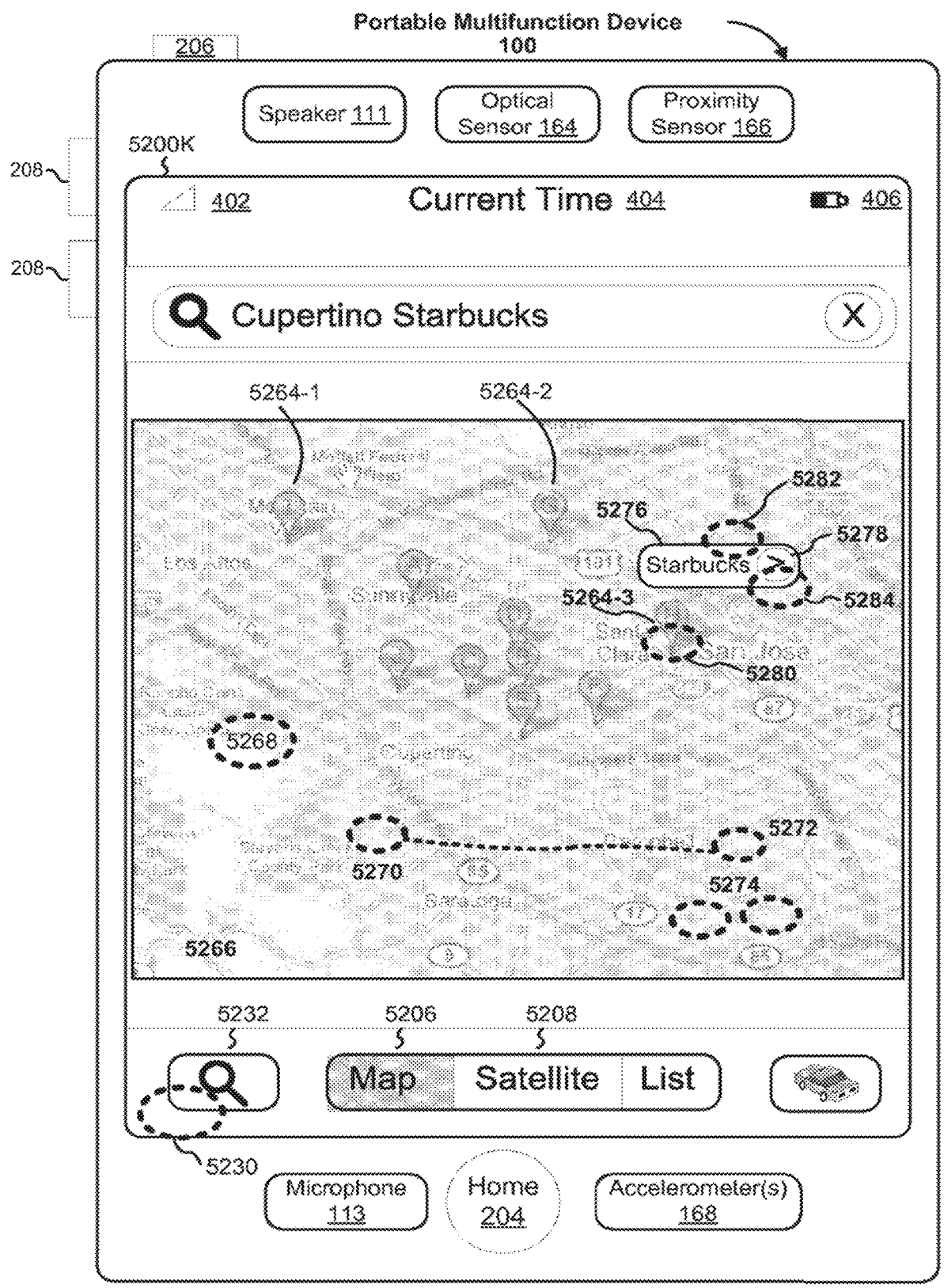

In some embodiments, in response to detecting a finger gesture 5258 (e.g., a finger tap gesture) on a search initiation icon 5260 (FIG. 5B), the device: sends one or more entered search terms 5262 (e.g., Cupertino Starbucks) to a remote computer (e.g., a map application server), receives one or more search results, and displays at least some of the search results 5264 on a digital map 5266 (FIG. 5C). In some embodiments, the digital map comprises a graphic image, a satellite image, or a hybrid combination of a graphic image and a satellite image. For example, the search results may be displayed on a graphical map if map icon 5206 is selected (FIG. 5C), whereas the search results may be displayed on a satellite image if satellite icon 5208 is selected.

In some embodiments, in response to detecting a single finger tap gesture 5268 (FIG. 5C) on the digital map, the device magnifies the area near the single finger tap gesture 5268. In some embodiments, the tap gesture is a single tap. In some embodiments, the tap gesture is a double tap. In some embodiments, the magnification includes a zoom-in animation.

In some embodiments, in response to detecting a finger down gesture 5270 and a finger drag gesture 5272 on the digital map 5266 (FIG. 5C), the device translates the digital map 5266 on the touch screen display in accordance with the finger drag gesture 5272.

In some embodiments, in response to detecting a two finger tap gesture 5274 (FIG. 5C) on the digital map, the device demagnifies the area near the two finger tap gesture 5274. In some embodiments, the tap gesture is a single tap. In some embodiments, the tap gesture is a double tap. In some embodiments, the demagnification includes a zoom-out animation.

Figure 5D:
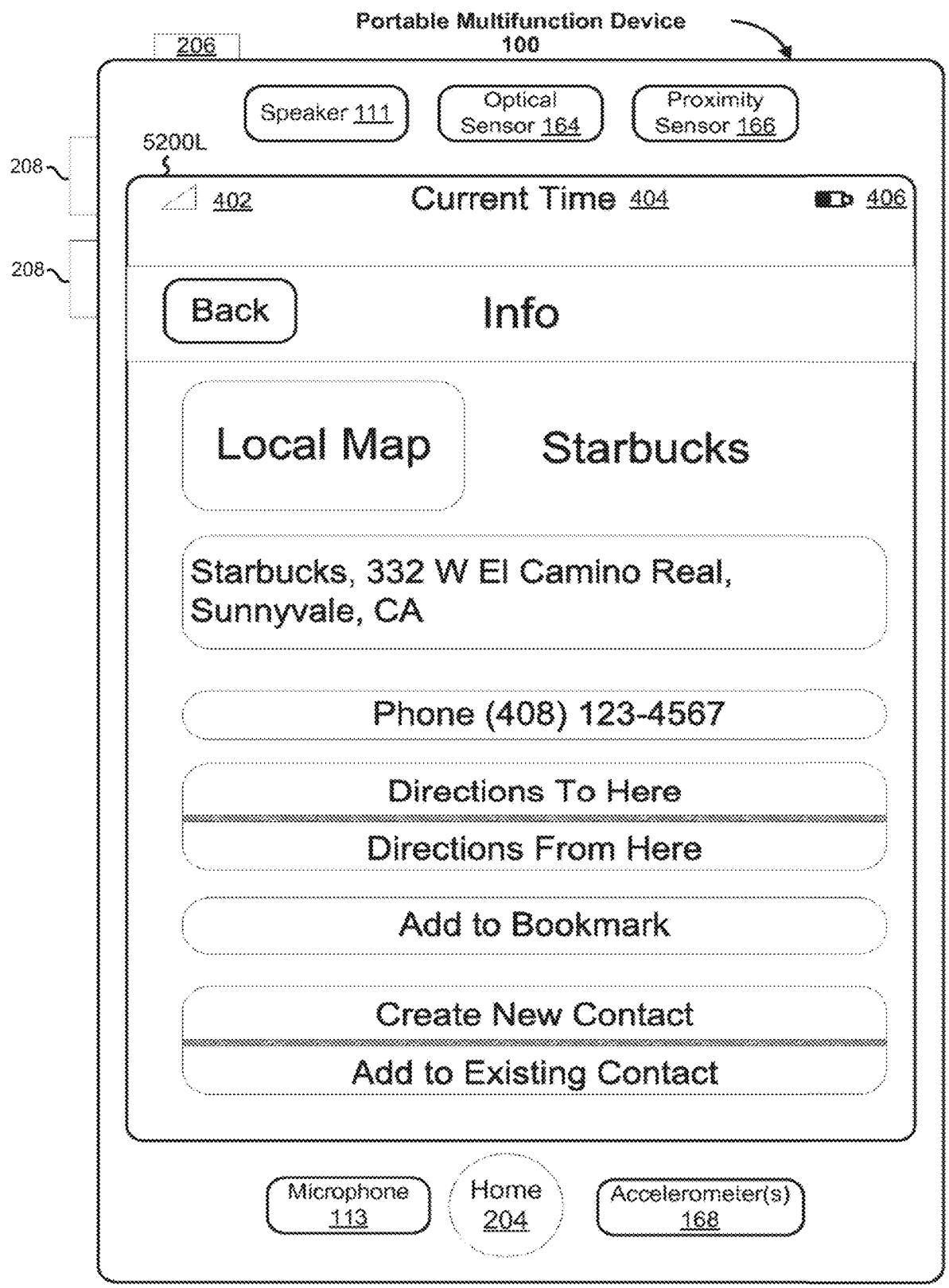

In some embodiments, a first respective icon (e.g., 5264-3, FIG. 5C) is displayed for a respective search result, wherein in response to detecting a finger gesture 5280 on the first respective icon, a second respective icon 5276 for the respective search result is displayed. In some embodiments, in response to detecting a finger gesture 5282 on the second respective icon, an interface 5200L (FIG. 5D) for the respective search result is displayed.

In some embodiments, a first respective icon (e.g., 5264-3, FIG. 5C) is displayed for a respective search result, wherein in response to detecting a finger gesture 5280 on the first respective icon, a second respective icon 5276 and a third respective icon 5278 for the respective search result are displayed. In some embodiments, in response to detecting a finger gesture 5280 on the second respective icon, the second respective icon and the third respective icon cease to be displayed. In some embodiments, in response to detecting a finger gesture 5284 on the third respective icon, an interface 5200L (FIG. 5D) for the respective search result is displayed.

In some embodiments, a respective icon (e.g., 5278) is displayed for a respective search result, wherein in response to detecting a finger gesture 5284 on the respective icon, an interface 5200L (FIG. 5D) is displayed for the respective search result.

Figure 5E:
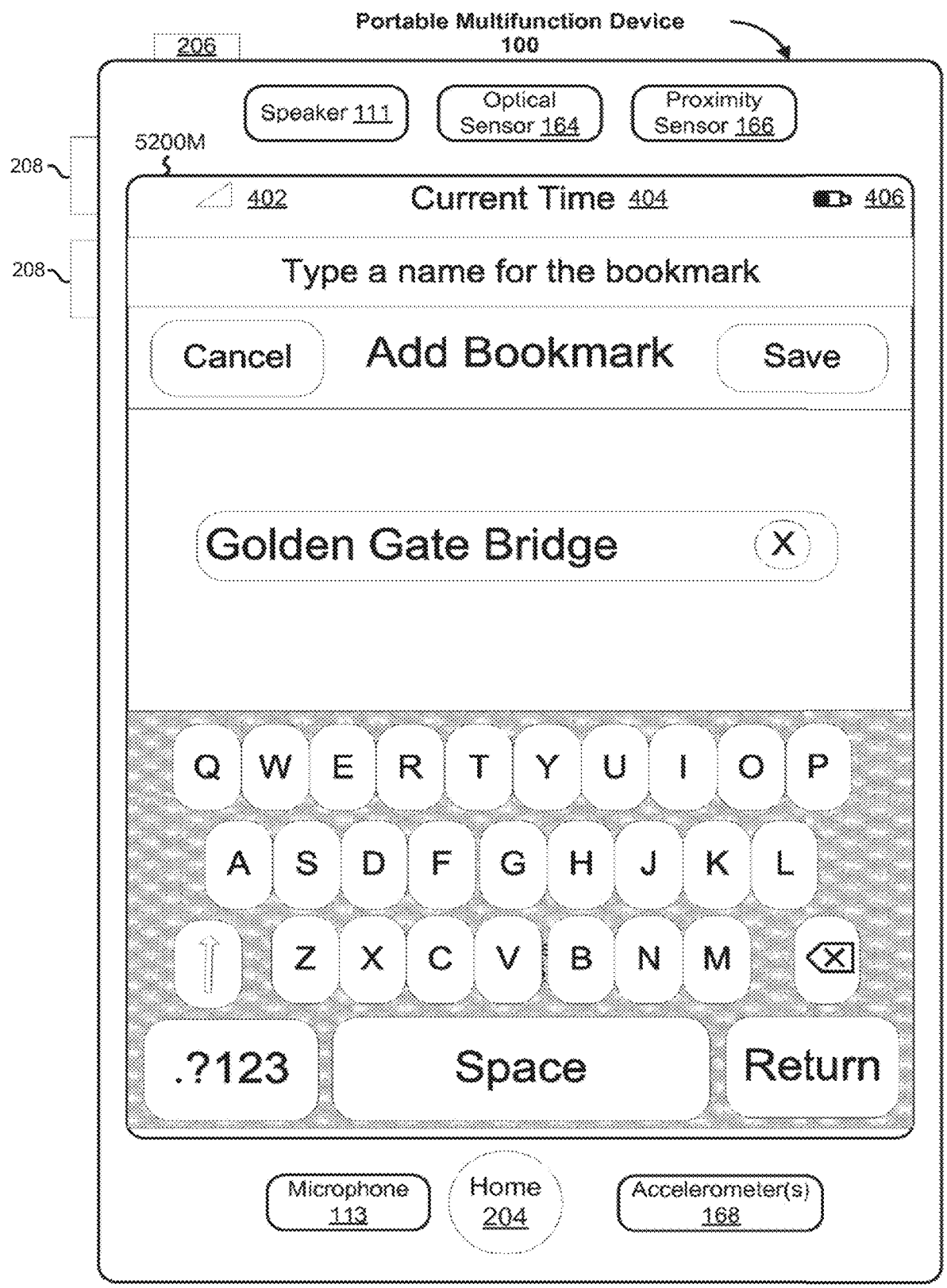
Figure 5F:
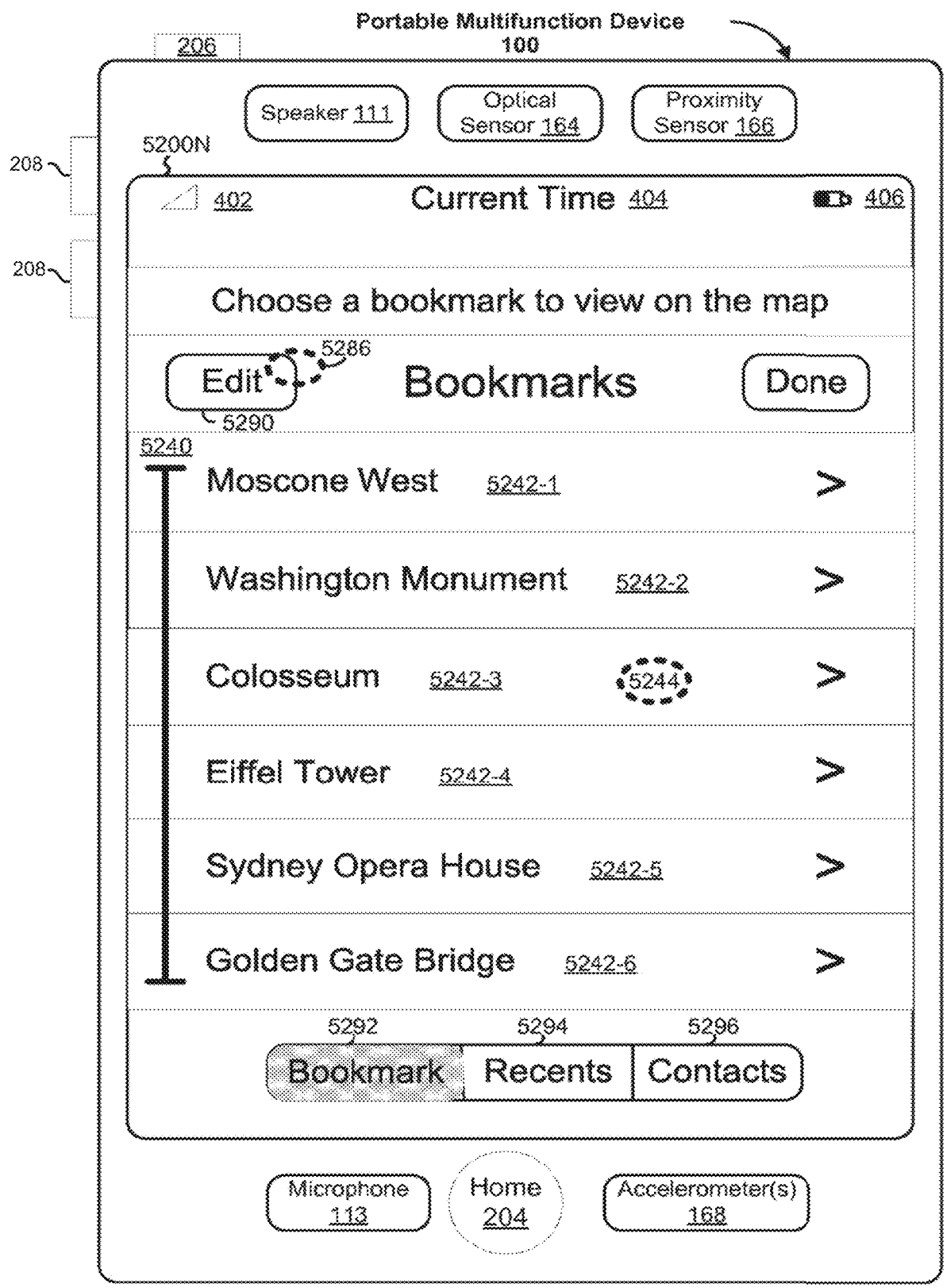

In some embodiments, the interface 5200L (FIG. 5D) for the respective search result includes:
a name for the respective search result;
a local map of the respective search result;
an electronic address for the respective search result (e.g., a URL);
a physical address for the respective search result;
a phone number associated with the respective search result, which when activated by a finger gesture initiates a phone call to the phone number;
an icon that when activated by a finger gesture enters the physical address as an end point in a request for directions (e.g., "Directions to here" icon);
an icon that when activated by a finger gesture enters the physical address as a starting point in a request for directions (e.g., "Directions from here" icon);
an icon that when activated by a finger gesture initiates creation of a bookmark for the respective search result (e.g., "Add to bookmarks" icon initiates creation of a bookmark via interface 5200M, FIG. 5E);
an icon that when activated by a finger gesture initiates creation of a contact list entry for the respective search result (e.g., "Create new contact" icon); and/or
an icon that when activated by a finger gesture initiates addition of the respective search result to an existing contact (e.g., "Add to existing contact" icon).

Figure 5G:
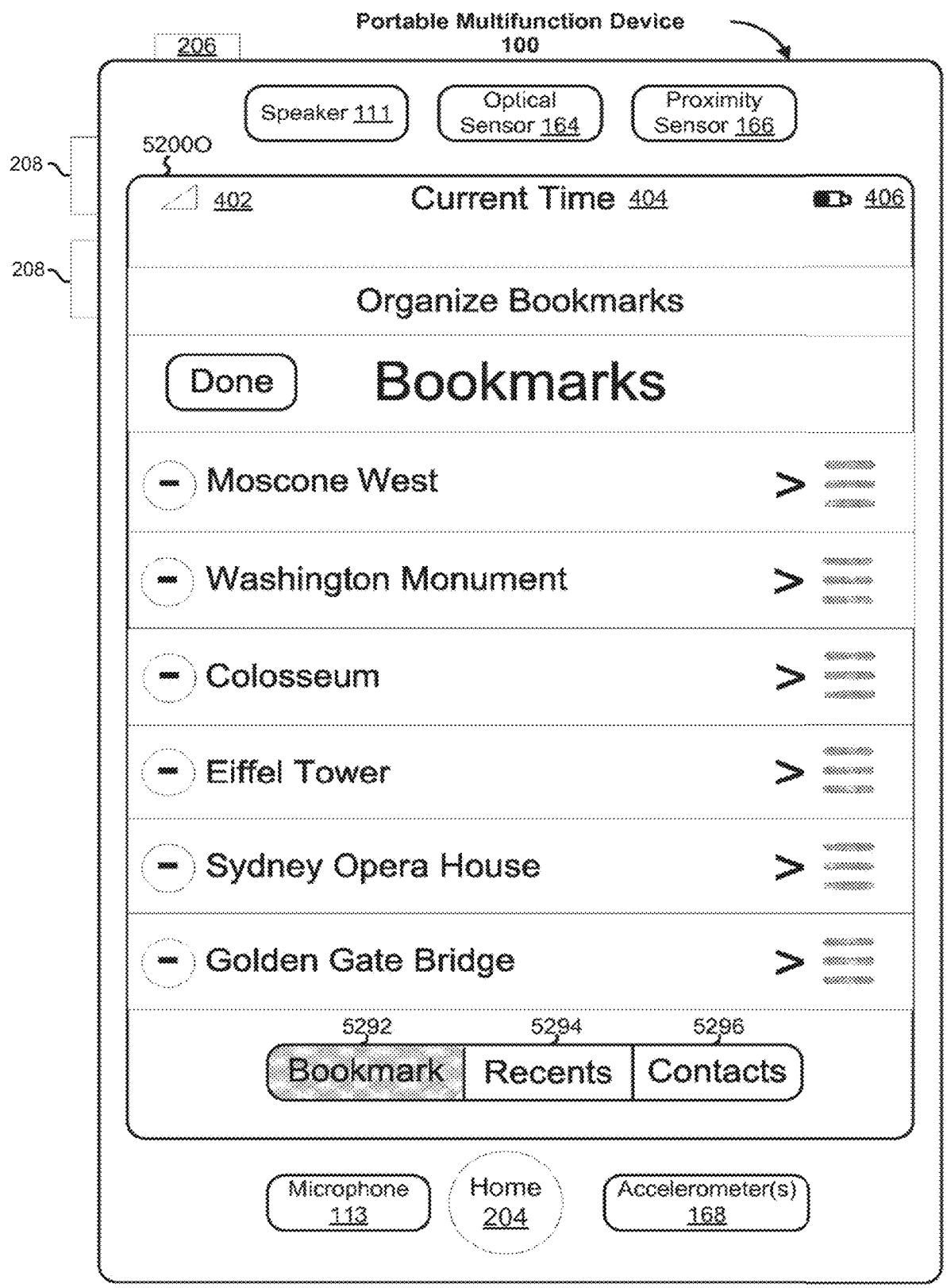
Figure 5H:
Figure 5I:
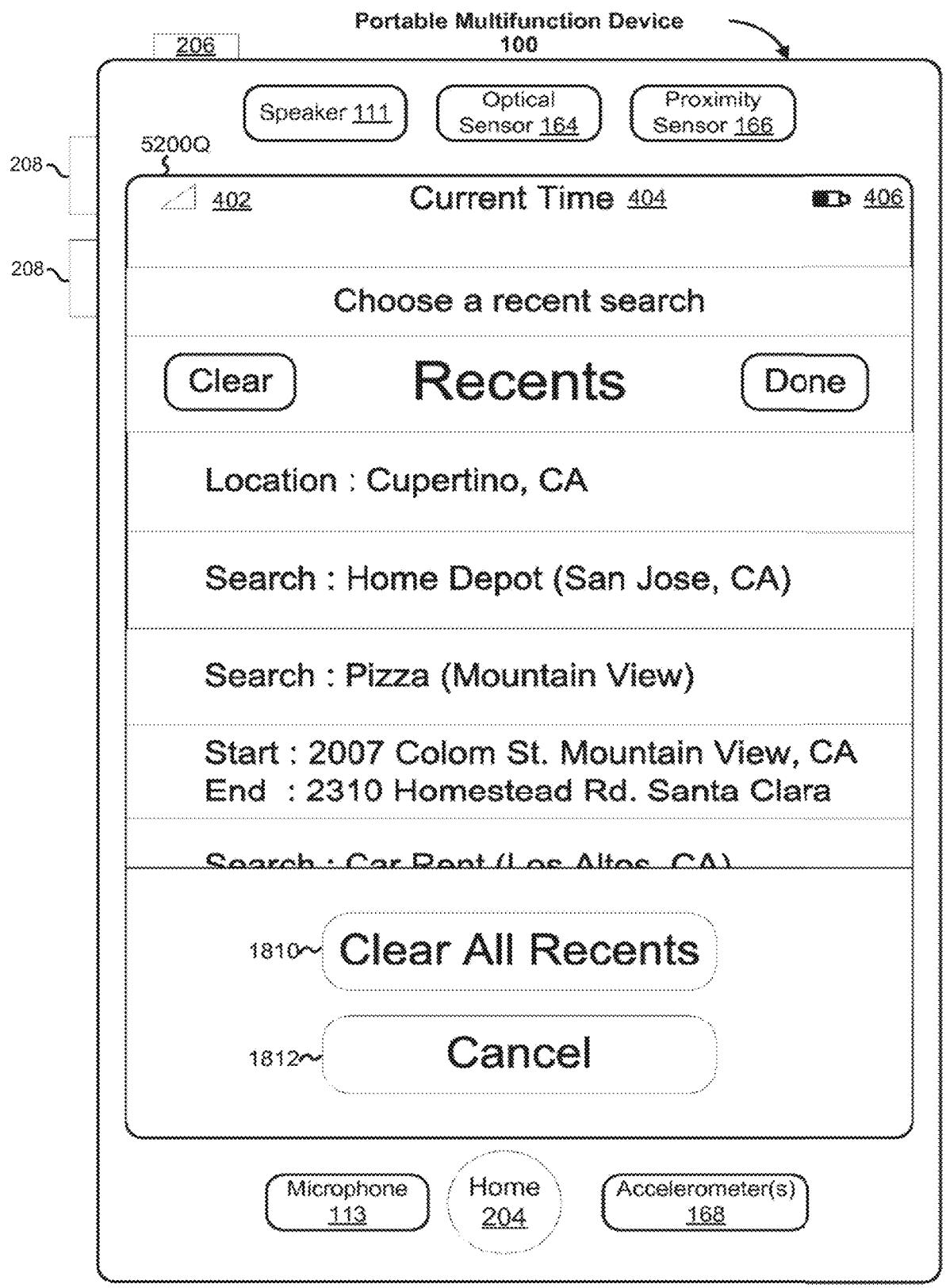
Figure 5J:
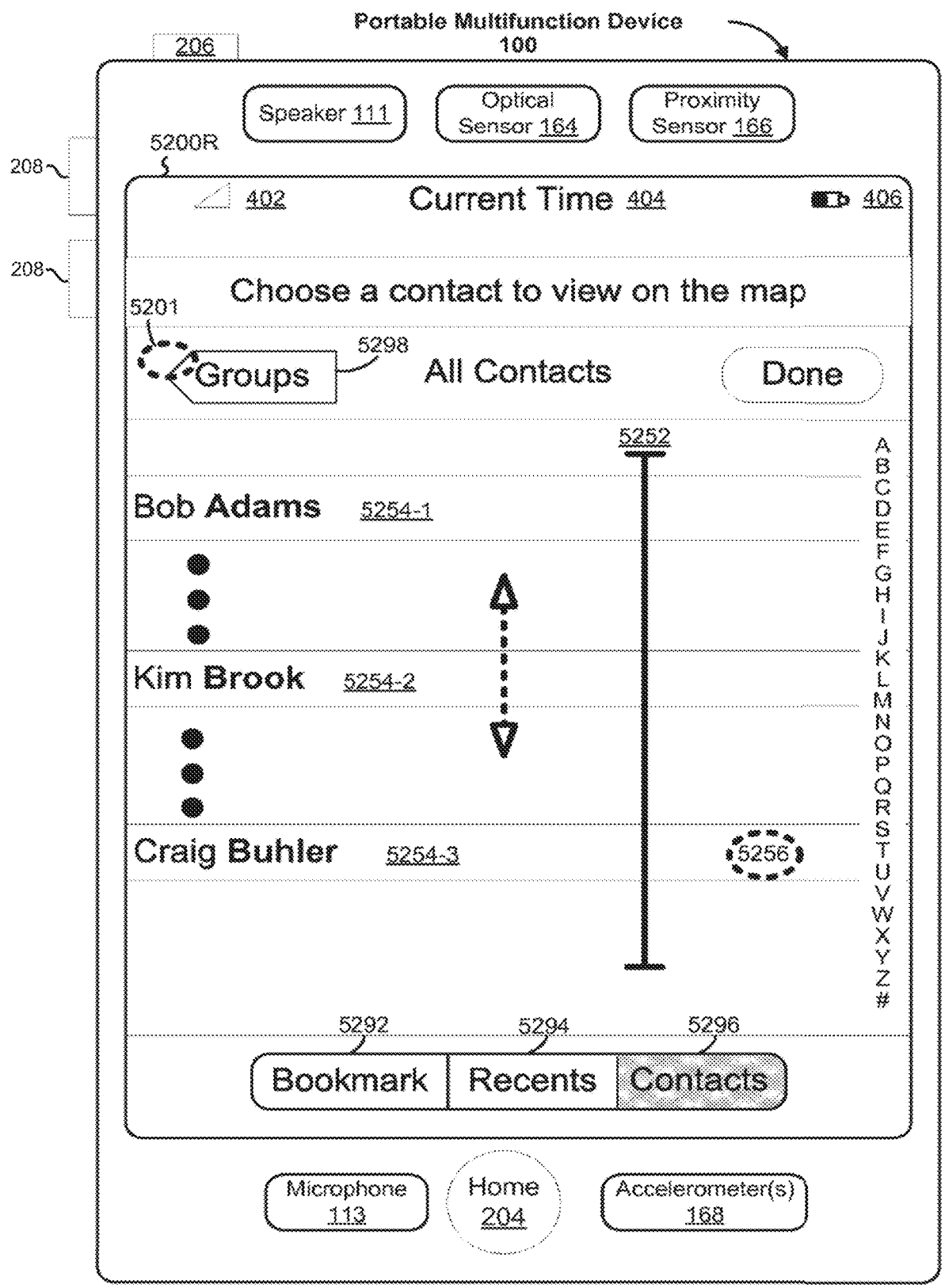

In some embodiments, a bookmarks user interface 5200N (FIG. 5F) includes a list 5240 of locations bookmarked by a user. In some embodiments, in response to detecting a finger gesture 5286 on a configuration icon 5290 (e.g., Edit icon, FIG. 5F) for a list of bookmarks, the device displays respective deletion icons and/or respective moving-affordance icons for respective bookmarks in the list of bookmarks (FIG. 5G). Use of the deletion and moving-affordance icons is described in U.S. Provisional Patent Application Nos. 60/883,814, "Deletion Gestures on a Portable Multifunction Device," filed Jan. 7, 2007, and 60/883,808, "System and Method for Managing Lists," filed Jan. 7, 2007, which applications are incorporated by reference herein in their entirety.

In some embodiments, a user interface 5200P (FIG. 5H) includes a list of recent location, search, and/or mute queries (collectively, a list of recent queries) by a user, in some embodiments, in response to a finger gesture (e.g., a finger tap gesture) on a recent location query, the location is displayed on a digital map or entered as a start or end point in a route search query, depending on context. In some embodiments, in response to a finger gesture (e.g., a finger tap gesture) on a recent search query, the results of the recent search query are displayed on a digital map. In some embodiments, in response to a finger gesture (e.g., a finger tap gesture) on a recent route query, at least a portion of the corresponding routing instructions (e.g., driving directions) are displayed.

Figure 5K:
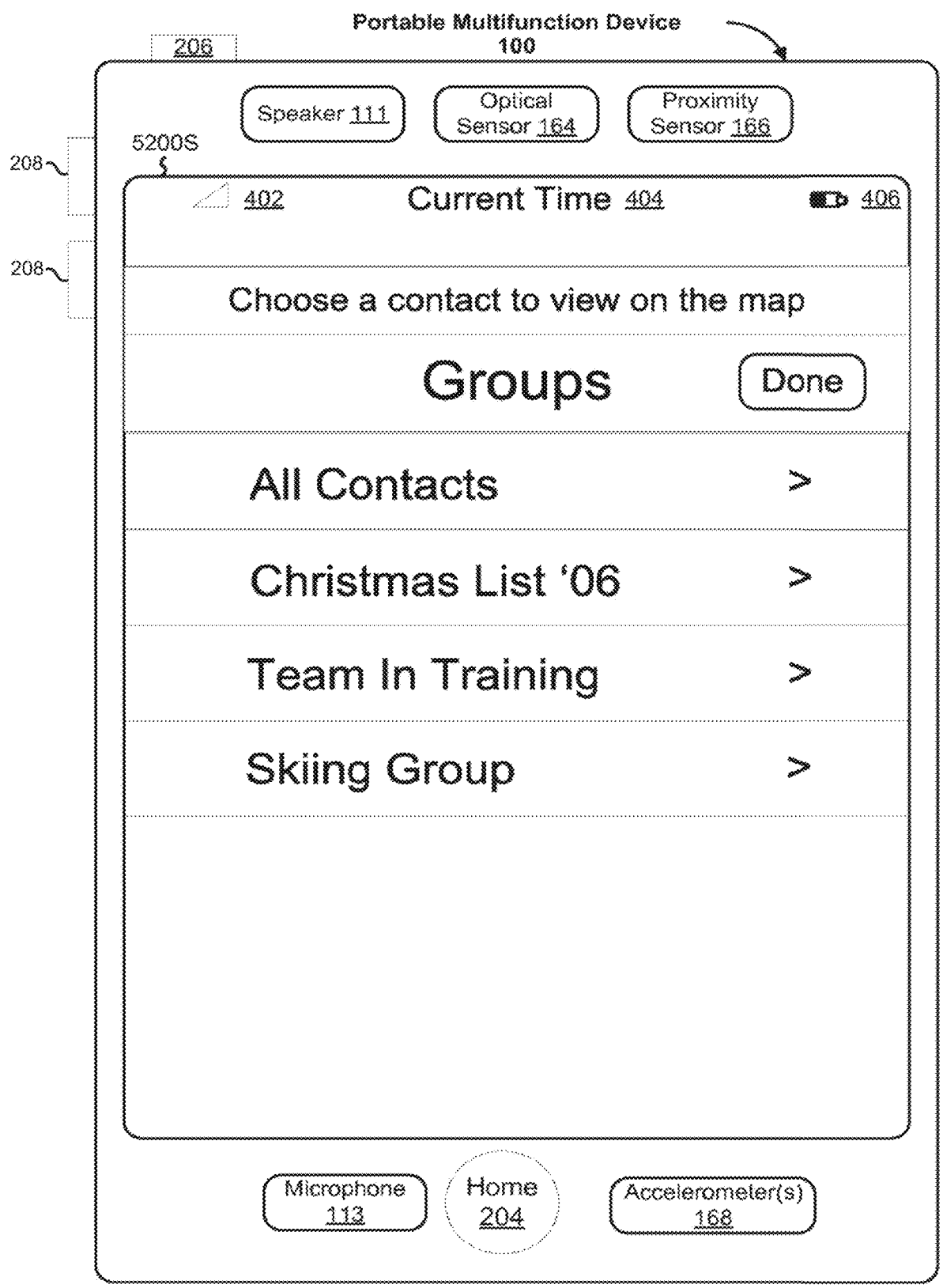
Figure 5L:
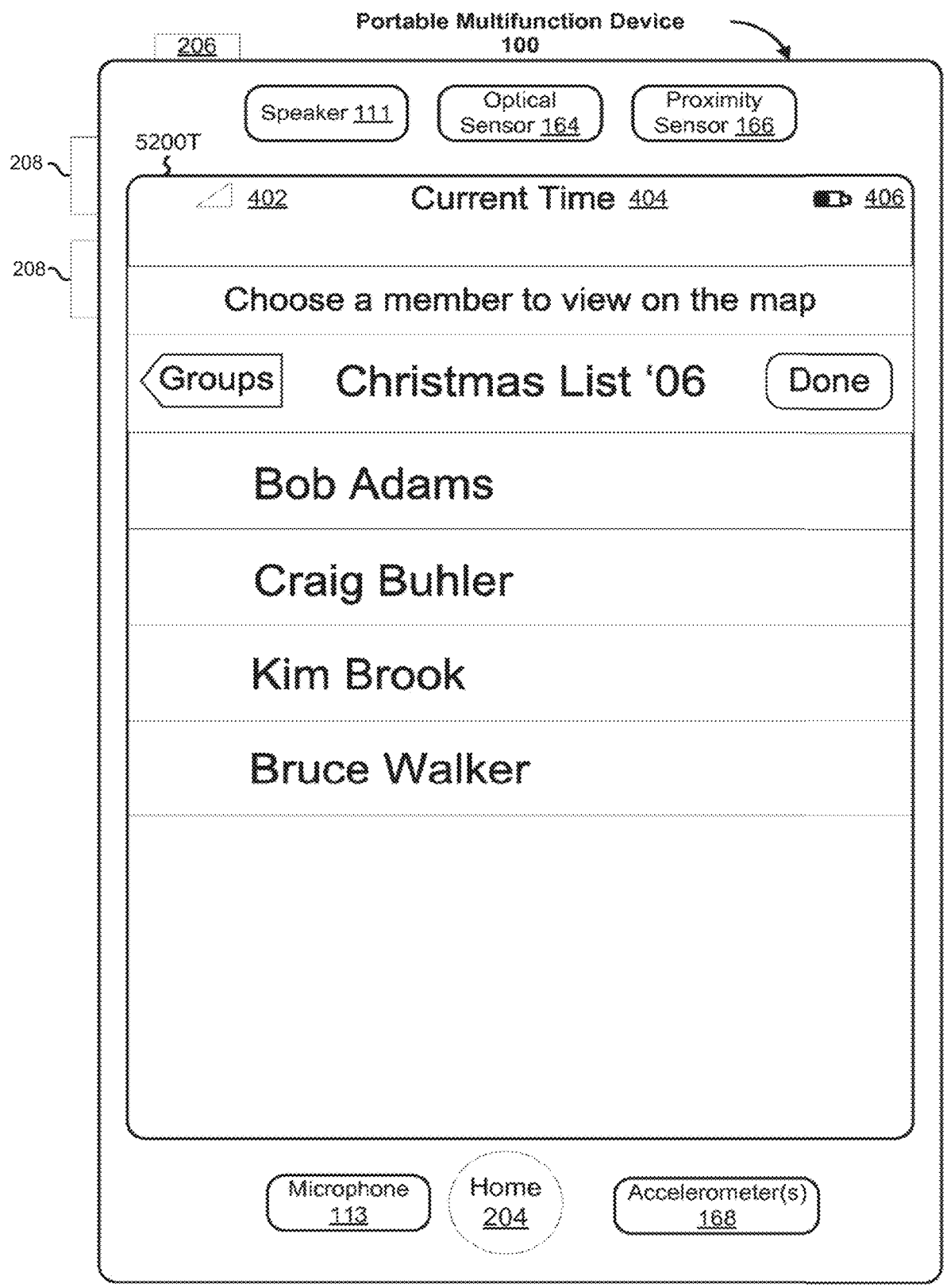

In some embodiments, a contacts UI 5200P (FIG. 5J) includes a list of individual contacts 5254 and an icon 5298 that when activated by a finger gesture 5201 displays a list of groups of contacts (e.g., UI 5200S, FIG. 5K) In some embodiments, in response to detecting a finger gesture 5256 on a contact in the list of contacts, an area associated with the contact (e.g., an area that includes an address associated with the contact in the contact list) is displayed on a digital map.

Figure 5M:
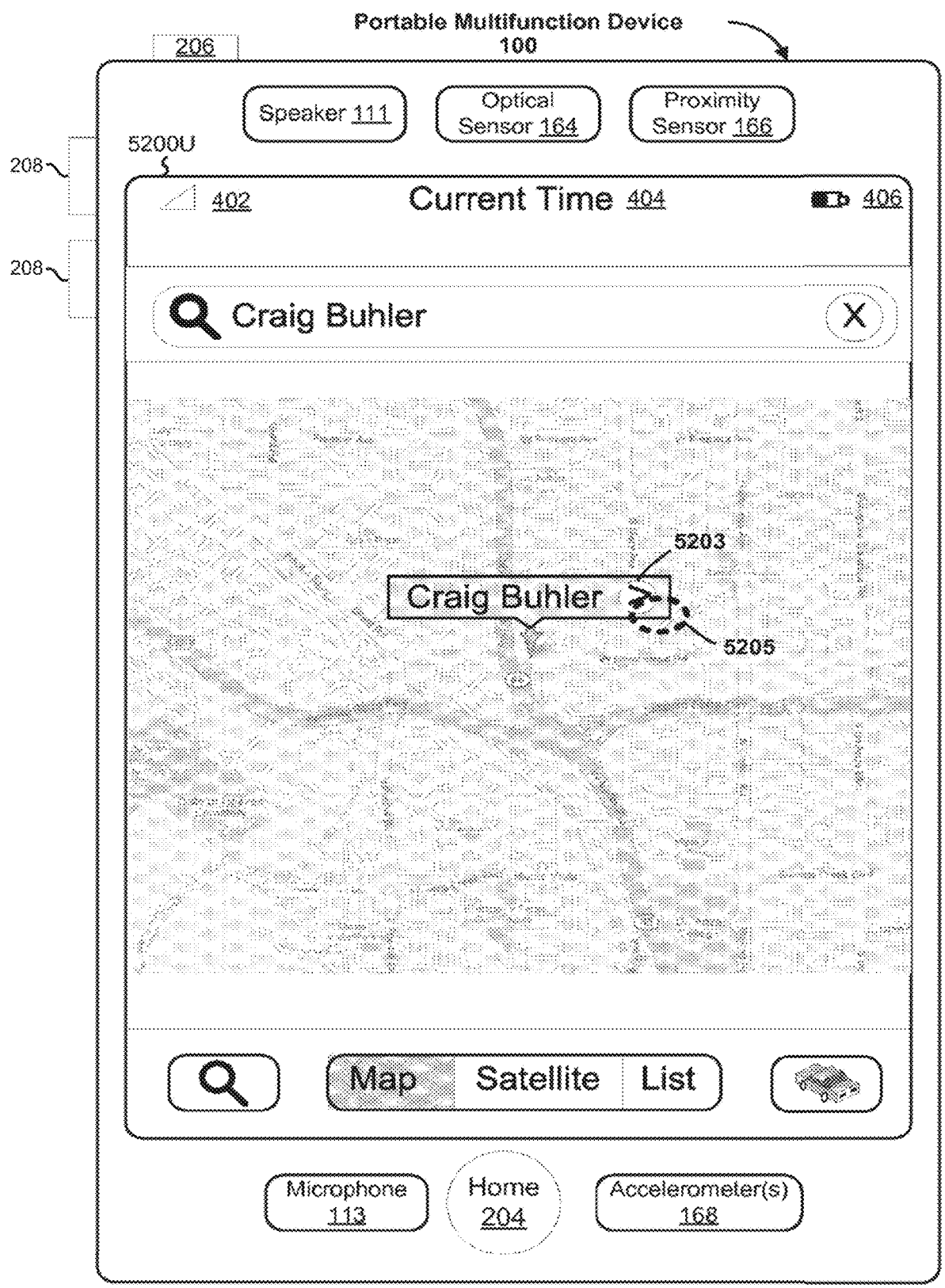
Figure 5N:
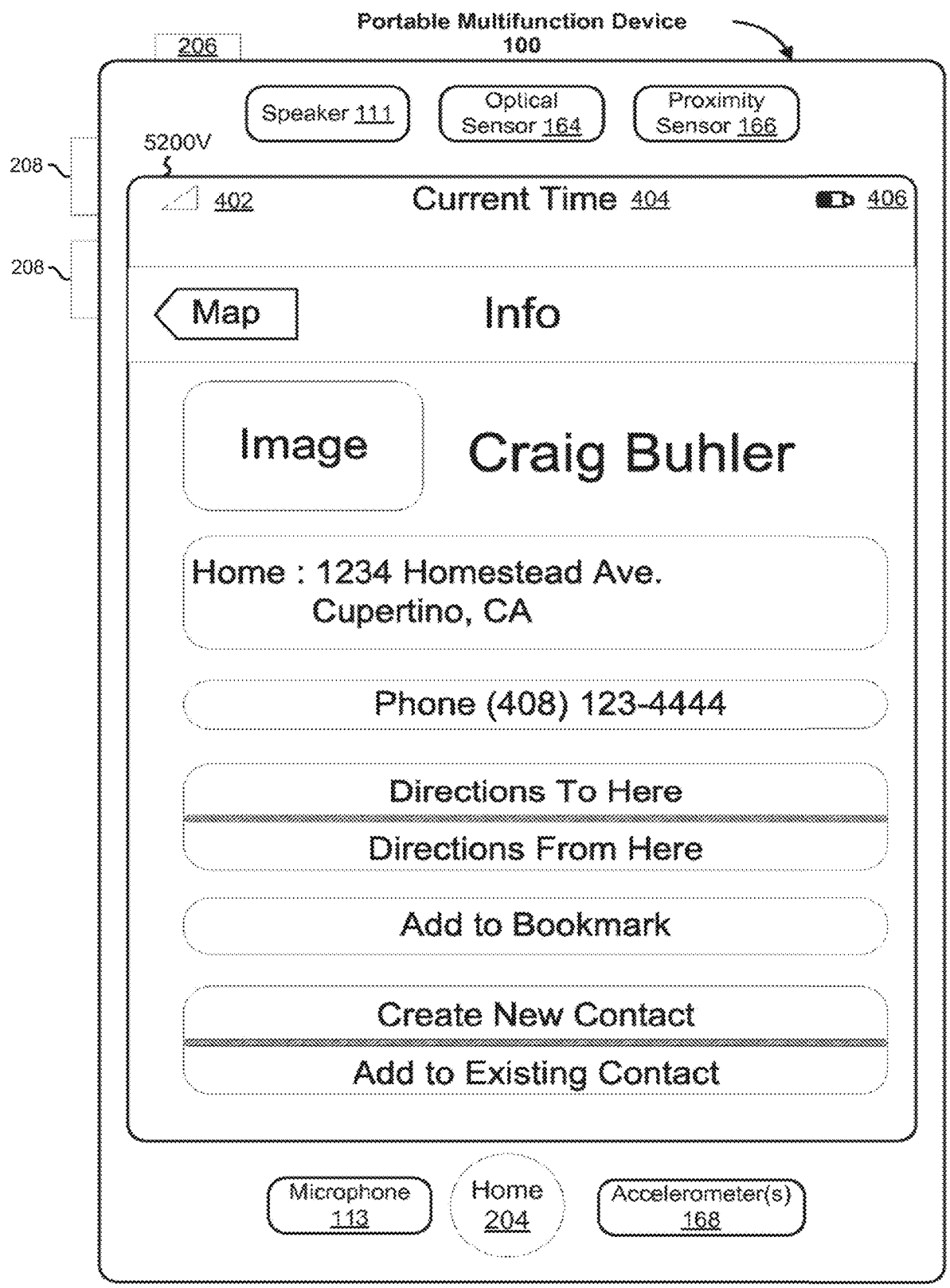

In some embodiments, a respective icon (e.g., icon 5203, FIG. 5M) is displayed for a contact, wherein in response to detecting a finger gesture 5205 on the respective icon, an interface 5200V (FIG. 5N) is displayed for the contact.

Figure 5O:
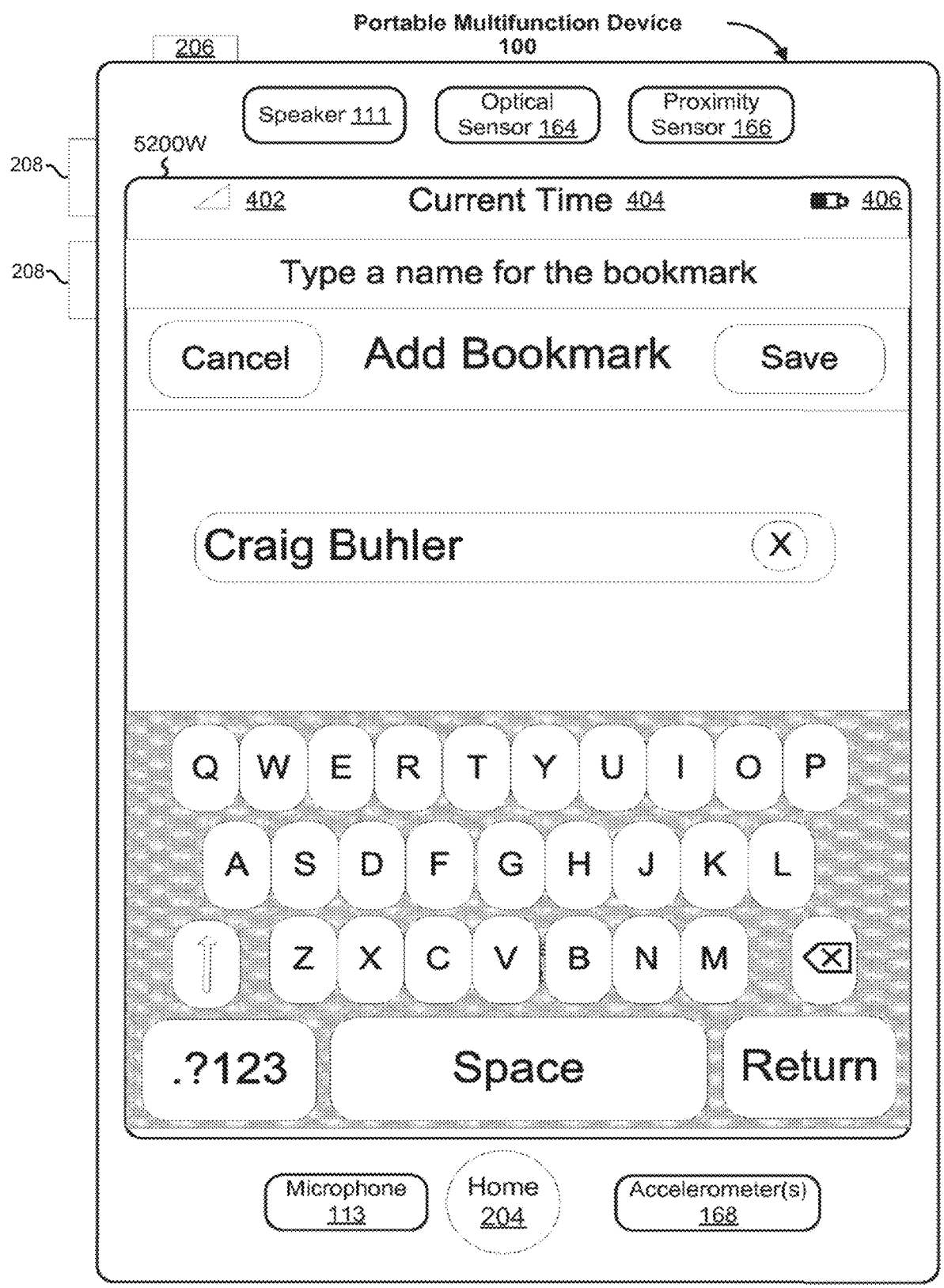

In some embodiments, the interface 5200V for the contact includes:
a name for the contact (e.g., Craig Buhler);
a physical address for the contact;
an image associated with the contact;
an electronic address for the contact (e.g., a URL);
a phone number associated with the contact;
an icon that when activated by a finger gesture enters the physical address for the contact as an end point in a request for directions (e.g., "Directions to here" icon);
an icon that when activated by a finger gesture enters the physical address for the contact as a starting point in a request for directions (e.g., "Directions from here" icon); and/or
an icon that when activated by a finger gesture initiates creation of a bookmark for the contact (e.g., "Add to bookmarks" icon initiates creation of a bookmark via interface 5200W, FIG. 5O).

In some embodiments, in response to finger contacts on icons 5292, 5294, and 5296 in the user interfaces for bookmarks (UI 5200N, FIG. 5F), recent queries (UI 5200P, FIG. 5H), and contacts (UI 5200R, FIG. 5J), the device displays the corresponding user interface, which makes navigating between these interfaces simple and intuitive.

Figure 5P:
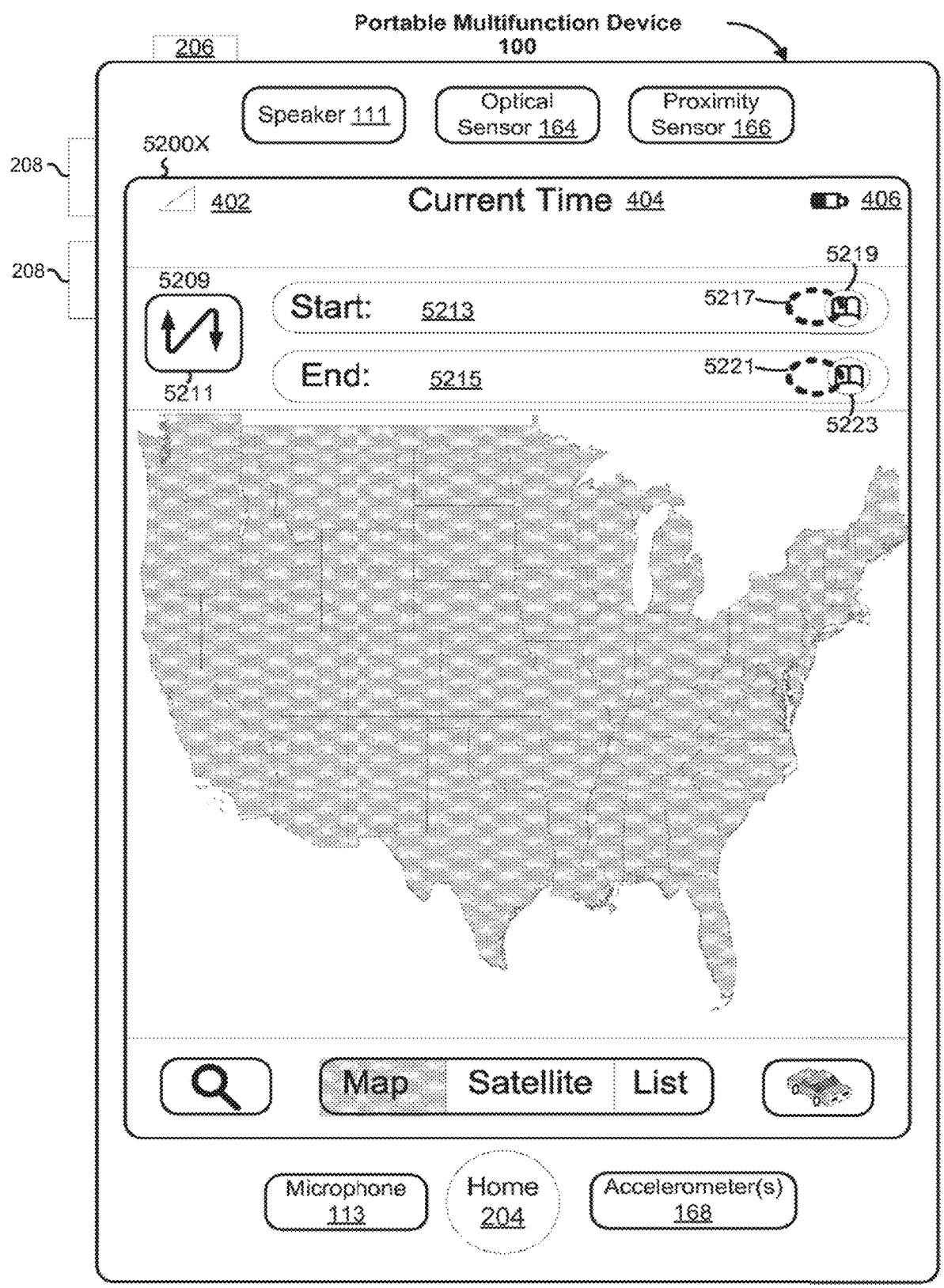

In some embodiments, in response to detecting a finger gesture on a route search icon 5207 (FIG. 5A), the device displays an endpoints area 5209 (FIG. 5P) comprising:
a first area 5213 for entering a first location;
a second area 5215 for entering a second location;
and an icon 5211 for swapping information in the first area 5213 with information in the second area 5215.

Figure 5Q:
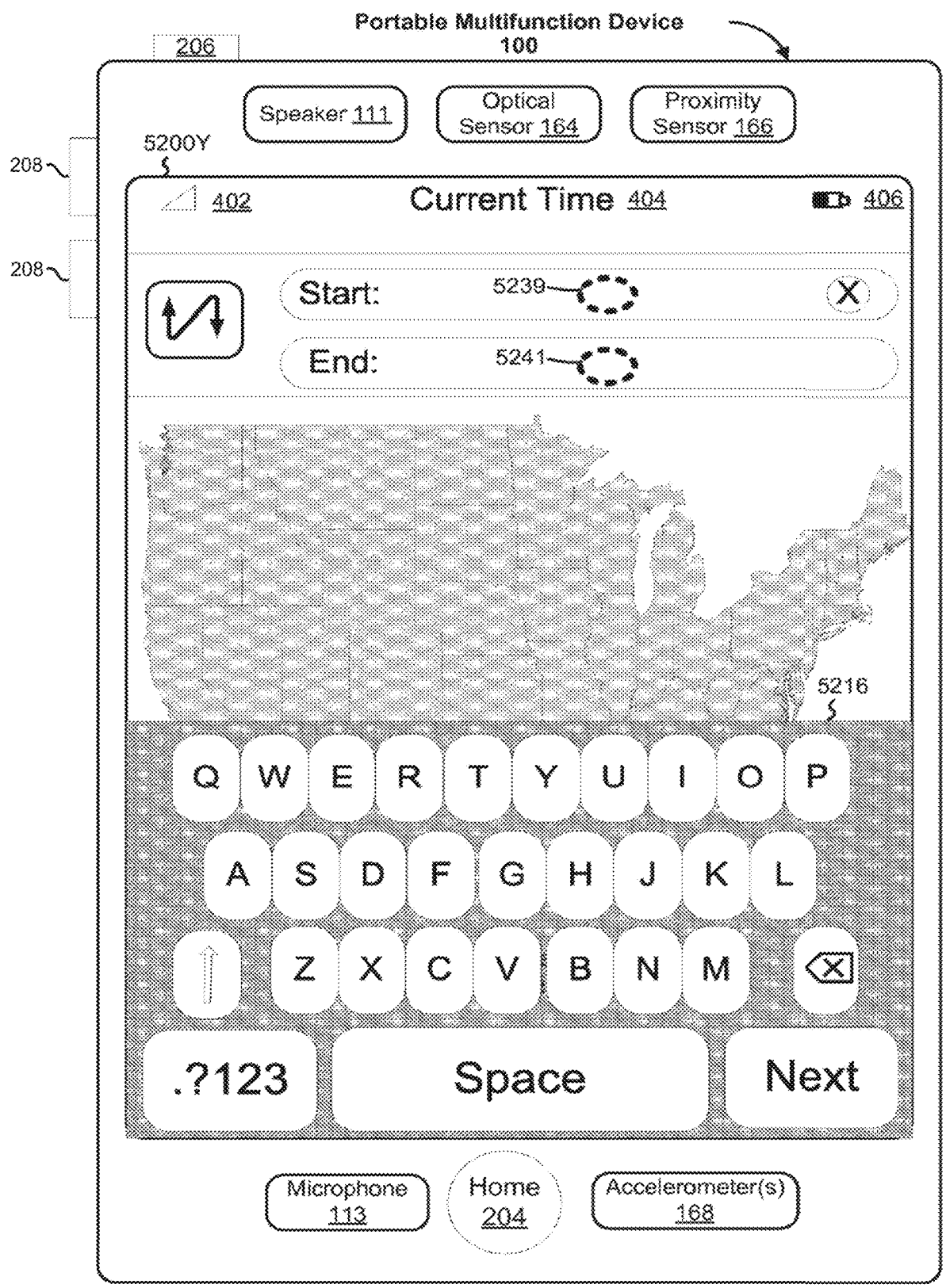

In some embodiments, in response to detecting a finger gesture 5239 (FIG. 5Q) (e.g., a finger tap gesture) on the first area ("Start:"), the device displays a keyboard for entering the first location (FIG. 5Q). In some embodiments, in response to detecting a finger gesture 5241 (e.g., a finger tap gesture) on the second area ("End:"), the device displays a keyboard for entering the second location.

In some embodiments, in response to detecting a finger gesture 5217 (FIG. 5P) (e.g., a finger tap gesture) on an input icon 5219 associated with the first area 5213, the device displays:
a list 5240 (FIG. 5F) of bookmarked locations, wherein in response to detecting a finger gesture (e.g., 5244) on a bookmarked location (e.g., 5242-3) in the list of bookmarked locations, an address or name corresponding to the bookmarked location (e.g., 5242-3) is entered in the first area;
a list 5246 (FIG. 5H) of recent searches, wherein in response to detecting a finger gesture on a location in the list of recent searches, an address corresponding to the location is entered in the first area; or
a list 5252 (FIG. 5J) of contacts, wherein in response to detecting an finger gesture on a contact 5254 in the list of contacts, an address associated with the contact (e.g., an address associated with the contact in the contact list) is entered in the first area.

In some embodiments, in response to detecting a finger gesture 5221 (FIG. 5P) (e.g., a finger tap gesture) on an input icon 5223 associated with the second area 5215, the device displays:
- a list 5240 (FIG. 5F) of bookmarked locations, wherein in response to detecting a finger gesture (e.g., 5244) on a bookmarked location (e.g., 5242-3) in the list of bookmarked locations, an address or name corresponding to the bookmarked location (e.g., 5242-3) is entered in the second area;
- a list 5246 (FIG. 5H) of recent searches, wherein in response to detecting a finger gesture on a location in the list of recent searches, an address corresponding to the location is entered in the second area; or
- a list 5252 (FIG. 5J) of contacts, wherein in response to detecting an finger gesture on a contact 5254 in the list of contacts, an address associated with the contact (e.g., an address associated with the contact in the contact list) is entered in the second area.

Figure 5R:
Figure 5S:
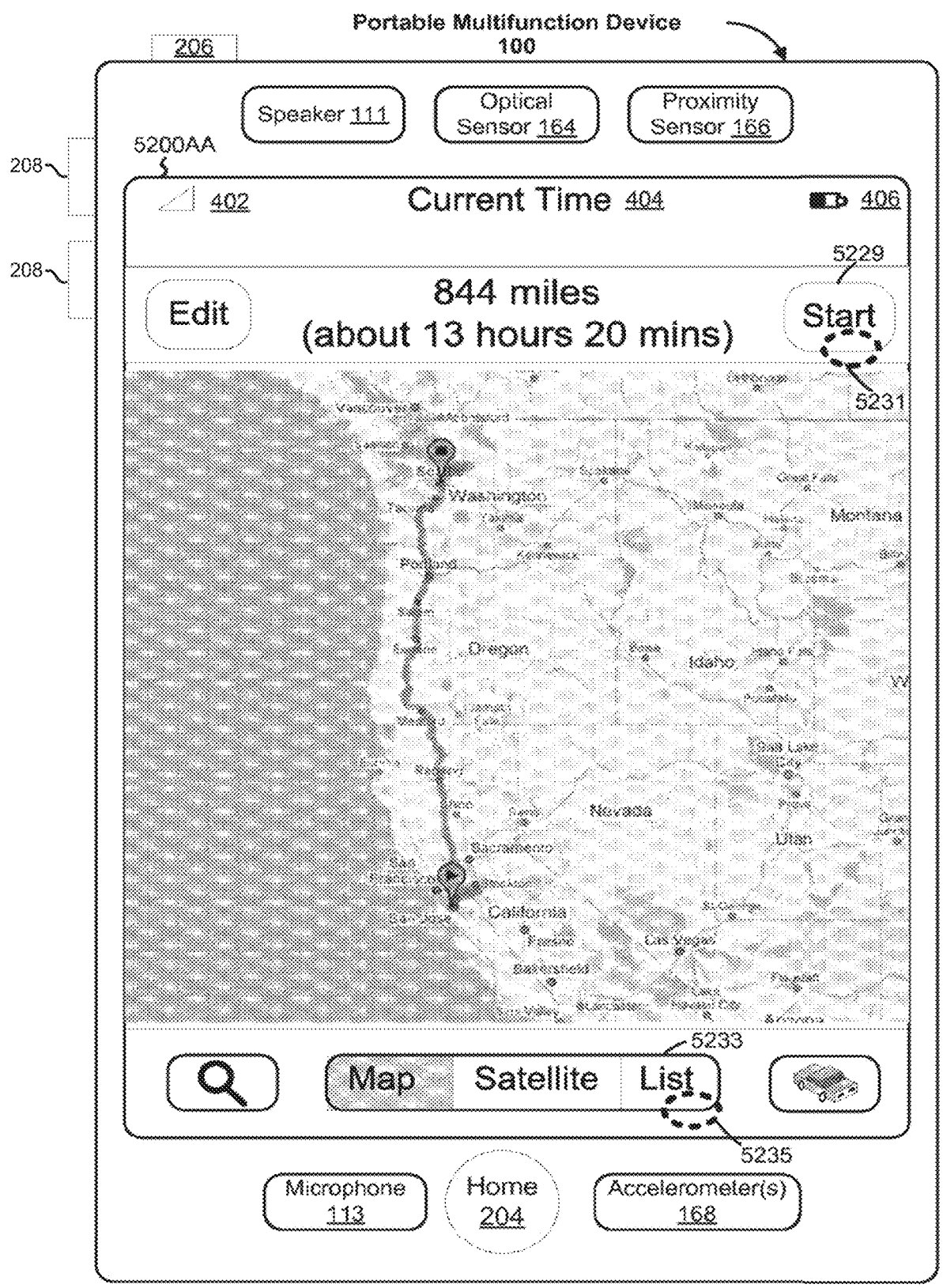

In some embodiments, in response to detecting a finger gesture 5225 (FIG. 5R) on a route search initiation icon 5227, the device: sends the first location (e.g., 2 Infinite Loop, Cupertino, Calif.) and the second location (e.g., 100 Main St., Seattle, Wash.) to a remote computer (e.g., a map application server, such as Google maps); receives routing information between the first location and the second location; and displays at least some of the routing information between the first location and the second location on a digital map (e.g., FIGS. 5S-5AA)

In some embodiments, the received routing information includes all of the digital map information needed to display the waypoints in the route between the first location and the second location. In some embodiments, the received routing information is stored (e.g., cached) so that the device can display the routing information even if the device loses access to the remote computer.

Figure 5T:
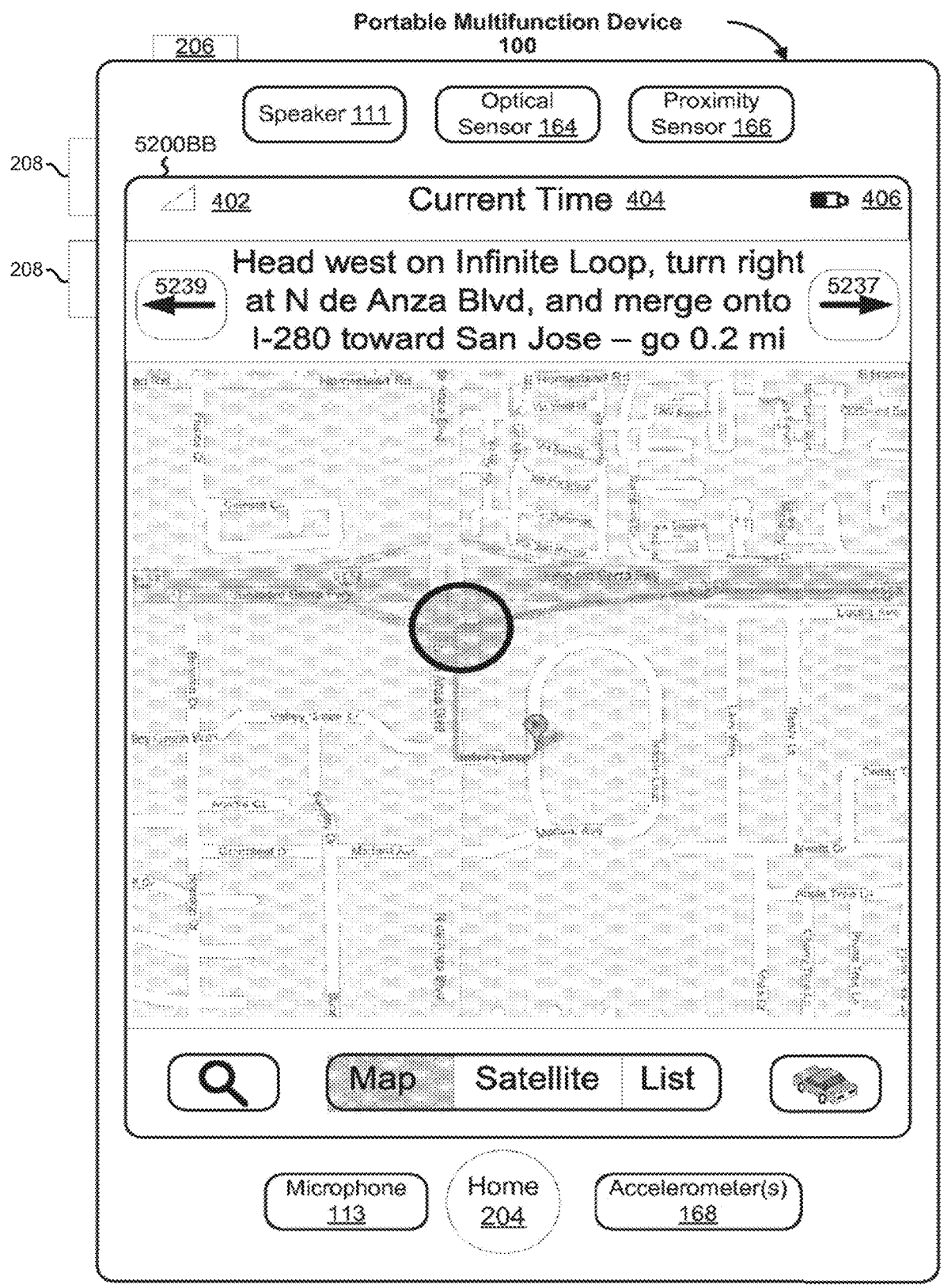
Figure 5U:
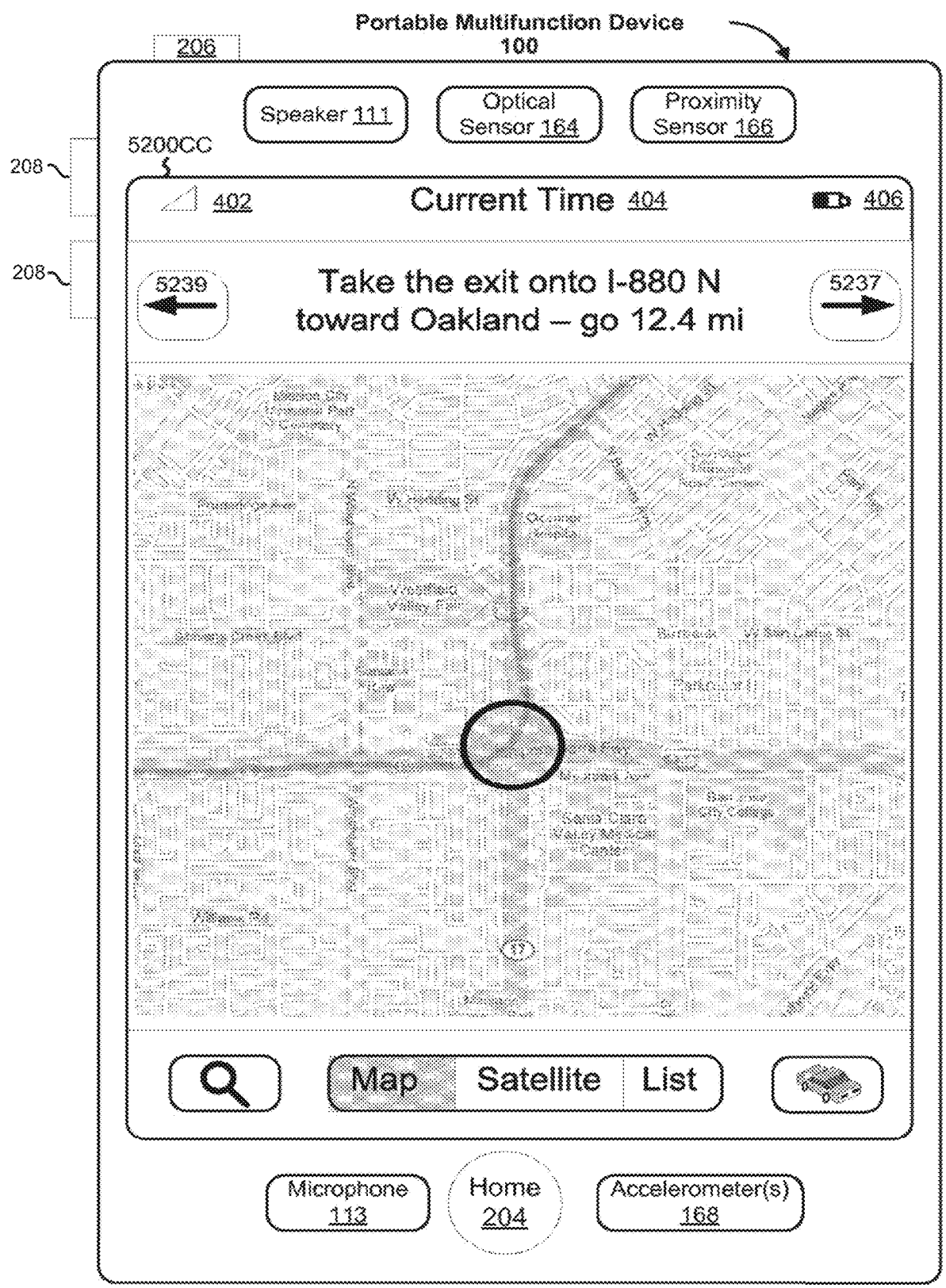
Figure 5V:
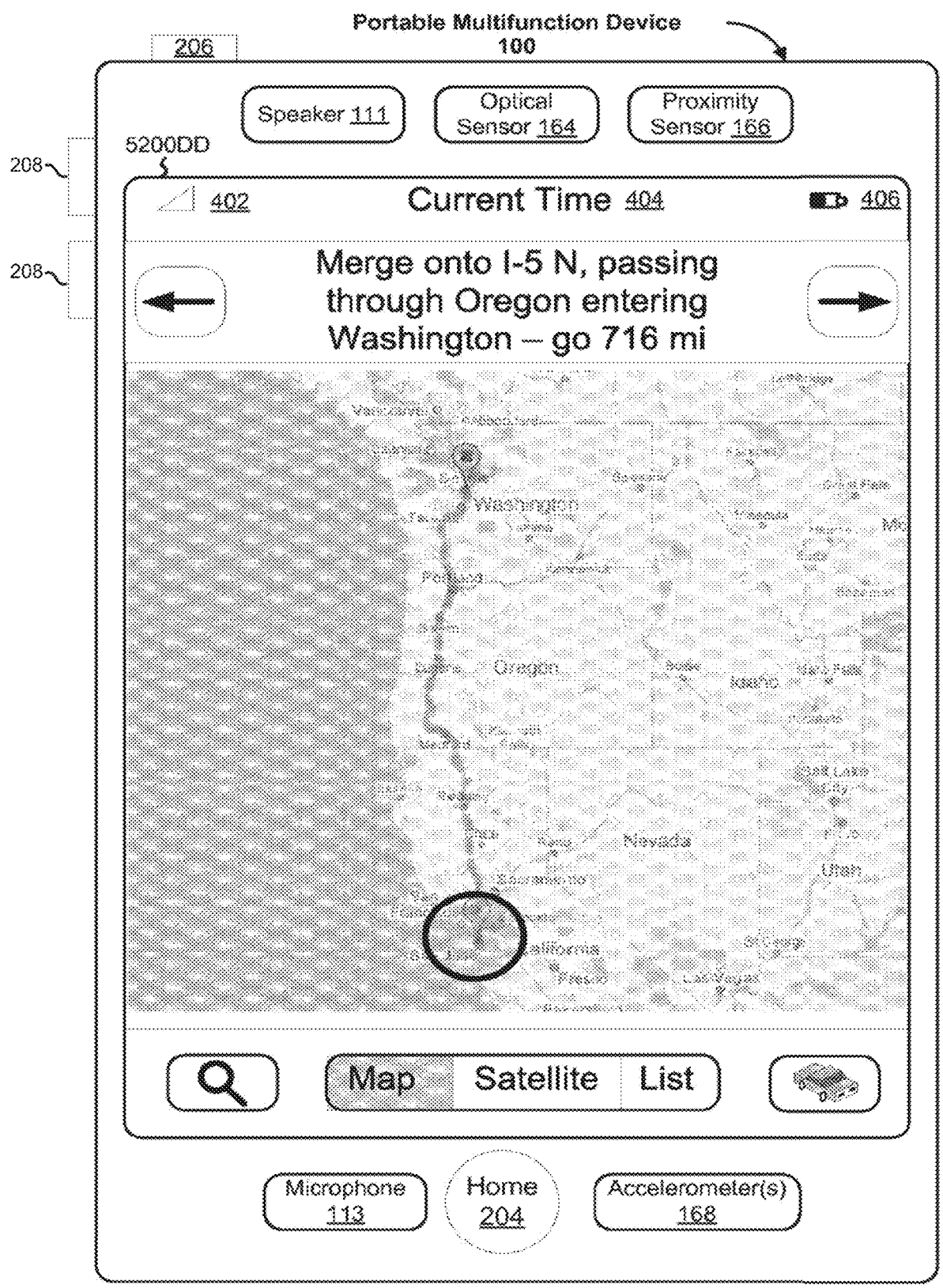
Figure 5W:
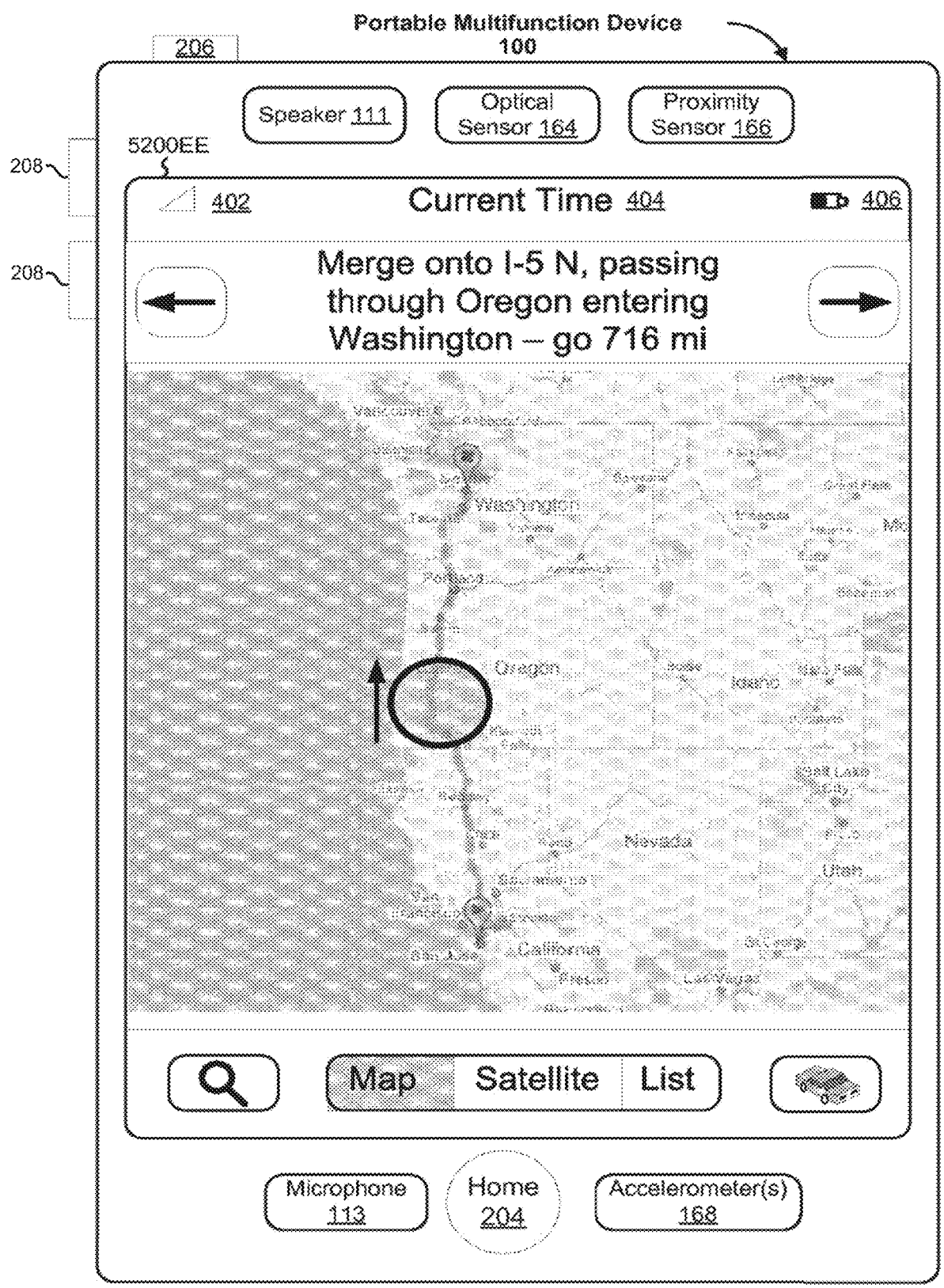
Figure 5X:
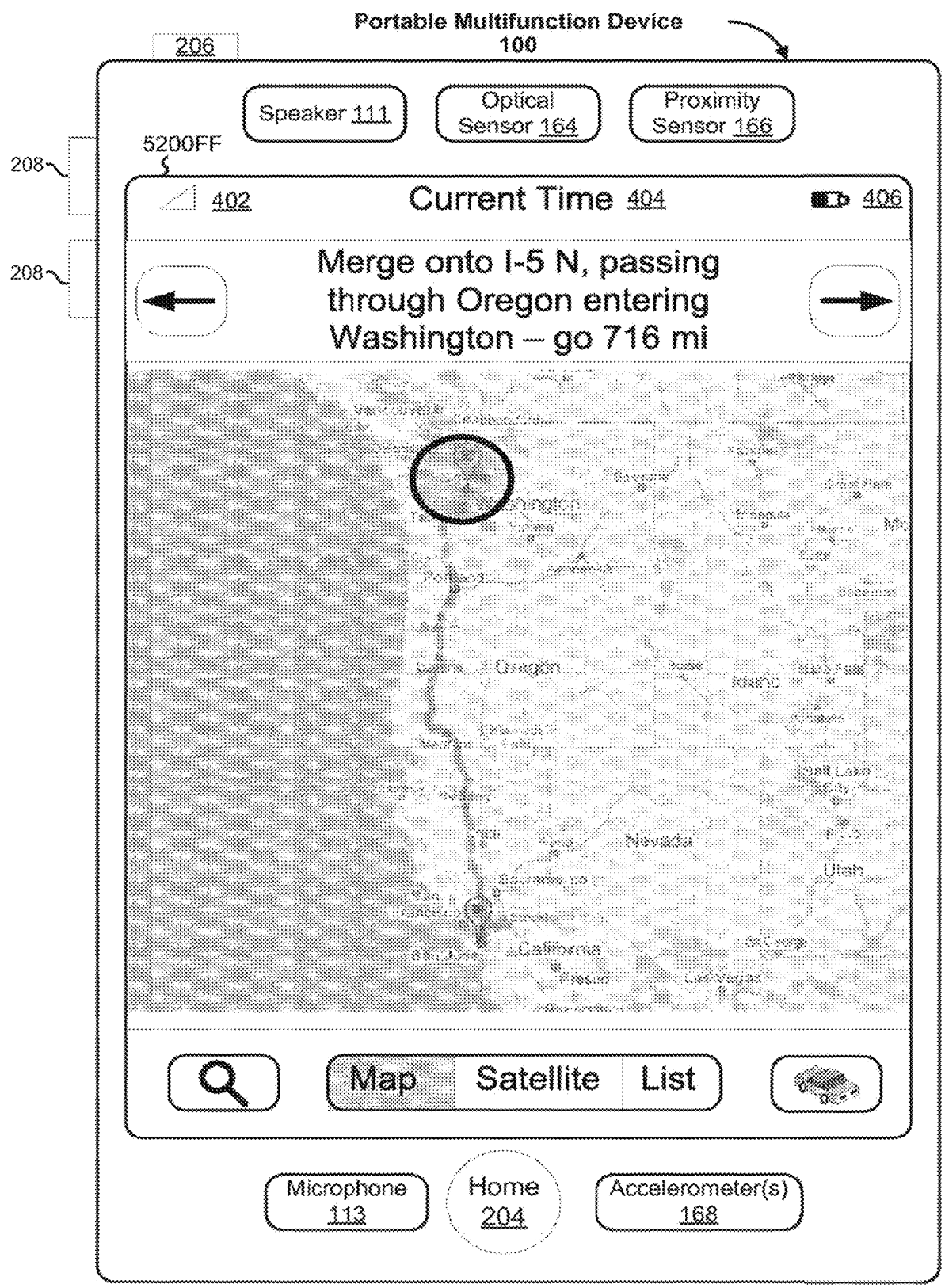
Figure 5Y:
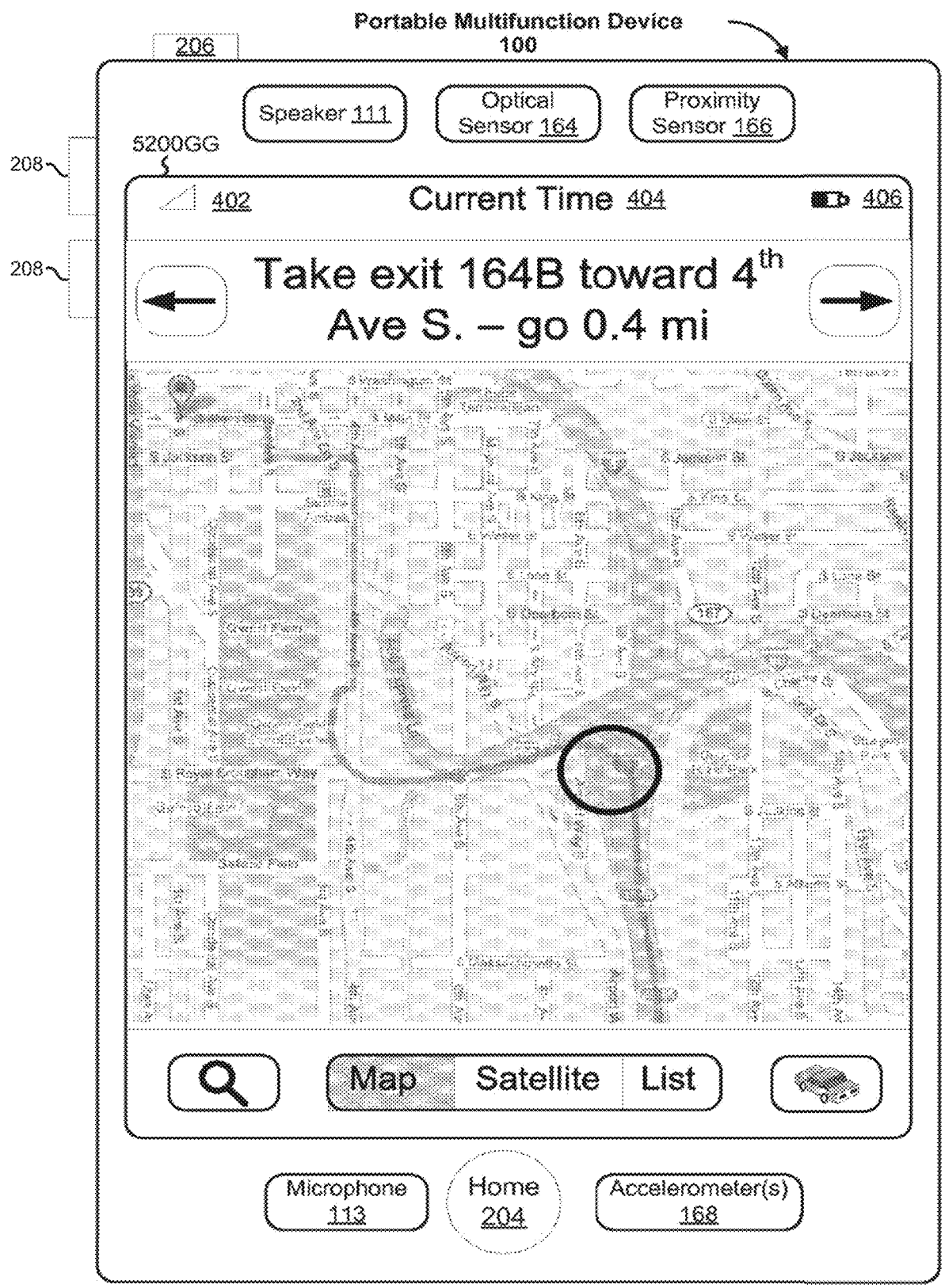
Figure 5Z:
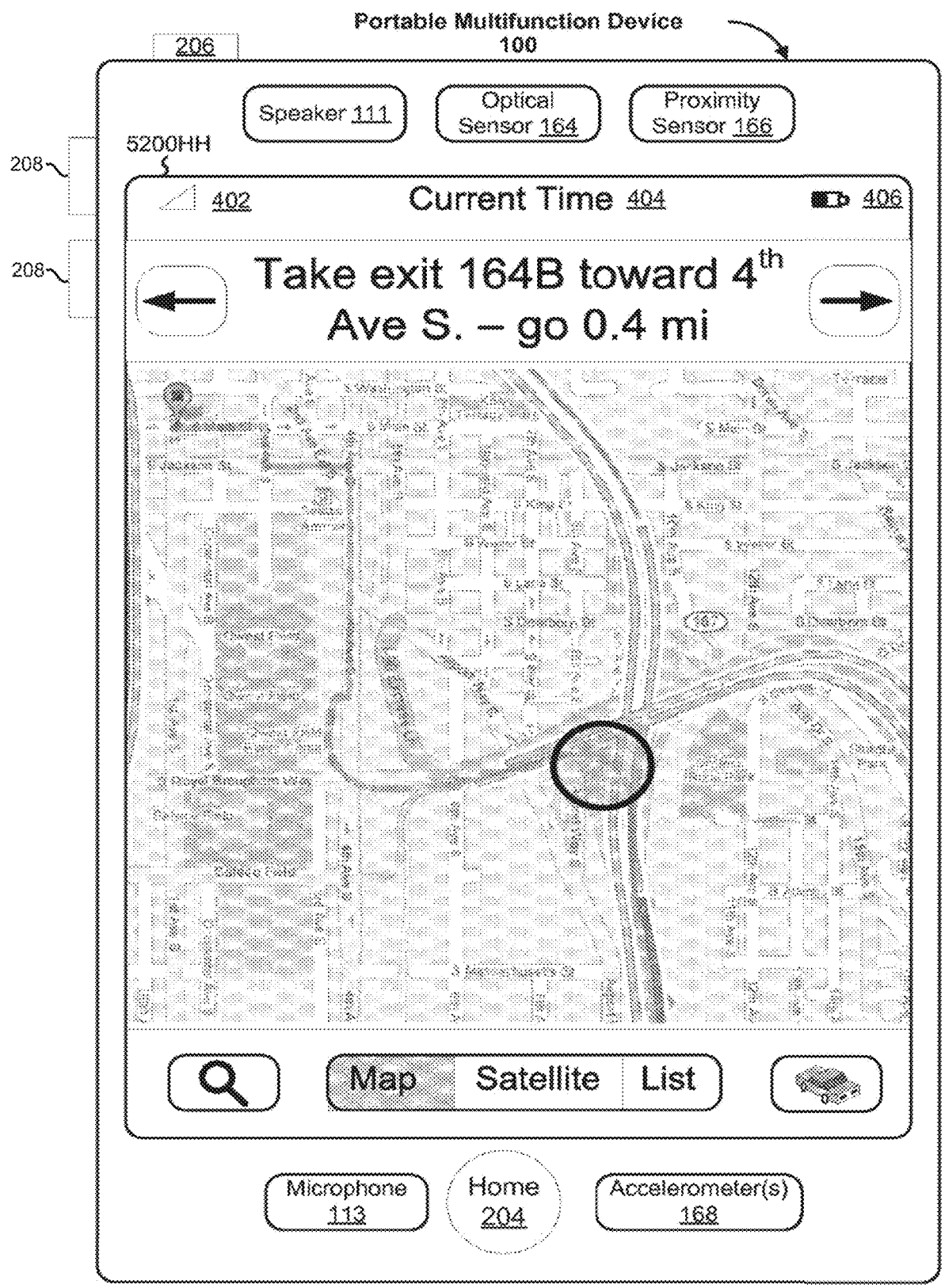
Figure 5A:
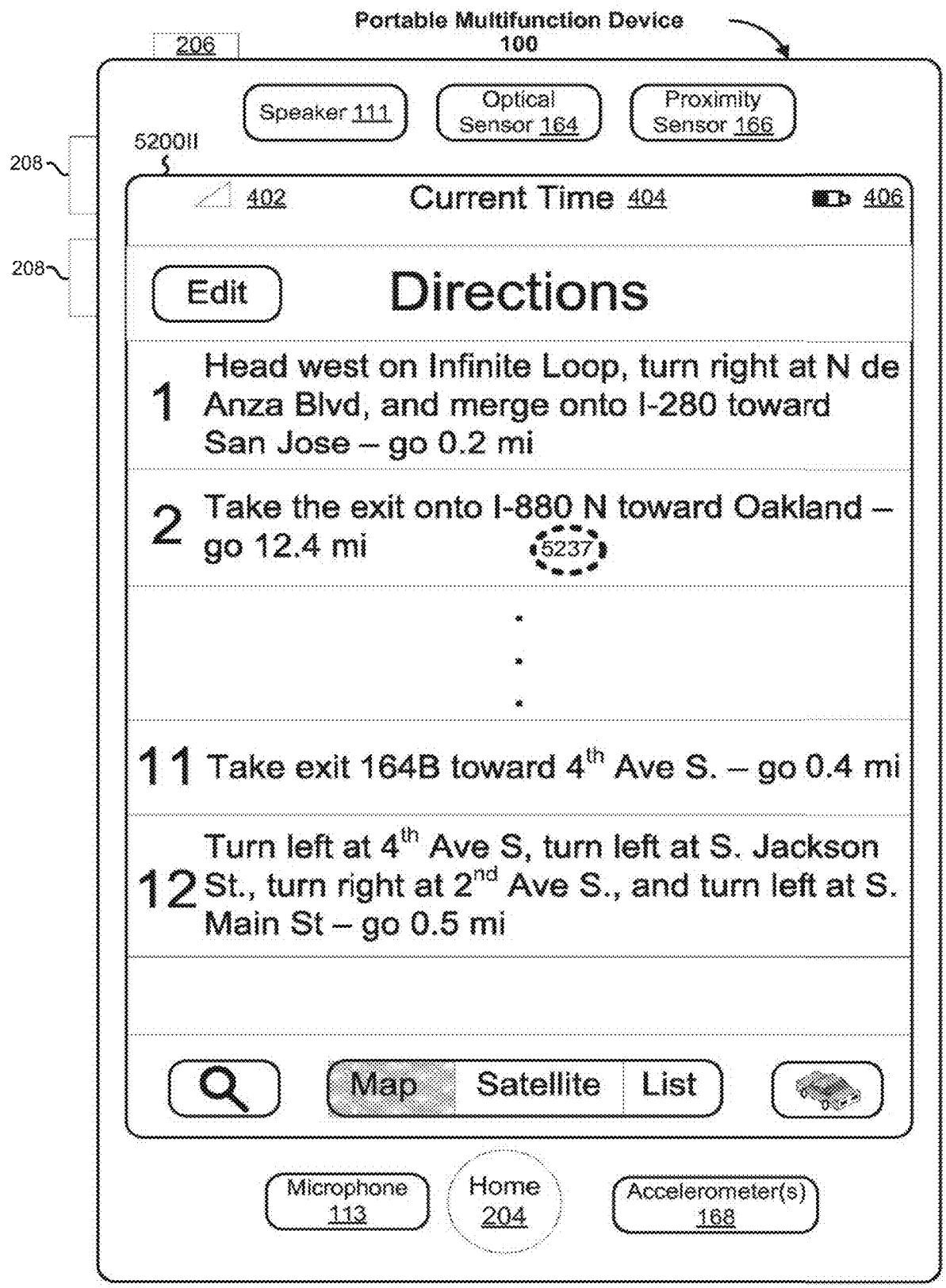

In some embodiments, in response to detecting a finger gesture 5231 (e.g., a finger tap gesture) on a start icon 5229 (FIG. 5S), the device displays the first location and the first portion of the routing information (FIG. 5T). Similarly, in some embodiments, in response to detecting a finger gesture (e.g., a finger tap gesture) on a next waypoint icon 5237, the device displays the next waypoint and the corresponding map information (FIGS. 5T-5Z). In some embodiments, in response to detecting a finger gesture (e.g., a finger tap gesture) on a previous waypoint icon 5239, the device displays the previous waypoint and the corresponding map information.

In some embodiments, if the distance to the next waypoint is large relative to the area displayed around a waypoint on the digital map, the user interface may zoom out, display an animated movement to the next waypoint, and then zoom back in to the next waypoint, as illustrated in FIGS. 5U-5Y.

In some embodiments, in response to detecting a finger gesture 5235 (e.g., a finger tap gesture) on a list icon 5233 (FIG. 5S), the device displays an itemized list of the routing information (e.g., turn-by-turn driving directions), as shown in UI 5200II (FIG. 5AA). In some embodiments, in response to detecting a finger gesture 5237 (e.g., a finger tap gesture) on a particular item in the list (FIG. 5AA), the corresponding portion of routing information is shown on a digital map (e.g., UI 5200LL, FIG. 5U).

Figure 6A:
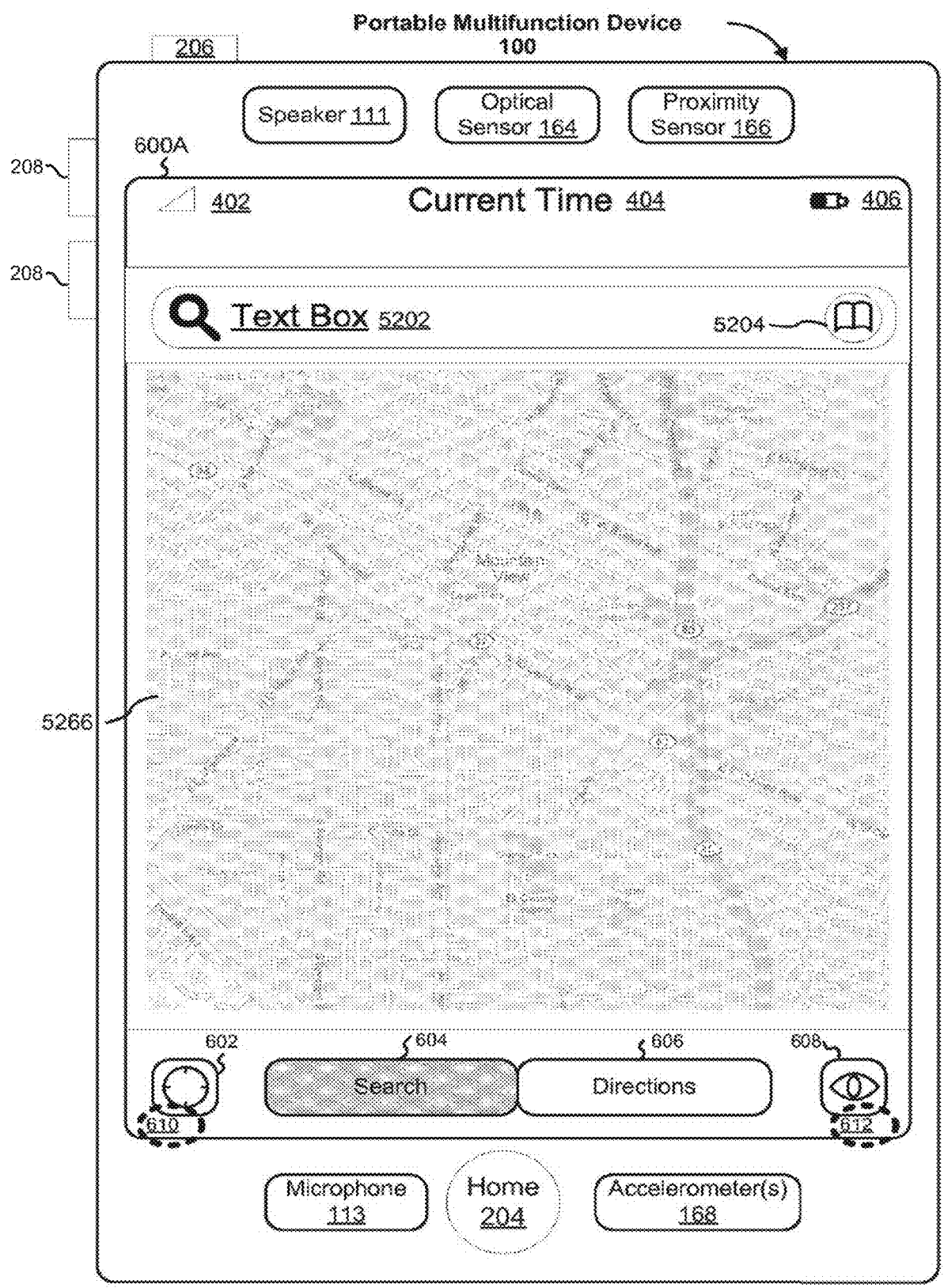
FIGS. 6A-6C illustrate exemplary user interfaces for displaying an approximate location of a computing device on a map in accordance with some embodiments.
Figure 6B:
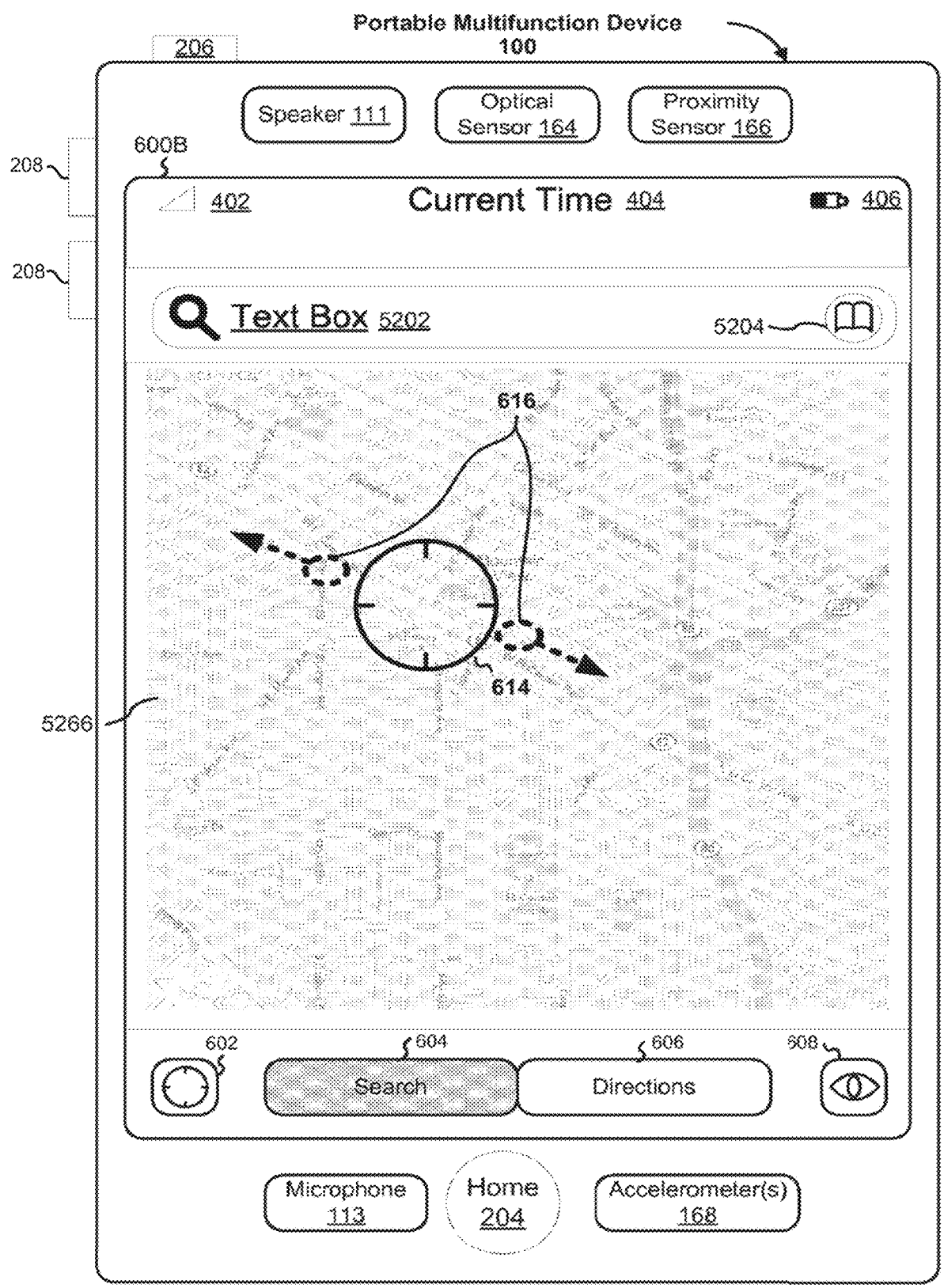
Figure 6C:
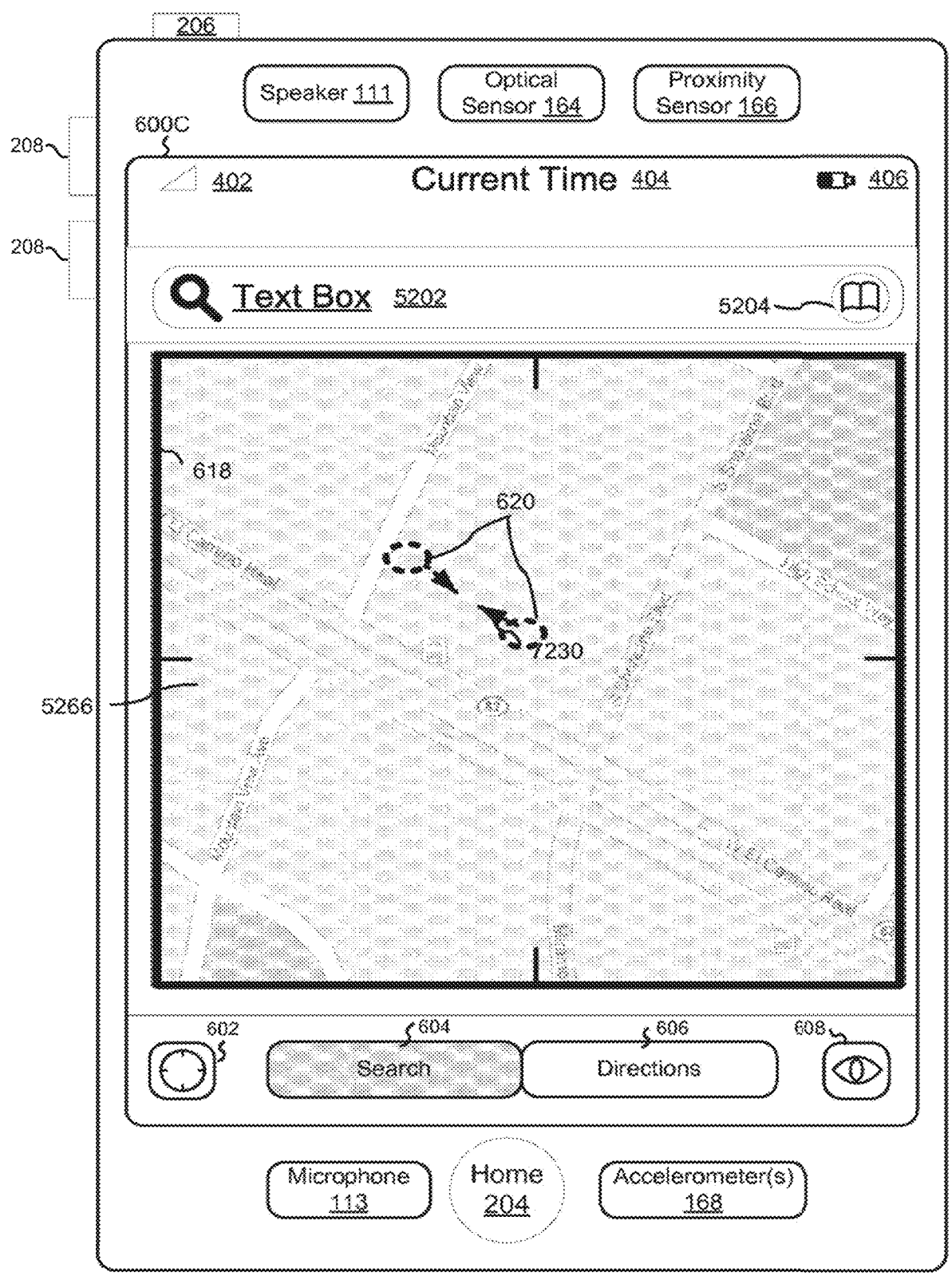

FIGS. 6A-6C illustrate exemplary user interfaces for displaying an approximate location of a computing device on a map in accordance with some embodiments. FIG. 6A shows an example of a map application including a view location icon 602, a view options icon 608, a search mode icon 604, and a directions mode icon 606.

FIG. 6B shows a visual indicator 614 on a displayed map 5266 indicating an approximate region in which a computing device (e.g., portable multifunction device 100) is located. FIG. 6C shows a second visual indicator 618 on the displayed map 5266 that is displayed when the displayed map is entirely within the approximate region in which the device is located.

In some embodiments, the user interfaces UI 600A (FIG. 6A), UI 600B (FIG. 6B), and UI 600C (FIG. 6C) include the following elements, or a subset or superset thereof:
- 402, 404, 406, 5202, and 5266, as described above;
- an input icon 5204 that when activated (e.g., by a finger tap on the icon) initiates display of a UI for accessing bookmarks, recent queries, or contacts.
- a view location icon 602 that when activated (e.g., by a finger tap on the icon) initiates a process that displays the approximate region in which a computing device is located on a map;
- a search mode icon 604 that when activated (e.g., by a finger tap on the icon) initiates display of a UI for entering search terms (e.g., UI 600A);
- a directions mode icon 606 that when activated (e.g., by a finger tap on the icon) initiates display of a UI for entering start and end points for a route search (e.g., UI 1000C, FIG. 10C);
- a view options icon 608 that when activated (e.g., by a finger tap on the icon) initiates display of a UT for displaying and selecting applications options (e.g., UI 800A, FIG. 8A);
- a first visual indicator 614 (FIG. 6B) that indicates an approximate region in which the computing device is located in accordance with the received location information when the approximate region lies within the displayed map 5266; and
- a second visual indicator 618 (FIG. 6C) around a perimeter of the displayed map 5266 that is displayed when the approximate region in which the computing device is located includes the displayed map 5266 and also extends beyond the displayed map.

The user interfaces in FIGS. 6A-6C are used to illustrate the process 700 described below with respect to FIG. 7.

Figure 7:
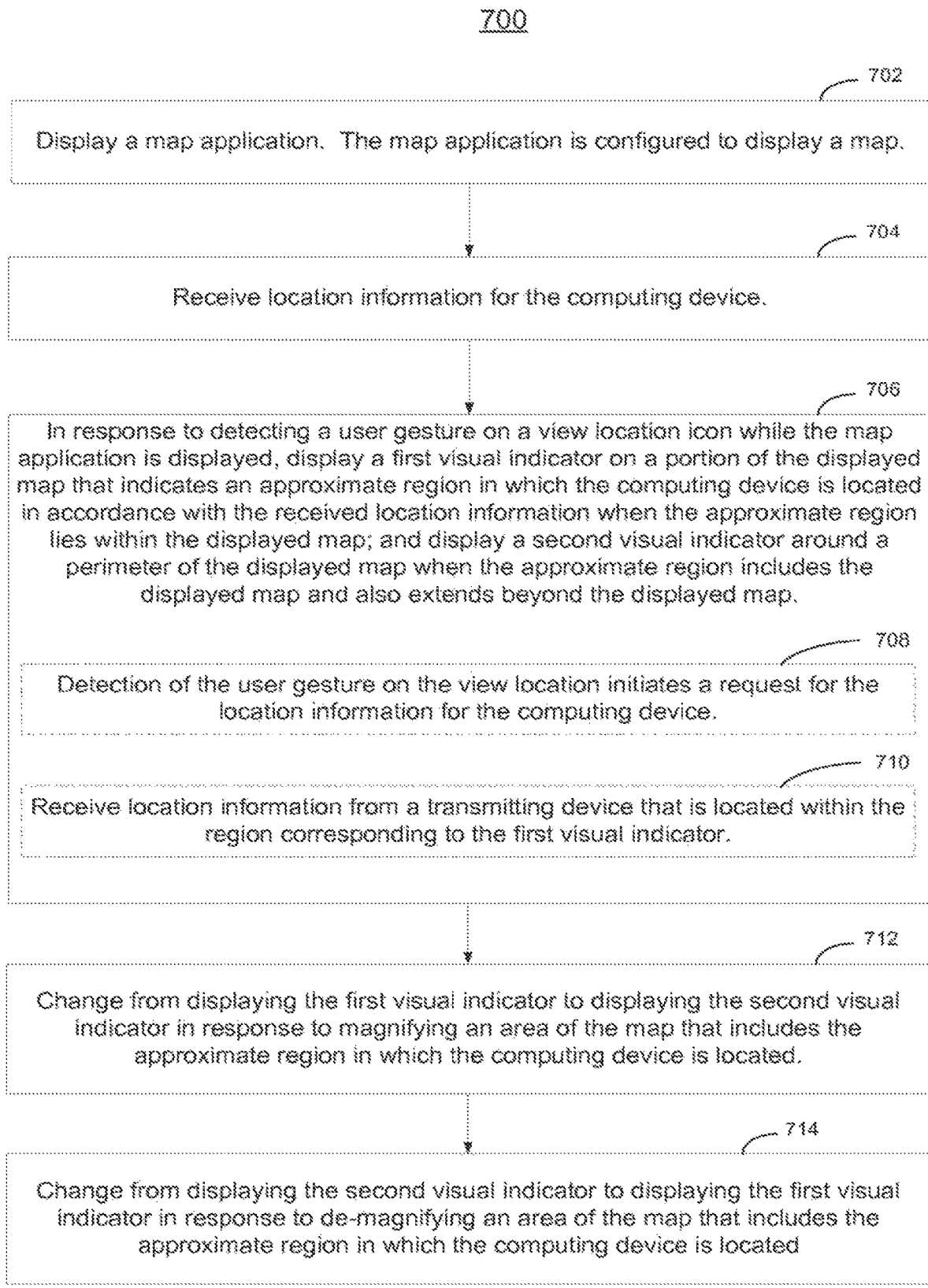
FIG. 7 is flow diagram illustrating a method of displaying an approximate location of a computing device on a map in accordance with some embodiments.

FIG. 7 is flow diagram illustrating a method of displaying an approximate location of a computing device on a map in accordance with some embodiments. The method is performed at a computing device with a touch screen display (e.g., portable multifunction device 100). The method 700 provides a simple way for a user to view the device's present location along with a visual indication of the accuracy with which the device's location is known.

A map application (e.g., 154, FIG. 1B) is displayed (702). The map application is configured to display a map (e.g., map 5266, FIG. 6A).

Location information for the computing device is received (704). In some embodiments, the location information corresponds to one or more terrestrial transmitting devices (e.g., cell towers, Wi-Fi sources, or other computing devices) from which the computing device receives signals.

In some embodiments, the device receives signals from a plurality of services capable of providing the location information, and selects location information from one of the plurality of services in accordance with location information selection criteria. For example, the location information received by the device may be GPS information, Wi-Fi information, or information from cell towers. After receiving this information, the device may select the GPS information (if available) rather than Wi-Fi or cell tower information. If GPS information is not available, the device may choose to use either Wi-Fi or cell tower information or a combination thereof. In some embodiments, the device may use Wi-Fi information only if the Wi-Fi information is consistent with the information from cell tower sources.

In response to detecting a user gesture on a view location icon (e.g., gesture 610 on view location icon 602, FIG. 6A) while the map application is displayed, the device displays (706) a first visual indicator on a portion of the displayed map that indicates an approximate region in which the computing device is located in accordance with the received location information when the approximate region lies within the displayed map. For example, in FIG. 6B, the displayed map includes a cross-hair circle 614 as a first visual indicator on a portion of the displayed map 5266. The area within the indicator's perimeter represents an approximate region on the map in which the computing device is located. In some embodiments, the first visual indicator 614 includes a circle displayed on the displayed map 5266.

In some embodiments, detecting the user gesture on the view location icon initiates (708) a request for the location information for the computing device. In some embodiments, the device receives (710) location information from a transmitting device that is located within the region corresponding to the displayed first visual indicator (e.g., cross-hair circle 614, FIG. 6B).

In response to detecting a user gesture on a view location icon (e.g., gesture 610 on view location icon 602, FIG. 6A) while the map application is displayed, the device displays (706) a second visual indicator (e.g., cross-hair rectangle 618, FIG. 6C) around a perimeter of the displayed map when the approximate region includes the displayed map and also extends beyond the displayed map. In some embodiments, the second visual indicator includes a rectangle displayed at the boundary of the displayed map.

The device changes (712) from displaying the first visual indicator to displaying the second visual indicator in response to magnifying an area of the map that includes the approximate region in which the computing device is located. For example, in response to a de-pinching finger gesture (e.g., gesture 616, FIG. 6B), which magnifies an area of the map, the device changes from displaying the first visual indicator 614 (FIG. 6B) to displaying the second visual indicator 618 (FIG. 6C).

The device changes (714) from displaying the second visual indicator to displaying the first visual indicator in response to de-magnifying an area of the map that includes the approximate region in which the computing device is located. For example, in response to a pinching finger gesture (e.g., gesture 620, FIG. 6C), which demagnifies an area of the map, the device changes from displaying the second visual indicator 618 (FIG. 6C) to displaying the first visual indicator 614 (FIG. 6B).

Figure 8A:
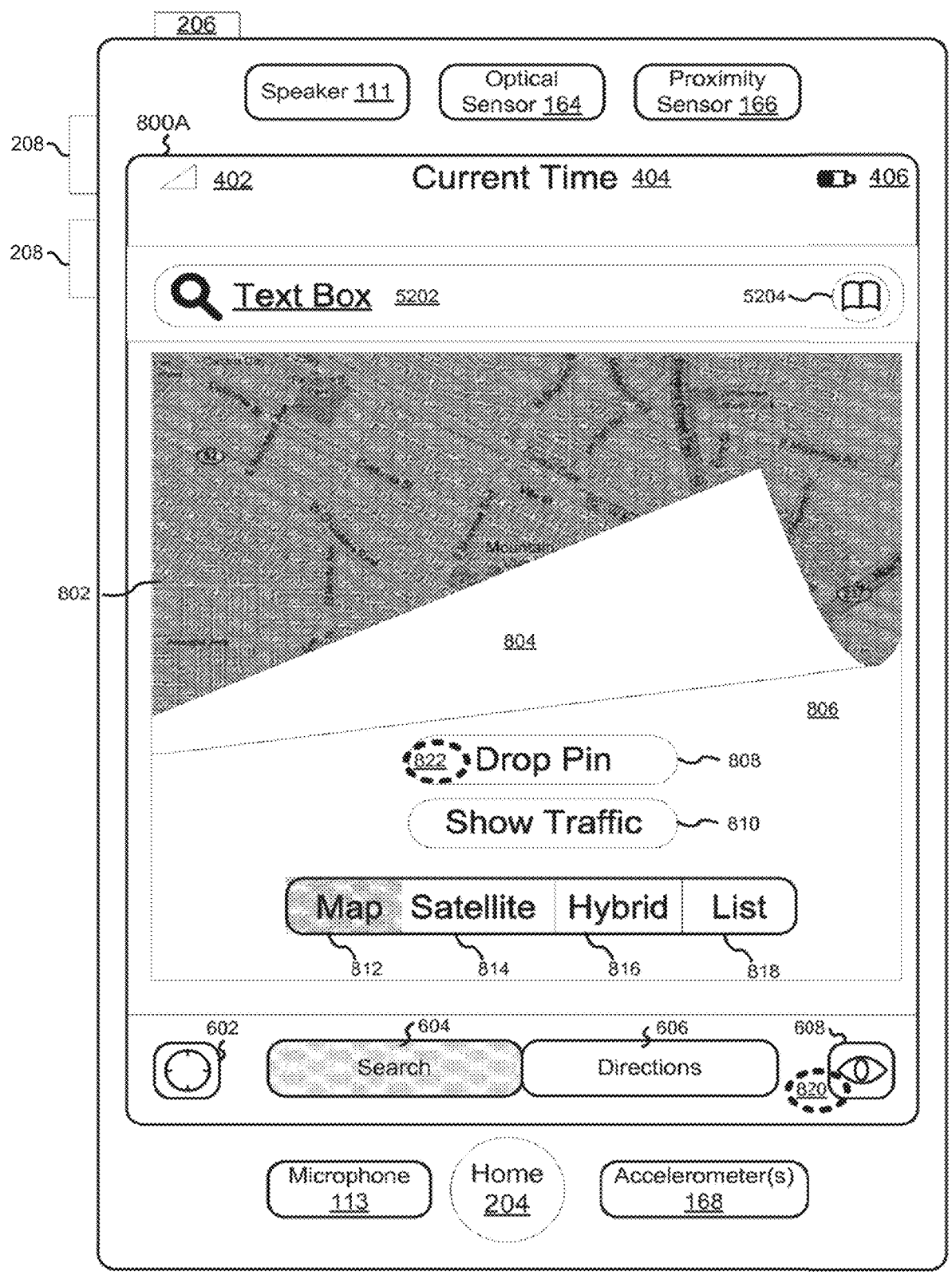
FIG. 8A illustrates an exemplary user interface for displaying and selecting application options in accordance with some embodiments.
Figure 8B:
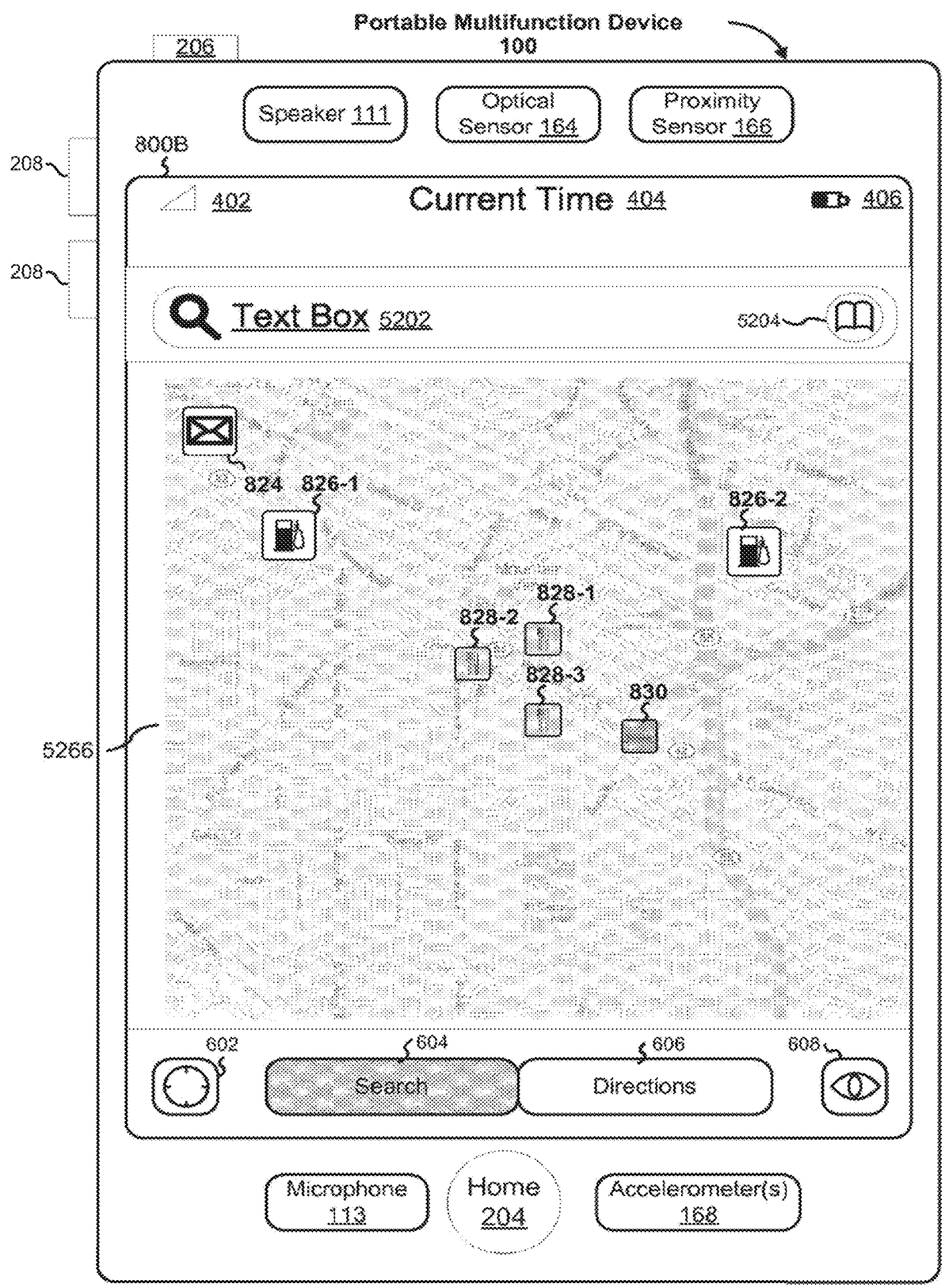
FIG. 8B illustrates an exemplary user interface with user-requested information overlaid on a map in accordance with some embodiments.

FIG. 8A illustrates an exemplary user interface for displaying and selecting application options in accordance with some embodiments. FIG. 8A includes a curled version of a map application interface. But the curled version of the application interface is not limited to a map application. FIG. 8B illustrates an exemplary user interface with user-requested information overlaid on a map in accordance with some embodiments.

In some embodiments, UI 800A (FIG. 8A) includes the following elements, or a subset or superset thereof:
  402, 404, 406, 5202, 5204, 602, 604, 606, and 608, as described above;
  a portion 802 of a flat version of an application interface;
  an image of a curled page 804 that obscures a portion of the flat version of the application interface;
  a roll-up region 806 in a display region formerly occupied by a another portion of the flat version of the application interface, wherein the roll-up region includes a plurality of option icons.

For a map application, the plurality of options icons in the roll-up region 806 includes the following icons, or a subset or superset thereof:
  a drop pin icon 808 that when activated (e.g., by a finger tap on the icon) initiates display of a user-moveable location marker on a flat version of a map;
  a show traffic icon 810 that when activated (e.g., by a finger tap on the icon) initiates display of traffic conditions on a flat version of a map;
  a map view icon 812 that when activated (e.g., by a finger tap on the icon) initiates display of a flat version of a graphical map;
  a satellite view icon 814 that when activated (e.g., by a finger tap on the icon) initiates display of a flat version of a satellite image corresponding to the graphical map;
  a hybrid view icon 816 that when activated (e.g., by a finger tap on the icon) initiates display of a flat version of a hybrid combination of a satellite image and a corresponding graphical map; and
  a list view icon 818 that when activated (e.g., by a finger tap on the icon) initiates display of a list of search results.

In some embodiments, UI 800B (FIG. 8B) includes the following elements, or a subset or superset thereof:
  402, 404, 406, 5202, 5204, 602, 604, 606, and 608, as described above;
  gas information icon 826 that is overlaid on the map when a gas information option icon (not shown) is selected;
  lodging information icon 830 that is overlaid on the map when a lodging information option icon (not shown) is selected;
  post office information icon 824 that is overlaid on the map when a post office information option icon (not shown) is selected; and
  food information icon 828 that is overlaid on the map when a food information option icon (not shown) is selected.

The user interfaces in FIGS. 6A and 8A-8B are used to illustrate the process described below with respect to FIG. 9.

Figure 9:
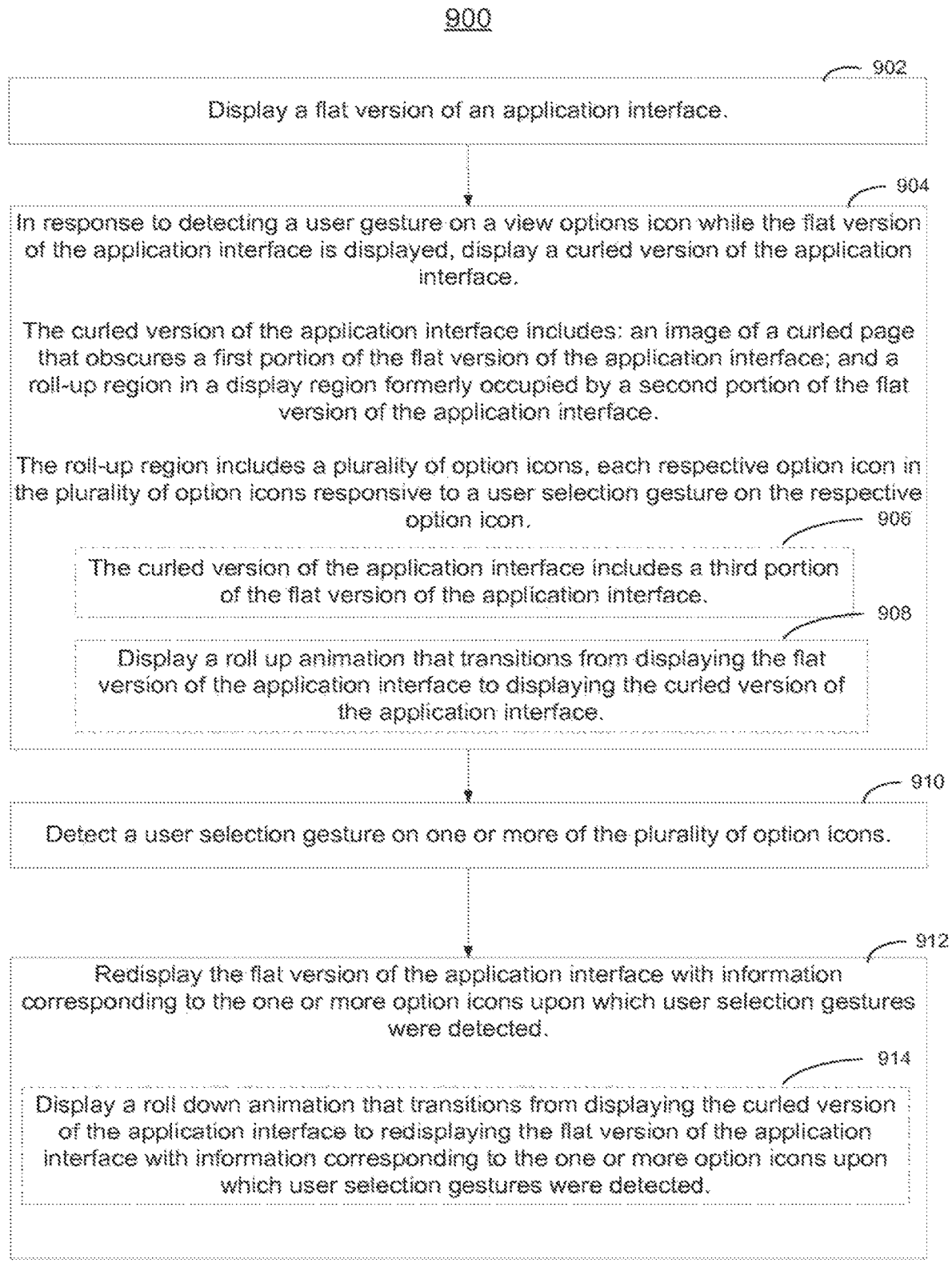
FIG. 9 is a flow diagram illustrating a method of displaying and selecting application options in accordance with some embodiments.

FIG. 9 is a flow diagram illustrating a method of displaying and selecting application options in accordance with some embodiments. The method 900 is performed at a computing device with a touch screen display (e.g., portable multifunction device 100). The method 900 provides a simple and intuitive way for a user to view and select various options when displaying an application. A map application is used here for exemplary and explanatory purposes. The method 900 is not limited to map applications.

A flat version of an application interface is displayed (902). For example, user interface 600A (FIG. 6A) illustrates a flat version of an application interface for a map application.

In response to detecting a user gesture (e.g., a finger tap gesture 612, FIG. 6A) on a view options icon (e.g., 608, FIG. 6A) while the flat version of the application interface is displayed, a curled version of the application interface is displayed (904).

The curled version of the application interface (e.g., interface 800A, FIG. 8A) includes an image of a curled page that obscures a first portion of the flat version of the application interface. For example, in FIG. 8A, curled page 804 obscures the portion of the map underneath the curled page.

The curled version of the application interface also includes a roll-up region (e.g., roll-up region 806, FIG. 8A) in a display region formerly occupied by a second portion of the flat version of the application interface. The roll-up region 806 includes a plurality of option icons (e.g., icons 808, 810, 812, 814, 816, and 818 in FIG. 8A), with each respective icon in the plurality of option icons responsive to a user selection gesture on the respective option icon (904).

In some embodiments, the curled version of the application interface includes (906) a third portion of the flat version of the application interface. For example, in FIG. 8A, the curled version of the map application interface 800A includes a third portion 802 of the flat version of the map application interface that is not obscured by the image of the curled page 804.

In some embodiments, the third portion is displayed in the curled version of the application interface in a manner that is visually distinct from display of the third portion in the flat version of the application interface. For example, the flat portion 802 in FIG. 8A may be darkened relative to the corresponding flat portion of the map 5266 in FIG. 6A. Continuing to show a portion 802 of the flat version of the application helps maintain the application context for the user while simultaneously permitting the user to view the application options in the roll-up region 806 (FIG. 8A).

In some embodiments, a roll up animation is displayed (908) that transitions from displaying the flat version of the application interface to displaying the curled version of the application interface. For example, in response to detecting user gesture 612 on the view options icon 608 (FIG. 6A), a roll up animation may transition from FIG. 6A (the flat version) to FIG. 8A (the curled version).

In some embodiments, the application is a map application (e.g., 154, FIG. 1B) and the flat version of the application interface includes a map (e.g., map 5266, FIG. 6A).

In some embodiments, for the map application, the plurality of option icons include a satellite view option icon 814, a hybrid view option icon 816, and a traffic information overlay option icon 810 (FIG. 8A).

In some embodiments, for the map application, the plurality of option icons include an icon for adding a user-moveable location marker to the map. For example, FIG. 8A includes a drop pin icon 808 for adding a user-moveable location marker (e.g., pin 1002, FIG. 10A) to map 5266.

In some embodiments, for the map application, the plurality of option icons include a plurality of map overlay option icons. For example, there may be option icons allowing the user to overlay additional information on to the map 5266, such as traffic 810, gas, food, and lodging. FIG. 8B illustrates an exemplary user interface 8008 for displaying the additional information overlaid on the map (e.g., gas 826, lodging 830, food 828, and mail 824) in response to user selection of corresponding map overlay option icons.

In some embodiments, the curled page includes a translucent representation of a portion of the flat version of the application interface. For example, the curled page 804 in FIG. 8A may display a translucent representation of map 5266 (not shown). In some embodiments, the curled page includes an inverted, translucent representation of a portion of the flat version of the application interface. For example, the curled page 804 in FIG. 8A may display an inverted, translucent representation of map 5266 (not shown).

A user selection gesture (e.g., gesture 822, FIG. 8A) on one or more of the plurality of option icons is detected (910).

In some embodiments, the user selection gestures are finger gestures on the touch screen display. For example, in FIG. 8A, user selection of the drop pin icon 808 is by finger gesture 822. In some embodiments, the application interface displayed on the touch screen is responsive to stylus input gestures on the touch screen display.

Figure 10A:
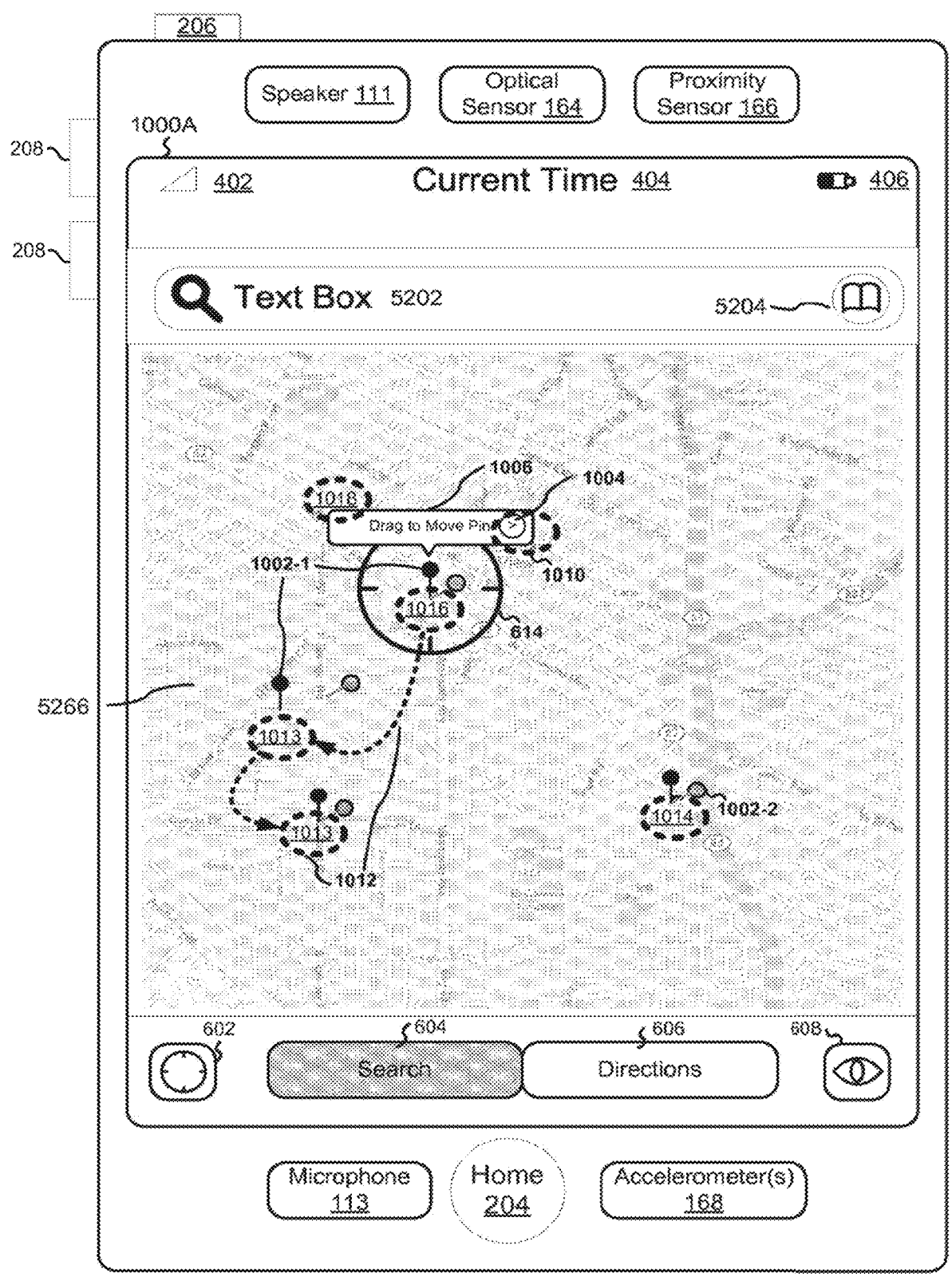
FIG. 10A illustrates an exemplary user interface for displaying a map application with a user-moveable location marker in accordance with some embodiments.

The flat version of the application interface is redisplayed (912) with information corresponding to the one or more option icons upon which the user selection gestures were detected. For example, FIG. 10A shows a user-moveable location marker 1002 added to map 5266 and FIG. 8B shows information icons 824, 826, 828, and 830, which correspond to overlay option icons selected by the user, added to map 5266.

In some embodiments, the flat version of the application interface is redisplayed in response to detecting a second user gesture on the view options icon. For example, in FIG. 8A, in response to a finger tap gesture 820 on the view options icon 608, display of the curled version 800A transitions to redisplay of the flat version of the application interface with information corresponding to the one or more option icons upon which the user selection gestures were detected.

In some embodiments, user selection gestures are detected on at least two of the plurality of option icons, and the flat version of the application interface is redisplayed with information corresponding to the at least two of the plurality of option icons upon which user selection gestures were detected. For example, in the roll up region 806 of the curled version of the map application (FIG. 8A), the user may select both the show traffic icon 810 and the satellite icon 814 prior to redisplaying the flat version of the application interface. In response to a finger tap gesture 820 on the view options icon 608, the device will redisplay the flat version of the map application interface with a satellite view and with traffic information overlaid on the map.

For some options icons, selection of the option icon may result in an immediate transition to the flat application interface with the corresponding option added, without requiring detection of a second gesture on the view options icon (or some other close options icon). For example, detection of gesture 822 on the drop pin icon 808 may result in the immediate transition to the flat application interface with a user moveable location marker added to the map (e.g., pin 1002 added to map 5266 in FIG. 10A).

In some embodiments, a roll down animation is displayed (914) that transitions from displaying the curled version of the application interface to redisplaying the flat version of the application interface with information corresponding to the one or more option icons upon which user selection gestures were detected. For example, in response to user selection of the view options icon 608 (FIG. 8A), a roll down animation may transition from FIG. 8A (the curled version) to FIG. 6A (the flat version).

The map application is just one example of an application that can use this method of displaying and selecting application options. Other applications that can use this method include, without limitation: contacts 137; telephone 138; video conferencing 139; e-mail client 140; instant messaging (IM) 141; blogging 142; camera 143; image management 144; video player 145; music player 146; browser 147; calendar 148; widgets 149 (e.g., weather widget 149-1, stocks widget 149-2, calculator widget 149-3, alarm clock widget 149-4, dictionary widget 149-5, and other widgets obtained by the user, as well as user-created widgets 149-6); widget creator 150; search 151; video and music player 152; notes 153; and online video 155.

FIG. 10A illustrates an exemplary user interface for displaying a map application with a user-moveable location marker in accordance with some embodiments.

Figure 10B:
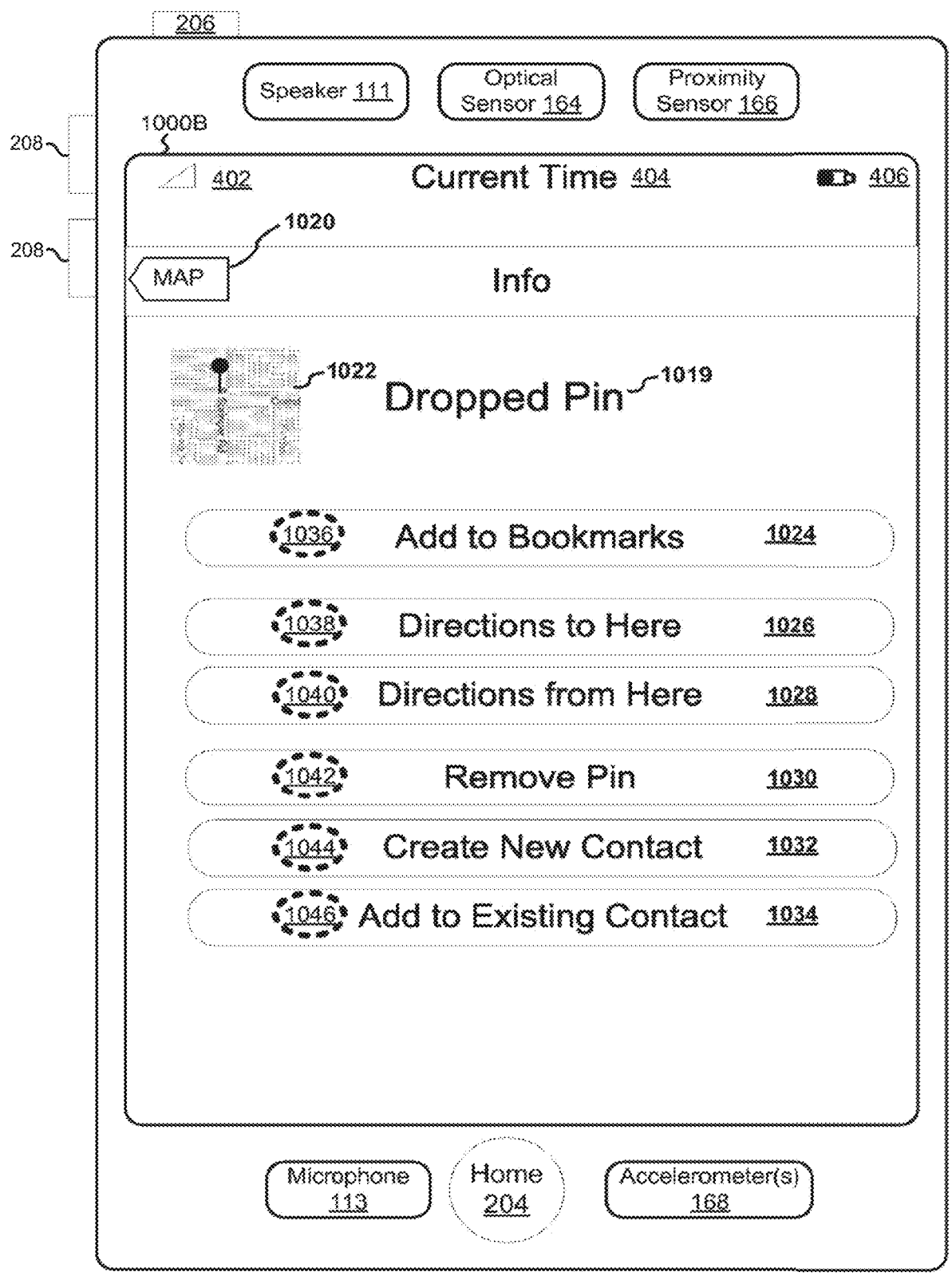
FIG. 10B illustrates an exemplary user interface for displaying user-selectable option icons associated with a user-moveable location marker in accordance with some embodiments.

FIG. 10B illustrates an exemplary user interface for displaying user-selectable option icons associated with a user-moveable location marker in accordance with some embodiments.

Figure 10C:
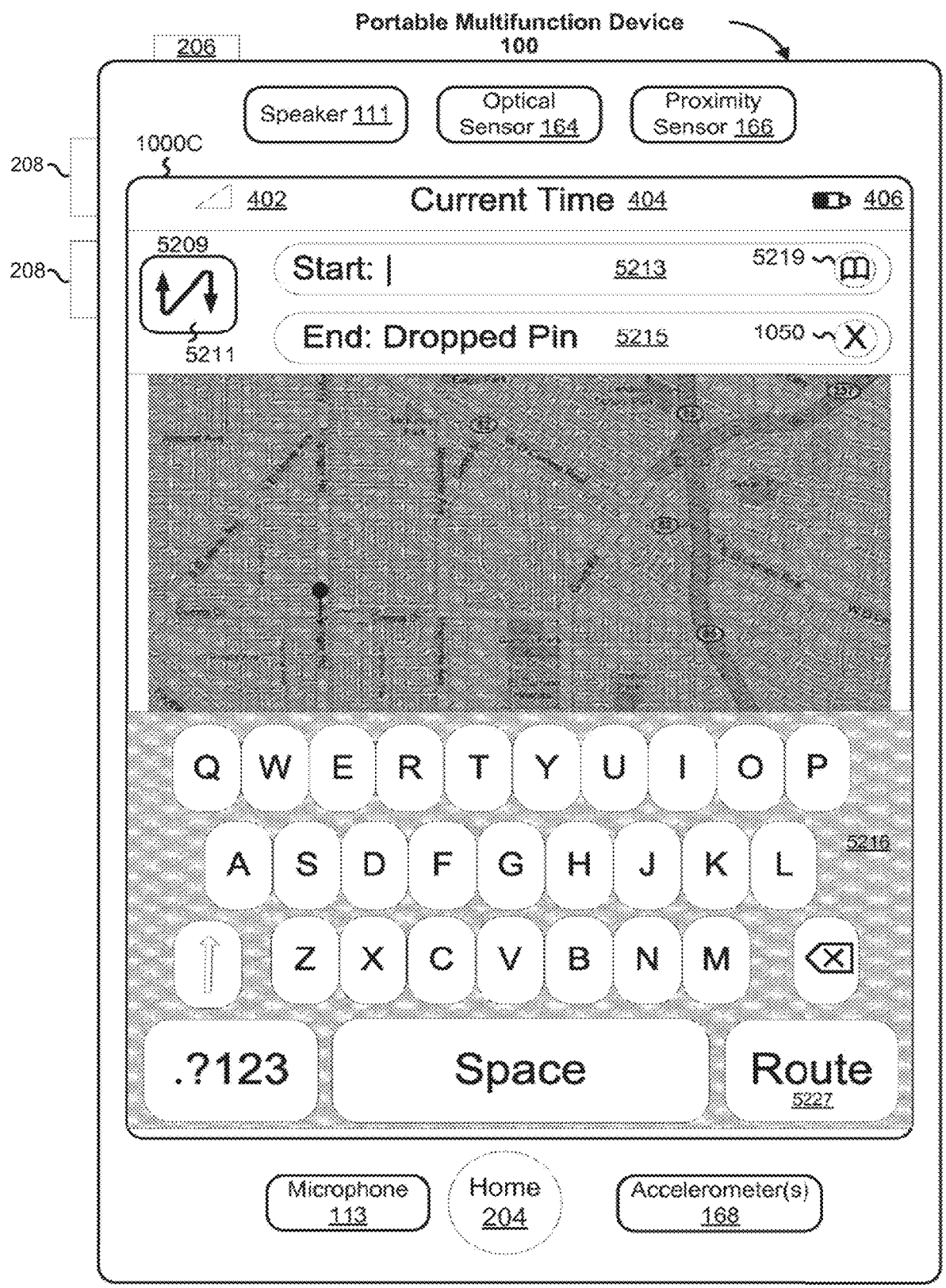
FIG. 10C illustrates an exemplary user interface for obtaining directions to a location corresponding to a user-moveable location marker in accordance with some embodiments.
Figure 10D:
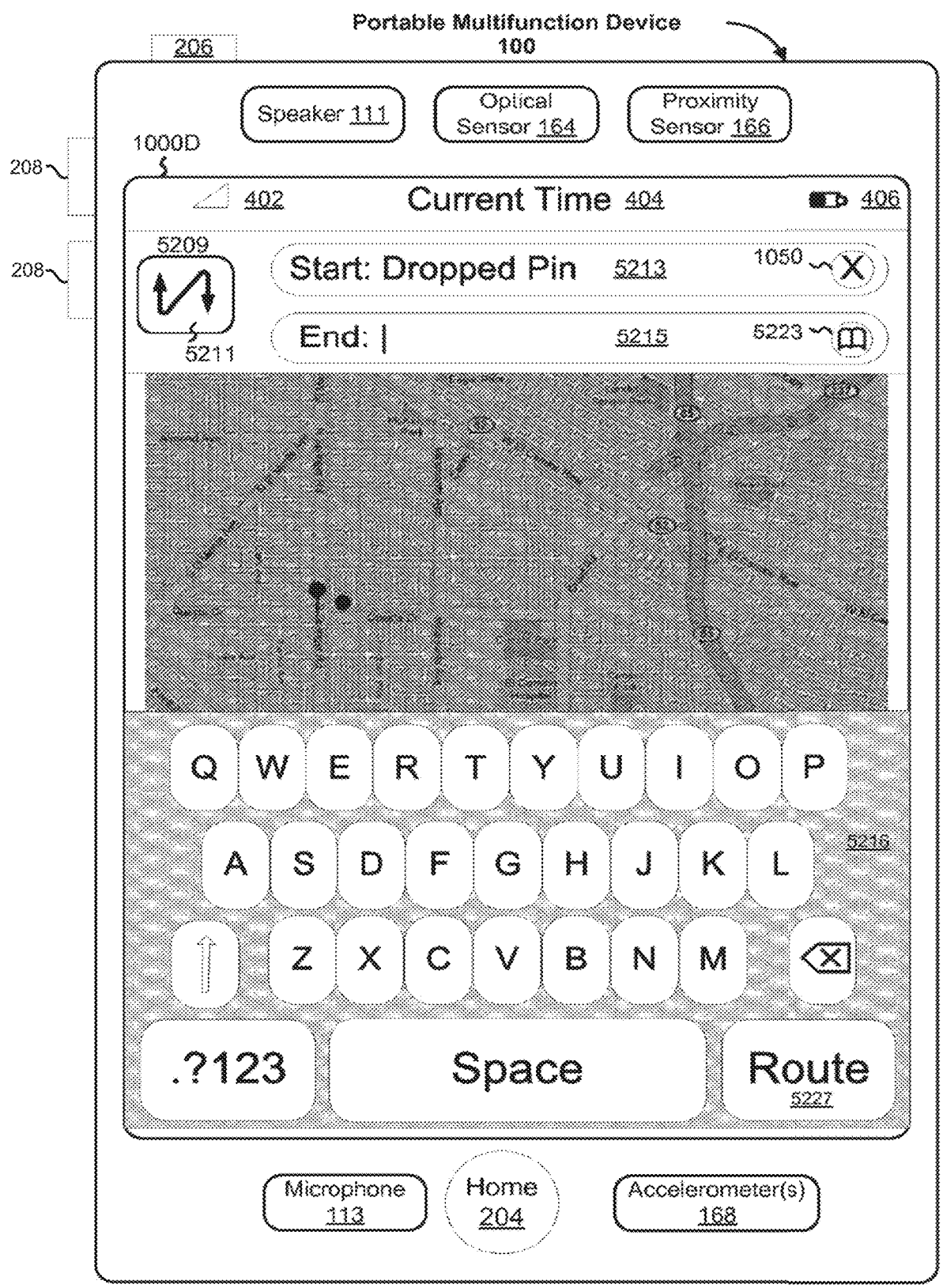
FIG. 10D illustrates an exemplary user interface for obtaining directions from a location corresponding to a user-moveable location marker in accordance with some embodiments.

FIG. 10C illustrates an exemplary user interface for obtaining directions to a location corresponding to a user-moveable location marker in accordance with some embodiments. FIG. 10D illustrates an exemplary user interface for obtaining directions from a location corresponding to a user-moveable location marker in accordance with some embodiments.

Figure 10E:
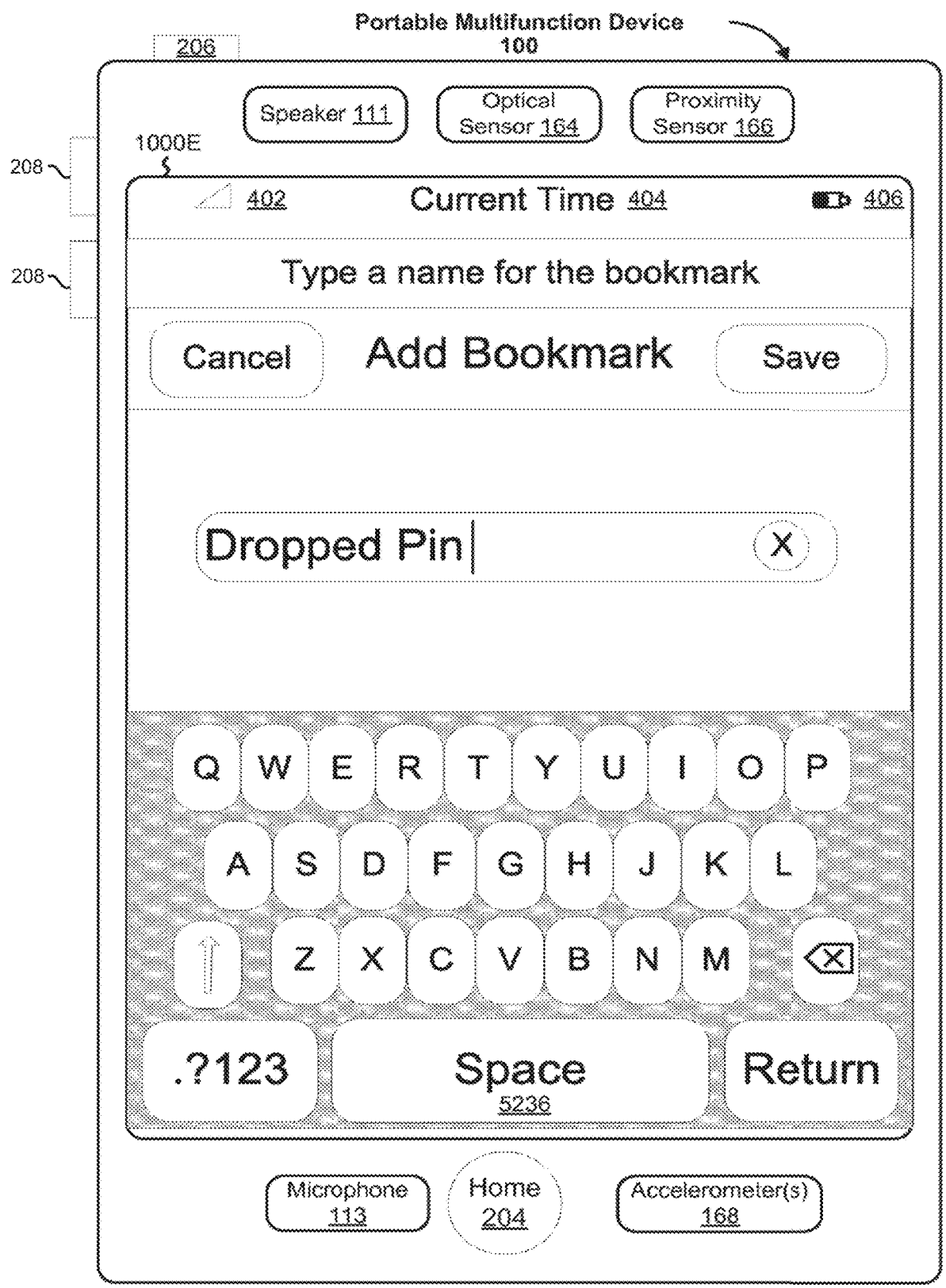
FIG. 10E illustrates an exemplary user interface for adding a location marker to a set of bookmarks in accordance with some embodiments.

FIG. 10E illustrates an exemplary user interface for adding a location marker to a set of bookmarks in accordance with some embodiments.

Figure 10F:
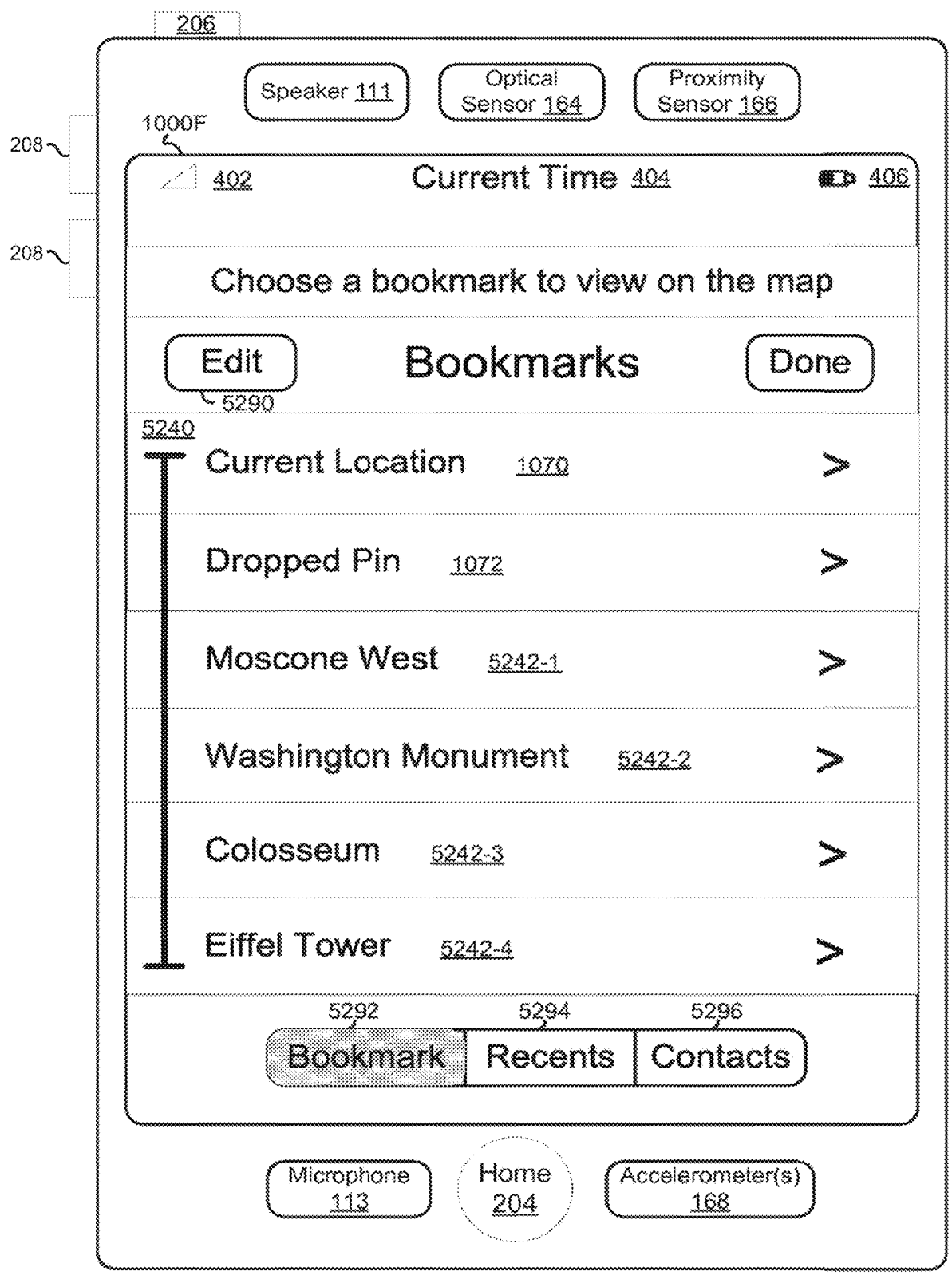
FIG. 10F illustrates an exemplary user interface with a current location of a computing device included in a list of bookmarks in accordance with some embodiments.

FIG. 10F illustrates an exemplary user interface with a current location of a computing device included in a list of bookmarks in accordance with some embodiments.

In some embodiments, UI 1000A (FIG. 10A) includes the following elements, or a subset or superset thereof:
- 402, 404, 406, 5202, 5204, 5266, 602, 604, 606, 608, and 614 as described above;
- a user-moveable location marker 1002;
- a user-selectable region 1004 that when activated (e.g., by a finger tap 1010 on the region) initiates display of an interface (e.g., UI 1000B, FIG. 10B) for obtaining information associated with the current location of a corresponding user-moveable location marker 1002-1; and
- a user-selectable region 1006 next to region 1004 that when activated (e.g., by a finger tap 1018 on region 1006) ceases display of region 1004 and region 1006;

UI 1000B (FIG. 10B) includes the following elements, or a subset or superset thereof:
- 402, 404, and 406, as described above;
- a name 1019 (e.g., "Dropped Pin") for an associated user-moveable location marker (e.g., marker 1002-1, FIG. 10A);
- a return to map icon 1020 that when activated (e.g., by a finger tap on the icon) initiates display of a map application interface with the corresponding user-moveable location marker (e.g., UI 1000A, FIG. 10A);
- an image 1022 of a portion of the map application interface with the corresponding user-moveable location marker (e.g., UI 1000A, FIG. 10A);
- an add to bookmarks icon 1024 that when activated (e.g., by a finger tap 1036 on the icon) initiates replacement of UI 1000B with display of a user interface for adding an entry to a set of bookmarked locations (e.g., UI 1000E, FIG. 10E), the added entry corresponding to the current location of the user-moveable location marker 1002-1 on the map 5266 (FIG. 10A);
- a directions to here icon 1026 that when activated (e.g., by a finger tap 1038 on the icon) initiates replacement of UI 1000B with display of a user interface for getting directions to the current location of the user-moveable location marker 1002-1 on the map 5266 from another location (e.g., UI 1000C, FIG. 10C);
- a directions from here icon 1028 that when activated (e.g., by a finger tap 1040 on the icon) initiates replacement of UI 1000B with display of a user interface for getting directions from the current location of the user-moveable location marker 1002-1 on the map 5266 to another location (e.g., UI 100D, FIG. 10D);
- a remove location marker icon 1030 (e.g., "Remove Pin") that when activated (e.g., by a finger tap 1042 on the icon) initiates deletion of the corresponding user-moveable location marker 1002-1 from the map 5266 (FIG. 10A);
- a create new contact icon 1032 that when activated (e.g., by a finger tap 1044 on the icon) initiates replacement of UI 1000B with display of a user interface for adding an entry to a set of contacts, the added entry including location information corresponding to the location of the user-moveable location marker 1002-1 on the map 5266 (FIG. 10A); and
- an add to existing contact icon 1034 that when activated (e.g., by a finger tap 1046 on the icon) initiates replacement of UI 1000B with display of a user interface (or a series of user interfaces) for updating an entry in a set of contacts to include location information corresponding to the location of the user-moveable location marker 1002-1 on the map 5266 (FIG. 10A).

UI 1000C (FIG. 10C) and UI 1000D (FIG. 10D) include the following elements, or a subset or superset thereof:
- 402, 404, 406, 5209, 5211, 5213, 5215, 5219, 5223, 5227, and 5236 as described above; and
- a keyboard 5216 for entering locations in areas 5213 and/or 5215;
- a delete icon 1050 that when activated (e.g., by a finger tap on the icon) initiates deletion of any text entered in the corresponding area.

UI 1000E (FIG. 10E) is analogous to UI 5200M (FIG. 5E, described above).

UI 1000F (FIG. 10F) includes the following elements, or a subset or superset thereof:
- 402, 404, 406, 5240, 5290, 5292, 5294, and 5296 as described above; and
- current location 1070 that corresponds to the current location information for the device (e.g., portable multifunction device 100), whether or not the current location information has been added to a set of bookmarks (e.g., via UI 1000E, FIG. 10E); and
- dropped pin 1072 that corresponds to the location information of a corresponding user-moveable location marker 1002 on the map 5266, whether or not the user-moveable location marker 1002 has been added to a set of bookmarks (e.g., via UI 1000E, FIG. 10E).

The user interfaces in FIGS. 8A and 10A-10F are used to illustrate the process 1100 described below with respect to FIG. 11 and the process 1500 described below with respect to FIG. 15.

Figure 11:
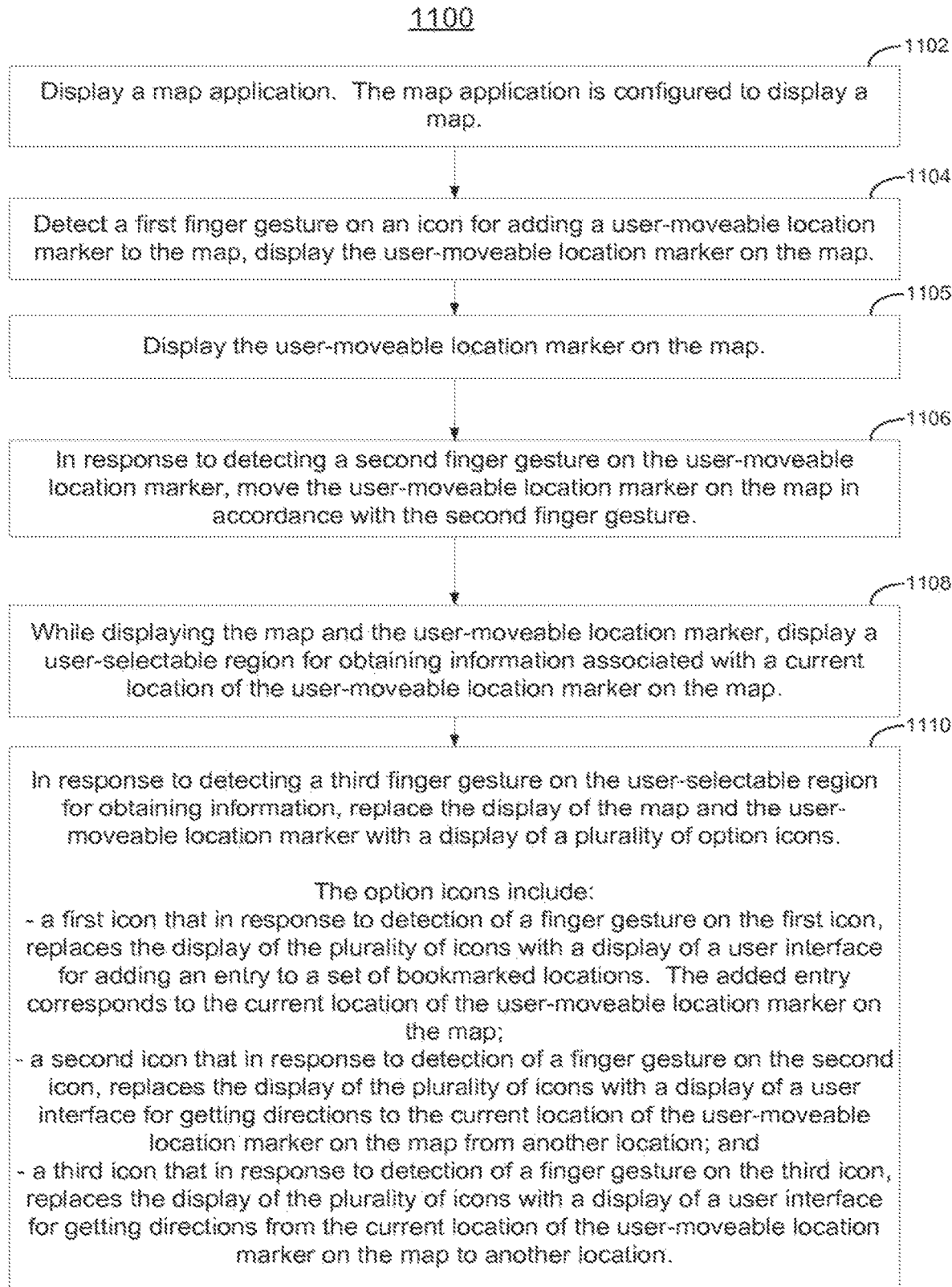
FIG. 11 is a flow diagram illustrating a method for displaying and moving a user-moveable location marker on a map in accordance with some embodiments.

FIG. 11 is a flow diagram illustrating a method 1100 for displaying and moving a user-moveable location marker on a map in accordance with some embodiments. The method 1100 is performed at a computing device with a touch screen display (e.g., portable multifunction device 100). The method 1100 provides a simple way for a user to place a location marker on the displayed map, and retrieve information associated with the location of the marker (e.g., the address of the marker and directions to or from the marker).

A map application (e.g., 154, FIG. 1B) is displayed (1102). The map application is configured to display a map (e.g., map 5266, FIG. 10A).

A first finger gesture is detected (1104) on an icon for adding a user-moveable location marker to the map (e.g., gesture 822, FIG. 8A).

The device displays (1105) the user-moveable location marker (e.g., marker 1002-1, FIG. 10A) on the map. In some embodiments, the user-moveable location marker 1002 is immediately displayed in response to detecting (1104) the finger gesture on the icon for adding a user-moveable location marker to the map (e.g., gesture 822, FIG. 8A). In some embodiments, the user-moveable location marker 1002 is not displayed on the map until a finger gesture on a view options icon 608 (e.g., gesture 820, FIG. 8A) or a close options icon is detected.

In some embodiments, the icon for adding a user-moveable location marker to the map is located in a curled version of the map application interface (e.g., icon 808 in UI 800A, FIG. 8A).

In some embodiments, the device also displays text identifying the current location of the user-moveable location marker on the map. For example, the device may be configured to automatically display text identifying the current location in user-selectable region 1006 (FIG. 10A). In some embodiments, text identifying the location of the marker may be displayed elsewhere in UI 1000A (FIG. 10A) or in an interface (e.g., UI 1000B, FIG. 10B) for displaying additional options and information associated with the location marker.

In some embodiments, the device transmits (1510) a request for a reverse lookup of the current location of the user-moveable location marker on the map and receives information identifying the current location of the user-moveable location marker on the map. In some embodiments, the device transmits the request for the reverse lookup without user intervention at predetermined times (e.g., when the marker is initially placed on the map and after the marker has been moved on the map). In some embodiments, the device transmits the request for the reverse lookup in response to a user request (e.g., in response to detecting a finger tap gesture 1016 on location marker 1002-1 (FIG. 10A). In some embodiments, UI 1000A (FIG. 10A) or UI 1000B (FIG. 10B) contains a reverse lookup icon (not shown) allowing the user to request a reverse lookup of the marker location.

In response to detecting a second finger gesture on the user-moveable location marker, the device moves (1106) the user-moveable location marker on the map in accordance with the second finger gesture. For example, in FIG. 10A, the device moves the location marker 1002-1 in accordance with a second finger gesture 1012.

In some embodiments, the second finger gesture (e.g., 1012, FIG. 10A) includes a finger contact area that moves on the touch screen. In some embodiments, moving the user-moveable location marker on the map in accordance with the second finger gesture includes displaying the user-moveable location marker offset from the moving finger contact area during the second finger gesture. For example, in FIG. 10A the second finger gesture includes a finger contact area 1013 that moves on the touch screen. The user-moveable marker 1002-1 is offset from the moving finger contact area 1013. More details on moving the marker 1002-1 will be discussed with respect to FIGS. 12C(1)-12C(5) below.

In some embodiments, the user-moveable location marker is offset from the moving finger contact area such that a user's view of the user-moveable location marker is not obscured by the second finger gesture while moving the user-moveable location marker on the map in accordance with the second finger gesture. For example, the finger contact area (e.g., area 1013, FIG. 10A, and area 1214, FIGS. 12C(2)-12C(4)) is offset from the moving location marker 1002-1 so that the location marker is not obscured by the second finger gesture (FIG. 10A). More details on moving the location marker 1002-1 will be discussed in reference to FIG. 12C(1)-12C(5) below.

While displaying the map and the user-moveable location marker, the device displays (1108) a user-selectable region for obtaining information associated with a current location of the user-moveable location marker on the map. For example, UI 1000A (FIG. 10A) includes a user selectable region 1004 for obtaining information associated with the marker 1002-1. In some embodiments, the user-selectable region 1004 is denoted by a chevron (e.g. ">") and moves with the marker. In some embodiments, the display of user-selectable regions 1006 and 1004 is toggled on by a finger tap on the location marker 1002-1 and toggled off by a finger tap on region 1006. In other embodiments, region 1006 is a user-selectable region for obtaining information associated with a current location of the user-moveable location marker on the map.

In response to detecting a third finger gesture on the user-selectable region for obtaining information, the display of the map and the user-moveable location marker is replaced (1110) with a display of a plurality of option icons. For example, in response to a third finger gesture 1010 on the user-selectable region 1004 (FIG. 10A), the device replaces the display of the map 5266 and the marker 1002-1 with a display of a plurality of option icons (e.g., icons 1024, 1026, 1028, 1030, 1032, and 1034 in UI 1000B, FIG. 10B). The plurality of option icons includes a first icon (add to bookmarks icon 1024), a second icon (directions to here icon 1026), and a third icon (directions from here icon 1028) that are described in more detail below.

In response to detection of a finger gesture on the first icon, the display of the plurality of option icons is replaced (1110) with a display of a user interface for adding an entry to a set of bookmarked locations. The added entry corresponds to the current location of the user-moveable location marker on the map. For example, in UI 1000B (FIG. 10B), in response to detection of a finger gesture 1036 on the add to bookmarks icon 1024, the display of the plurality of option icons is replaced with a display of a user interface (e.g., UI 1000E FIG. 10E) for adding an entry to a set of bookmarked locations. UI 1000E may include a text input box for modifying the name of the location marker ("Dropped Pin", FIG. 10E) with a soft keyboard 5236.

In some embodiments, adding the entry to the set of bookmarked locations includes displaying a sequence of graphical user interfaces responsive to user gestures for adding the entry to the set of bookmarked locations.

In response to detection of a finger gesture on the second icon, the display of the plurality of option icons is replaced (1110) with a display of a user interface for getting directions to the current location of the user-moveable location marker on the map from another location. For example, in response to a finger gesture 1038 (FIG. 10B) on the directions to here icon 1026, the display of the plurality of option icons is replaced with a display of a user interface UI 1000C (FIG. 10C) for getting directions to the location of the marker on the map. In UI 1000C (FIG. 10C), the area 5215 for entering the end point is automatically populated with the name of the location marker (e.g., "Dropped Pin" in FIG. 10C). The user then merely has to enter the starting location and activate the route initiation icon 5227 (e.g., by a finger tap on the icon) to obtain directions to the current location of the user-moveable location marker on the map. In some embodiments, the device requests a reverse lookup to identify the current location of the marker.

In response to detection of a finger gesture on the third icon, the display of the plurality of option icons is replaced (1514) with a display of a user interface for getting directions from the current location of the user-moveable location marker on the map to another location. For example, in response to a finger gesture 1040 (FIG. 10B) on the directions from here icon 1028, the display of the plurality of option icons is replaced with a display of a user interface UI 1000D (FIG. 10D) for getting directions from the location of the marker on the map. In UI 1000D (FIG. 10D), the area 5213 for entering the start point is automatically populated with the name of the location marker (e.g., "Dropped Pin" in FIG. 10D). The user then merely has to enter the ending location and activate the route initiation icon 5227 (e.g., by a finger tap on the icon) to obtain directions from the current location of the user-moveable location marker on the map. In some embodiments, the device requests a reverse lookup to identify the current location of the marker.

In some embodiments, the plurality of option icons include a fourth icon (remove location marker icon 1030), wherein in response to detection of a finger gesture on the fourth icon, the user-moveable location marker is deleted. For example, in response to a finger gesture 1042 (FIG. 10B) on the remove location marker icon 1030 (e.g. "Remove Pin"), the corresponding user-moveable location marker 1002-1 is deleted from the map 5266 (FIG. 10A).

In some embodiments, the plurality of option icons include an icon for adding an entry to a list of contacts, the added entry including location information corresponding to the map location of the marker. For example, in response to a finger gesture 1044 (FIG. 10B) on the create new contact icon 1032, UI 1000B is replaced with display of a user interface (or series of user interfaces) for adding an entry to a set of contacts, the added entry including location information corresponding to the location of the user-moveable location marker 1002-1 on the map 5266 (FIG. 10A).

In some embodiments, the plurality of option icons include an icon for updating an entry in a list of contacts to include location information corresponding to the current location of the user-moveable location marker on the map. For example, in response to a finger gesture 1046 (FIG. 10B) on the add to existing contact icon 1034, UI 1000B is replaced with display of a user interface (or series of user interfaces) for updating an entry in a set of contacts to include location information corresponding to the location of the user-moveable location marker 1002-1 on the map 5266 (FIG. 10A).

FIGS. 12A-12E illustrate examples of user interactions with a displayed map, a user-moveable location marker, and information associated with the location marker via finger gestures in accordance with some embodiments. FIGS. 12A-12E are used to illustrate the process 1300 described below with respect to FIG. 13.

Figure 13:
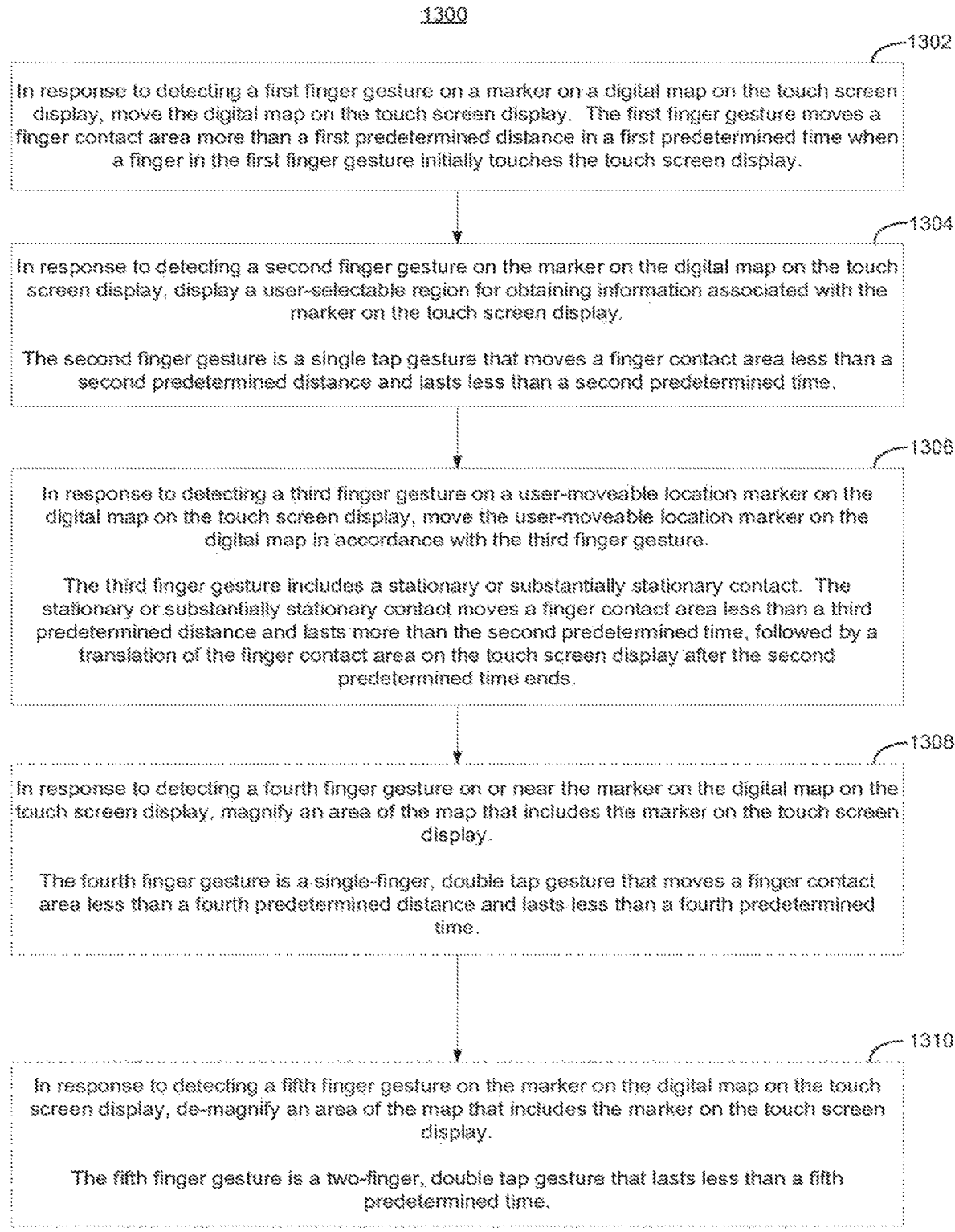
FIG. 13 is a flow diagram illustrating a method for interacting with a displayed map and a location marker in accordance with some embodiments.

FIG. 13 is a flow diagram illustrating a method 1300 for interacting with a displayed map and a location marker in accordance with some embodiments. The method 1300 distinguishes between gestures intended to move a map, gestures intended to move a location marker rather than the map, gestures intended for getting additional information about the location marker, and gestures intended for other types of interactions with the map. The method 1300 occurs at a computing device with a touch screen display (e.g., portable multifunction device 100). The method permits a map application on a touch screen display to respond to imprecise finger gestures in a manner that conforms to a user's expectations. In other words, the method enables a user's finger gestures to control a map application in a simple, intuitive way.

In response to detecting a first finger gesture on a marker on a digital map on the touch screen display, the device moves (1302) the digital map on the touch screen display. The first finger gesture moves a finger contact area more than a first predetermined distance in a first predetermined time when a finger in the first finger gesture initially touches the touch screen display.

Figure 12A:
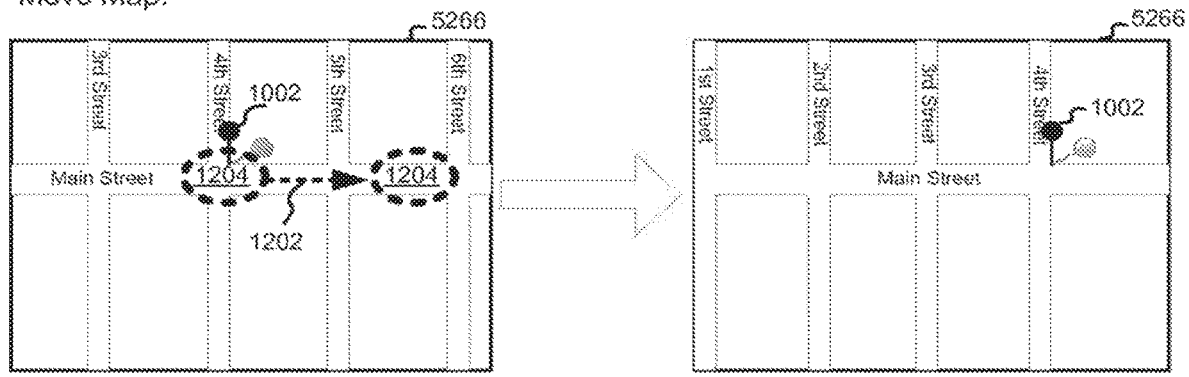

For example, in FIG. 12A, first finger gesture 1202 moves a finger contact area 1204 more than a first predetermined distance (e.g., 3-5 mm) in a first predetermined time (e.g., 0.2-0.3 seconds) when a finger in the first finger gesture 1202 initially touches the touch screen display. In response to detecting first finger gesture 1202 on a marker 1002 on a digital map 5266 on the touch screen display, the device moves (1302) the digital map 5266 on the touch screen display, as shown in FIG. 12A.

The device interprets the initial movement in the first finger gesture 1202 as an instruction to move the displayed map (e.g., in accordance with the movement of the first finger gesture), rather than interpreting the first finger gesture as some other instruction (e.g., an instruction associated with the second, third, fourth, or fifth finger gestures, described below).

In response to detecting a second finger gesture on the marker on the digital map on the touch screen display, the device displays (1304) a user-selectable region for obtaining information associated with the marker on the touch screen display. The second finger gesture is a single tap gesture that moves a finger contact area less than a second predetermined distance and lasts less than a second predetermined time.

Figure 12B:
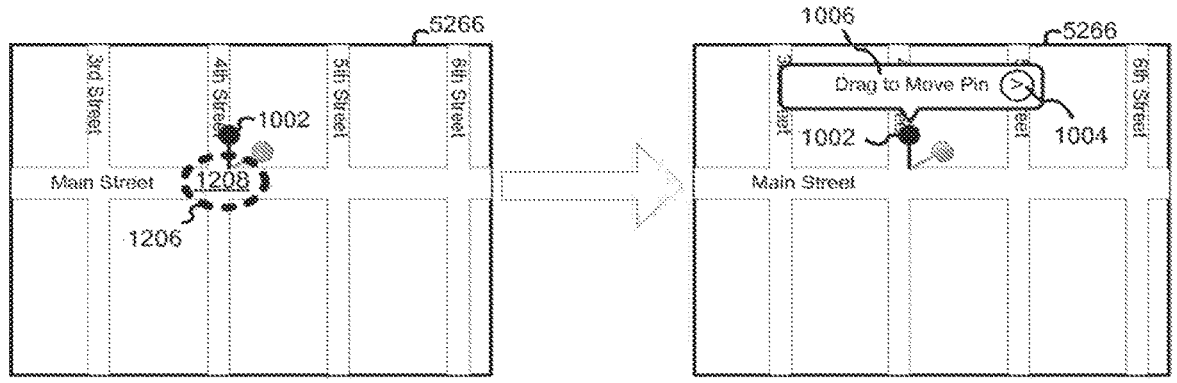

For example, in FIG. 12B, second finger gesture 1206 is a single tap gesture that moves a finger contact area 1208 less than a second predetermined distance (e.g., 3-5 mm) and lasts less than a second predetermined time (e.g., 0.2-0.3 seconds). In response to detecting the second finger gesture 1206 on the marker 1002 on the digital map 5266 on the touch screen display, the device displays (1304) a user-selectable region 1004 for obtaining information associated with the marker 1002 on the touch screen display, as shown in FIG. 12B.

The device interprets the second finger single tap gesture 1206 as an instruction to display user-selectable region 1004 for obtaining information associated with the marker 1002, rather than interpreting the second finger gesture as some other instruction (e.g., an instruction associated with the first, third, fourth, or fifth finger gestures).

In some embodiments, the second predetermined distance for the second gesture is the same as the first predetermined distance for the first gesture. Alternatively, in some embodiments, the second predetermined distance for the second gesture is different from the first predetermined distance for the first gesture. In some embodiments, the second predetermined time for the second gesture is the same as the first predetermined time for the first gesture. Alternatively, in some embodiments, the second predetermined time for the second gesture is different from, the first predetermined time for the first gesture.

In response to detecting a third finger gesture on a user-moveable location marker on the digital map on the touch screen display, the device moves (1306) the user-moveable location marker on the digital map in accordance with the third finger gesture. The third finger gesture includes a stationary (or substantially stationary) contact followed by translation of a finger contact area on the touch screen display after the second predetermined time ends. The stationary (or substantially stationary) contact moves the finger contact area less than a third predetermined distance and lasts more than the second predetermined time.

For example, in FIG. 12C, third finger gesture 1212 includes a stationary (or substantially stationary) contact 1212-1 followed by translation 1212-2 of a finger contact area on the touch screen display after the second predetermined time ends. The stationary (or substantially stationary) contact 1212-1 moves the finger contact area less than a third predetermined distance (e.g., 3-5 mm) and lasts more than the second predetermined time (e.g., 0.2-0.3 seconds). In response to detecting the third finger gesture 1212 on a user-moveable location marker 1002 (FIG. 12C) on the digital map on the touch screen display, the device moves (1306) the user-moveable location marker 1002 on the digital map in accordance with the third finger gesture (e.g., in FIGS. 12C(1)-12C(5), from $4^{th}$ street to $6^{th}$ street in accordance with translation 1212-2).

In some embodiments, the third finger gesture 1212 includes a finger contact area 1214 that moves on the touch screen. In some embodiments, moving the user-moveable location marker 1002 on the map 5266 in accordance with the third finger gesture 1212-2 includes displaying the user-moveable location marker 1002 offset from the moving finger contact area 1214 during the third finger gesture 1212-2. For example, in FIG. 12C(1), the user-moveable location marker 1002 is initially obscured by finger contact area 1214. After contact 1212-1 has exceeded the second predetermined time (e.g., 0.2-0.3 seconds), the user-moveable location marker 1002 may be offset from the finger contact area 1214 (FIG. 12C(2)). In some embodiments, an animation is displayed that shows the user-moveable location marker 1002 being offset from the finger contact area 1214 (e.g., an animation that transitions from FIG. 12C(1) to FIG. 12C(2)). In some embodiments, a shadow 1210 of the user-moveable location marker 1002 is displayed. In some embodiments, the shadow 1210 touches the user-moveable location marker 1002 to indicate that the marker 1002 is "attached" to the map 5266 and cannot be moved (e.g., FIGS. 12C(1) and 12C(5)). In some embodiments, the shadow 1210 is separated from the user-moveable location marker 1002 to indicate that the marker 1002 has been "detached" or "lifted up" from the map 5266 so that the marker 1002 (but not the map 5266) will move in accordance with the finger gesture (e.g., the marker moves in accordance with gesture 1212-2 in FIGS. 12C(2)-12C(4), with the shadow 1210 separated from the marker 1002).

In some embodiments, the user-moveable location marker 1002 is offset from the moving finger contact area such that a user's view of the user-moveable location marker is not obscured by the third finger gesture while moving the user-moveable location marker 1002 on the map 5266 in accordance with the third finger gesture. For example, the finger contact area 1214 in FIGS. 12C(2)-12C(4) is offset from the moving location marker 1002 so that the location marker 1002 is not obscured by the third finger gesture.

The device interprets the third finger gesture 1212 as an instruction to move the user-moveable location marker 1002 on the digital map in accordance with the third finger gesture 1212, rather than interpreting the third finger gesture as some other instruction (e.g., an instruction associated with the first, second, fourth, or fifth finger gestures).

In some embodiments, in response to detecting a fourth finger gesture on or near the marker on the digital map on the touch screen display, the device magnifies (1308) an area of the map that includes the marker on the touch screen display. The fourth finger gesture is a single-finger, double tap gesture that moves a finger contact area less than a fourth predetermined distance and lasts less than a fourth predetermined time. In some embodiments, the fourth predetermined time is equal to the second predetermined time.

Figure 12D:
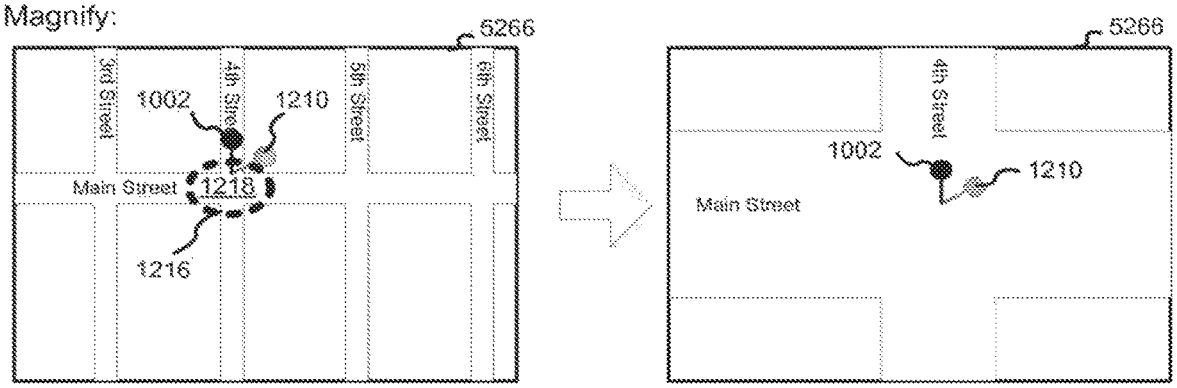

For example, in FIG. 12D, the fourth finger gesture 1216 is a single-finger, double tap gesture that moves a finger contact area 1218 less than a fourth predetermined distance (e.g., 3-5 mm) and lasts less than a fourth predetermined time (e.g., 0.2-0.3 seconds). In some embodiments, in response to detecting the fourth finger gesture 1216 on or near the marker 1002 on the digital map 5266 on the touch screen display, the device magnifies (1308) an area of the map that includes the marker 1002 on the touch screen display (FIG. 12D). In some embodiments, the fourth predetermined time is equal to the second predetermined time. In some embodiments, the device compares the time delay between detection of a first tap gesture and a second tap gesture to a predetermined value (e.g., 0.1-0.2 seconds) to determine if the user is making a double tap gesture. In some embodiments, the device also compares a change in location of the first tap gesture and the second tap gesture to a predetermined value (e.g., 3-5 mm) to determine if the user is making a double tap gesture.

The device interprets the fourth finger gesture 1216 as an instruction to magnify an area of the map that includes the marker, rather than interpreting the fourth finger gesture as some other instruction (e.g., an instruction associated with the first, second, third, or fifth finger gestures).

In some embodiments, in response to detecting a fifth finger gesture on the marker on the digital map on the touch screen display, the device demagnifies (1310) an area of the map that includes the marker on the touch screen display. The fifth finger gesture is a two-finger, double tap gesture that lasts less than a fifth predetermined time. In some embodiments, the fifth predetermined time is equal to the second predetermined time.

Figure 12E:
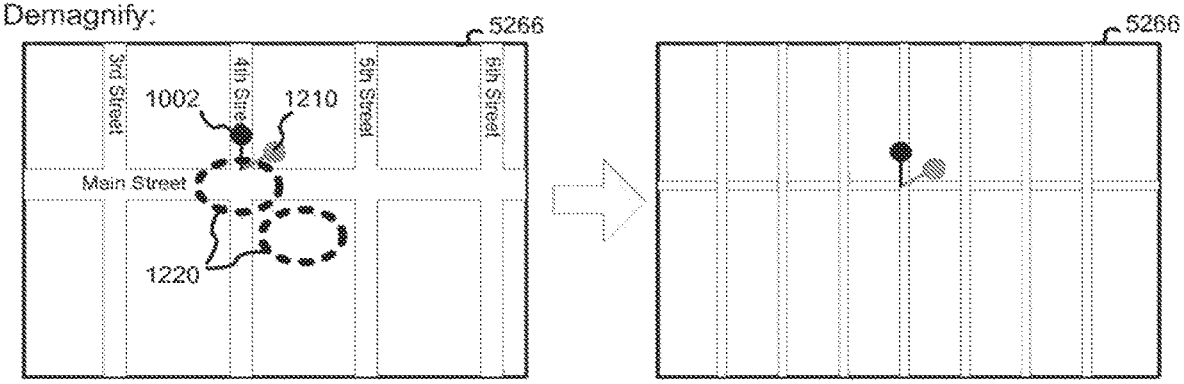

For example, in FIG. 12E, the fifth finger gesture 1218 is a two-finger, double tap gesture that lasts less than a fifth predetermined time (e.g., 0.2-0.3 seconds). In response to detecting the fifth finger gesture 1218 on the marker 1002 on the digital map 5266 on the touch screen display, the device demagnifies (1310) an area of the map that includes the marker on the touch screen display (FIG. 12E). In some embodiments, the fifth predetermined time is equal to the second predetermined time. In some embodiments, the device compares the time delay between detection of a first two-finger tap gesture and a second two-finger tap gesture to a predetermined value (e.g., 0.1-0.2 seconds) to determine if the user is making a two-finger double tap gesture. In some embodiments, the device also compares changes in locations of the two fingers in the first tap gesture and the two fingers in the second tap gesture to predetermined values (e.g., 3-5 mm) to determine if the user is making a two-finger double tap gesture.

The device interprets the fifth finger gesture 1218 as an instruction to demagnify an area of the map that includes the marker, rather than interpreting the fifth finger gesture as some other instruction (e.g., an instruction associated with the first, second, third, or fourth finger gestures).

Figure 14:
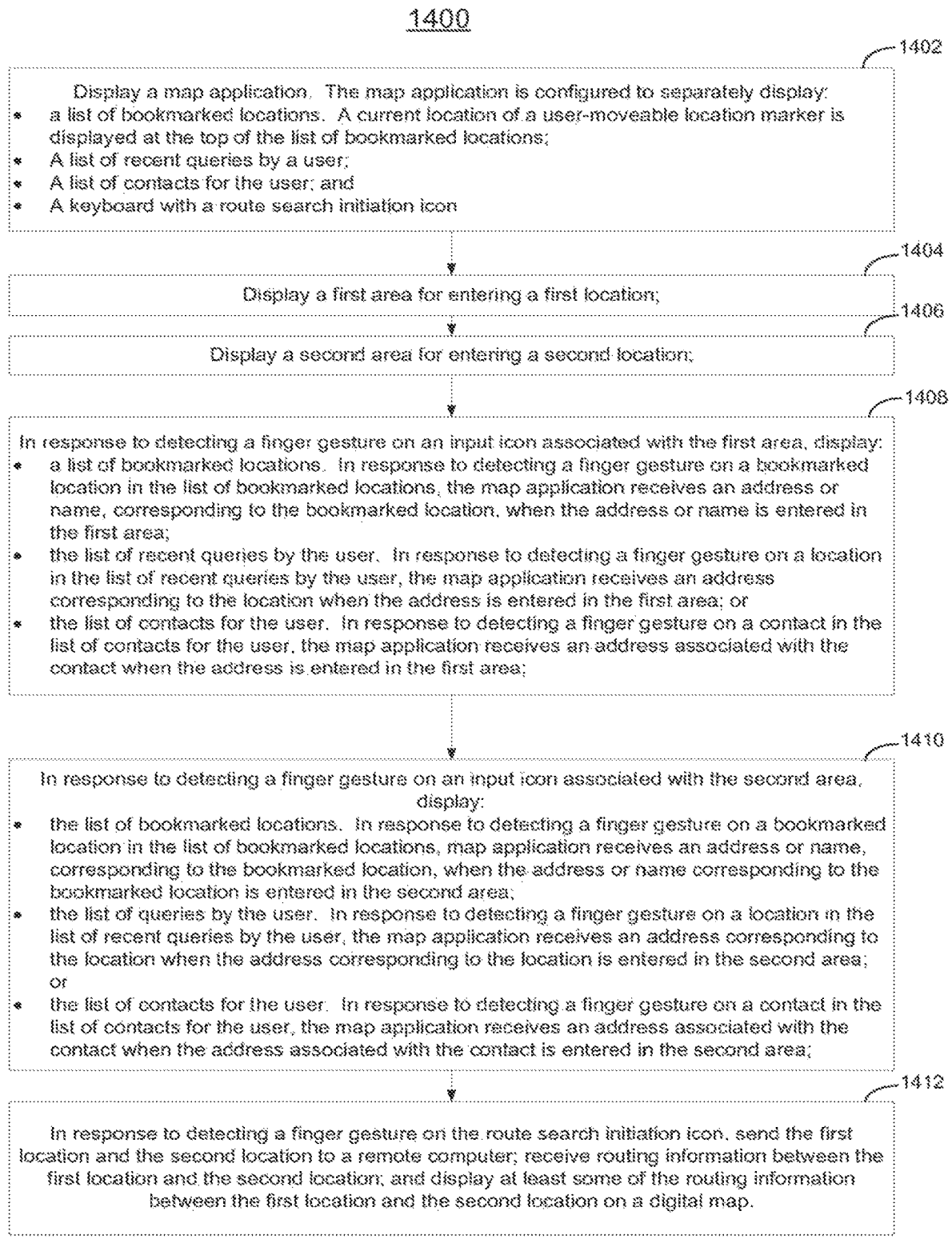
FIG. 14 is a flow diagram illustrating a method for obtaining directions in accordance with some embodiments.

FIG. 14 is a flow diagram illustrating a method 1400 for obtaining directions in accordance with some embodiments. The method 1400 occurs at a computing device with a touch screen display (e.g., portable multifunction device 100).

The computing device displays (1402) a map application. The map application is configured to separately display:
    a list 5240 (FIG. 10F) of bookmarked locations, wherein
        a current location icon 1070 for the device is displayed at the top of the list of bookmarked locations 5434;
    a list 5246 (FIG. 5H) of recent queries by a user;
    a list 5252 (FIG. 5J) of contacts for the user; and a keyboard 5216 with a mute search initiation icon 5225 (FIG. 5R);

In some embodiments, if the view location icon 602 (FIG. 6A) is activated (e.g., by a finger tap 610 on the icon), a current location icon 1070 corresponding to the current location of the device is displayed at the top of the list of bookmarked locations 5434 even if the current location has not been made into a bookmark (e.g., even if UI 1000E (FIG. 10E) is not used on the current location). In process 1400, the current location icon 1070 is treated as a bookmarked location even if it is not an actual bookmarked location.

In some embodiments, the list 5240 (FIG. 10F) of bookmarked locations may include an entry 1070 corresponding to the current location of the device and an entry 1072 (e.g., "Dropped Pin") corresponding to the location of a user-moveable marker 1002. In some embodiments, entries 1070 and 1072 are displayed at the top of the list of bookmarked locations 5434 (e.g., in the first two positions in the list) even if these two entries have not been made into bookmarks (e.g., even if UI 1000E (FIG. 10E) is not used on the current location or the location of a corresponding user-moveable marker 1002). In process 1400, entries 1070 and 1072 are treated as bookmarked locations even if entries 1070 and 1072 are not actual bookmarked locations. Having one or both of these entries at the top of the list of bookmarked locations makes it easy for a user to add these locations to a search, to the starting location of a route search, and/or to the ending location of a route search (e.g., by a finger tap on entry 1070 or entry 1072).

In response to detecting a finger gesture on an input icon associated with the first area (e.g., input icon 5219 associated with area 5213, FIG. 10C), the device displays (1408):
the list 5240 (FIG. 10F) of bookmarked locations, wherein in response to detecting a finger gesture on a bookmarked location (including entry 1070 or entry 1072) in the list of bookmarked locations, the map application receives an address or name, corresponding to the bookmarked location, when the address or name is entered in the first area;
the list 5246 (FIG. 5H) of recent queries by the user, wherein in response to detecting a finger gesture on a location in the list of recent queries by the user, the map application receives an address corresponding to the location when the address is entered in the first area; or
the list 5252 (FIG. 5J) of contacts for the user, wherein in response to detecting a finger gesture on a contact in the list of contacts for the user, the map application receives an address associated with the contact when the address is entered in the first area;

In response to detecting a finger gesture on an input icon associated with the second area (e.g., input icon 5223 associated with area 5215, FIG. 10C), the device displays (1410):
the list 5240 (FIG. 10F) of bookmarked locations, wherein in response to detecting a finger gesture on a bookmarked location (including entry 1070 or entry 1072) in the list of bookmarked locations, the map application receives an address or name, corresponding to the bookmarked location, when the address or name corresponding to the bookmarked location is entered in the second area;
the list 5246 (FIG. 5H) of recent queries by the user, wherein in response to detecting a finger gesture on a location in the list of recent queries by the user, the map application receives an address corresponding to the location when the address corresponding to the location is entered in the second area; or
the list 5252 (FIG. 5J) of contacts for the user, wherein in response to detecting an finger gesture on a contact in the list of contacts for the user, the map application receives an address associated with the contact when the address associated with the contact is entered in the second area.

In response to detecting a finger gesture on the route search initiation icon (e.g., 5227, FIG. 10C), the device (1412):
sends the first location and the second location to a remote computer;
receives muting information between the first location and the second location; and
displays at least some of the routing information between the first location and the second location on a digital map.

Figure 15:
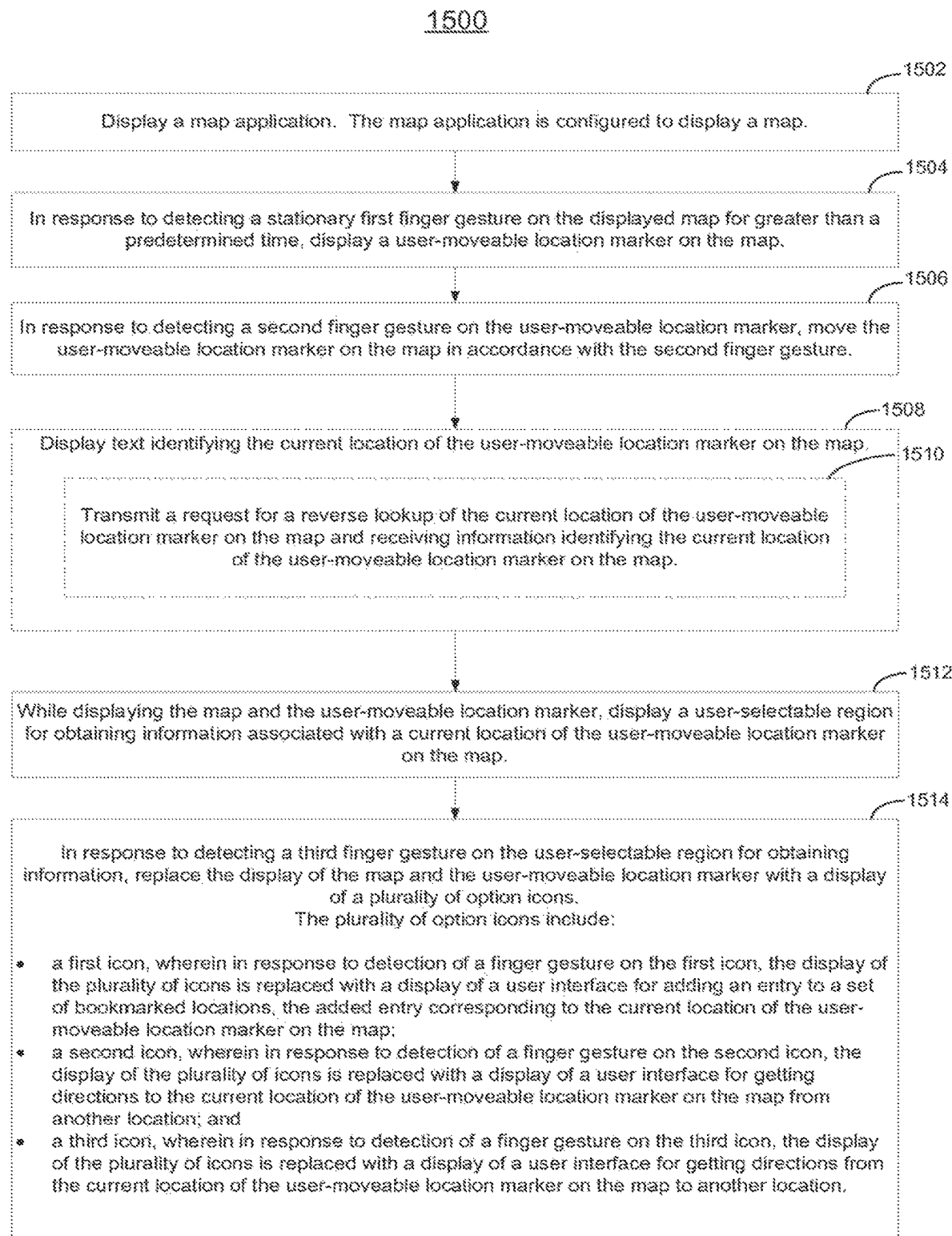
FIG. 15 is a flow diagram illustrating a method for displaying and moving a user-moveable location marker on a map in accordance with some embodiments.

FIG. 15 is a flow diagram illustrating a method for displaying and moving a user-moveable location marker 1002 on a map in accordance with some embodiments. The method 1500 occurs at a computing device with a touch screen display (e.g., portable multifunction device 100). The method 1500 provides a simple way for a user to place a location marker on the displayed map, and retrieve information associated with the location of the marker (e.g., the address of the marker and directions to or from the marker).

The device displays (1502) a map application (e.g., 154, FIG. 1B). The map application is configured to display a map (e.g., map 5266, FIG. 10A). In response to detecting a stationary first finger gesture (e.g., 1016, FIG. 10A) on the displayed map for greater than a predetermined time, the device displays (1504) a user-moveable location marker (e.g., marker 1002-1, FIG. 10A) on the map. Thus, in method 1500, a user-moveable location marker is added to a map merely by touching and holding a finger on the touch screen display for greater than a predetermined time (e.g., 0.5-1.0 seconds). The remainder of method 1500 is similar to method 1100, described above In response to detecting a second finger gesture on the user-moveable location marker, the device moves (1506) the user-moveable location marker on the map in accordance with the second finger gesture. For example, in FIG. 10A, the device moves the location marker 1002-1 in accordance with a second finger gesture 1012.

In some embodiments, the second finger gesture (e.g., 1012, FIG. 10A) includes a finger contact area that moves on the touch screen. In some embodiments, moving the user-moveable location marker on the map in accordance with the second finger gesture includes displaying the user-moveable location marker offset from the moving finger contact area during the second finger gesture. For example, in FIG. 10A the second finger gesture includes a finger contact area 1013 that moves on the touch screen. The user-moveable marker 1002-1 is offset from the moving finger contact area 1013. More details on moving the marker 1002-1 were discussed with respect to FIG. 12C(1)-12C(5) above.

In some embodiments, the user-moveable location marker is offset from the moving finger contact area such that a user's view of the user-moveable location marker is not obscured by the second finger gesture while moving the user-moveable location marker on the map in accordance with the second finger gesture. For example, the finger contact area (e.g., area 1013, FIG. 10A, and area 1214, FIG. 12C(2)-12C(4)) is offset from the moving location marker 1002-1 so that the location marker is not obscured by the second finger gesture (FIG. 10A). More details on moving the location marker 1002-1 were discussed in reference to FIG. 12C(1)-12C(5) above.

In some embodiments, the device displays (1508) text identifying the current location of the user-moveable location marker on the map. For example, the device may be configured to automatically display text identifying the current location in user-selectable region 1006 (FIG. 10A). In some embodiments, text identifying the location of the marker may be displayed elsewhere in UI 1000A (FIG. 10A) or in an interface (e.g., UI 1000B, FIG. 10B) for displaying additional options and information associated with the location marker.

In some embodiments, the device transmits (1510) a request for a reverse lookup of the current location of the user-moveable location marker on the map and receives information identifying the current location of the user-moveable location marker on the map. In some embodiments, the device transmits the request for the reverse lookup without user intervention at predetermined times (e.g., when the marker is initially placed on the map and after the marker has been moved on the map). In some embodiments, the device transmits the request for the reverse lookup in response to a user request (e.g., in response to detecting a finger tap gesture 1016 on location marker 1002-1 (FIG. 10A). In some embodiments, UI 1000A (FIG. 10A) or U 1000B (FIG. 10B) contains a reverse lookup icon (not shown) allowing the user to request a reverse lookup of the marker location.

While displaying the map and the user-moveable location marker, the device displays (1512) a user-selectable region for obtaining information associated with a current location of the user-moveable location marker on the map. For example, UI 1000A (FIG. 10A) includes a user selectable region 1004 for obtaining information associated with the marker 1002-1. In some embodiments, the user-selectable region 1004 is denoted by a chevron (e.g. ">") and moves with the marker. In some embodiments, the display of user-selectable regions 1006 and 1004 is toggled on by a finger tap on the location marker 1002-1 and toggled off by a finger tap on region 1006. In other embodiments, region 1006 is a user-selectable region for obtaining information associated with a current location of the user-moveable location marker on the map In response to detecting a third finger gesture on the user-selectable region for obtaining information, the display of the map and the user-moveable location marker is replaced (1514) with a display of a plurality of option icons. For example, in response to a third finger gesture 1010 on the user-selectable region 1004 (FIG. 10A), the device replaces the display of the map 5266 and the marker 1002-1 with a display of a plurality of option icons (e.g., icons 1024, 1026, 1028, 1030, 1032, and 1034 in UI 1000B, FIG. 10B). The plurality of option icons includes a first icon (add to bookmarks icon 1024), a second icon (directions to here icon 1026), and a third icon (directions from here icon 1028) that are described in more detail below.

In response to detection of a finger gesture on the first icon, the display of the plurality of option icons is replaced (1514) with a display of a user interface for adding an entry to a set of bookmarked locations. The added entry corresponds to the current location of the user-moveable location marker on the map. For example, in UI 1000B (FIG. 10B), in response to detection of a finger gesture 1036 on the add to bookmarks icon 1024, the display of the plurality of option icons is replaced with a display of a user interface (e.g., UI 1000E FIG. 10E) for adding an entry to a set of bookmarked locations. UI 1000E may include a text input box for modifying the name of the location marker ("Dropped Pin", FIG. 10E) with a soft keyboard 5236.

In some embodiments, adding the entry to the set of bookmarked locations includes displaying a sequence of graphical user interfaces responsive to user gestures for adding the entry to the set of bookmarked locations.

In response to detection of a finger gesture on the second icon, the display of the plurality of option icons is replaced (1514) with a display of a user interface for getting directions to the current location of the user-moveable location marker on the map from another location. For example, in response to a finger gesture 1038 (FIG. 10B) on the directions to here icon 1026, the display of the plurality of option icons is replaced with a display of a user interface UI 1000C (FIG. 10C) for getting directions to the location of the marker on the map. In UI 1000C (FIG. 100C), the area 5215 for entering the end point is automatically populated with the name of the location marker (e.g., "Dropped Pin" in FIG. 10C). The user then merely has to enter the starting location and activate the route initiation icon 5227 (e.g., by a finger tap on the icon) to obtain directions to the current location of the user-moveable location marker on the map. In some embodiments, the device requests a reverse lookup to identify the current location of the marker.

In response to detection of a finger gesture on the third icon, the display of the plurality of option icons is replaced (1514) with a display of a user interface for getting directions from the current location of the user-moveable location marker on the map to another location. For example, in response to a finger gesture 1040 (FIG. 10B) on the directions from here icon 1028, the display of the plurality of option icons is replaced with a display of a user interface UT 1000D (FIG. 10D) for getting directions from the location of the marker on the map. In UI 1000D (FIG. 10D), the area 5213 for entering the start point is automatically populated with the name of the location marker (e.g., "Dropped Pin" in FIG. 10D). The user then merely has to enter the ending location and activate the route initiation icon 5227 (e.g., by a finger tap on the icon) to obtain directions from the current location of the user-moveable location marker on the map. In some embodiments, the device requests a reverse lookup to identify the current location of the marker.

In some embodiments, the plurality of option icons include a fourth icon (remove location marker icon 1030), wherein in response to detection of a finger gesture on the fourth icon, the user-moveable location marker is deleted. For example, in response to a finger gesture 1042 (FIG. 10B) on the remove location marker icon 1030 (e.g. "Remove Pin"), the corresponding user-moveable location marker 1002-1 is deleted from the map 5266 (FIG. 10A).

In some embodiments, the plurality of option icons include an icon for adding an entry to a list of contacts, the added entry including location information corresponding to the map location of the marker. For example, in response to a finger gesture 1044 (FIG. 10B) on the create new contact icon 1032, UI 1000B is replaced with display of a user interface (or series of user interfaces) for adding an entry to a set of contacts, the added entry including location information corresponding to the location of the user-moveable location marker 1002-1 on the map 5266 (FIG. 10A).

In some embodiments, the plurality of option icons include an icon for updating an entry in a list of contacts to include location information corresponding to the current location of the user-moveable location marker on the map. For example, in response to a finger gesture 1046 (FIG. 10B) on the add to existing contact icon 1034, UI 1000B is replaced with display of a user interface (or series of user interfaces) for updating an entry in a set of contacts to include location information corresponding to the location of the user-moveable location marker 1002-1 on the map 5266 (FIG. 10A).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computing device, comprising:
    a touch screen display;
    one or more processors;
    memory; and
    one or more programs, wherein the one or more programs are stored in the memory and configured to be executed by the one or more processors, the one or more programs including instructions for:
        displaying a map application, wherein the map application is configured to display a map;
        receiving location information for the computing device; and
        in response to detecting a user gesture on a view location icon while the map application is displayed:
            displaying a first visual indicator on a portion of the displayed map that indicates an approximate region in which the computing device is located in accordance with the received location information when the approximate region lies within the displayed map; and
            displaying a second visual indicator around a perimeter of the displayed map when the approximate region includes the displayed map and also extends beyond the displayed map;
        changing from displaying the first visual indicator to displaying the second visual indicator in response to magnifying an area of the map that includes the approximate region in which the computing device is located, wherein the first visual indicator is not displayed while the second visual indicator is being displayed; and
        changing from displaying the second visual indicator to displaying the first visual indicator in response to demagnifying an area of the map that includes the approximate region in which the computing device is located, wherein the second visual indicator is not displayed while the first visual indicator is being displayed.

2. The computing device of claim 1, wherein detecting the user gesture on the view location icon initiates a request for the location information for the computing device.

3. The computing device of claim 1, wherein the one or more programs further include instructions for receiving the location information from a transmitting device that is located within a region corresponding to the displayed first visual indicator.

4. The computing device of claim 1, wherein the location information corresponds to one or more terrestrial transmitting devices from which the computing device receives signals.

5. The computing device of claim 1, wherein the one or more programs further include instructions for:
    receiving signals from a plurality of services capable of providing the location information; and
    selecting location information from one of the plurality of services in accordance with location information selection criteria.

6. The computing device of claim 1, wherein the first visual indicator includes a circle displayed on the displayed map.

7. The computing device of claim 1, wherein the first visual indicator includes a rectangle displayed on the displayed map.

8. The computing device of claim 1, wherein the second visual indicator includes a rectangle displayed at the perimeter of the displayed map.

9. The computing device of claim 1, wherein while displaying the second visual indicator, the second visual indicator occupies a first area of the touch screen display, the instructions further for:
    while displaying the map and the second visual indicator, receiving an input to magnify the area of the map that includes the approximate region in which the computing device is located; and
    in response to receiving the input:
        magnifying the area of the map that includes the approximate region in which the computing device is located; and
        continuing to display the second visual indicator occupying the first area of the touch screen display.

10. The computing device of claim 1, wherein the first visual indicator and the second visual indicator are displayed overlaid on the map.

11. The computing device of claim 1, wherein changing from displaying the second visual indicator to displaying the first visual indicator is based on detecting a de-pinching gesture, and wherein changing from displaying the first visual indicator to displaying the second visual indicator is based on detecting a pinching gesture.

12. A computer-implemented method, comprising:
    at a computing device with a touch screen display:
        displaying a map application, wherein the map application is configured to display a map;
        receiving location information for the computing device; and
        in response to detecting a user gesture on a view location icon while the map application is displayed:
            displaying a first visual indicator on a portion of the displayed map that indicates an approximate region in which the computing device is located in accordance with the received location information when the approximate region lies within the displayed map; and
            displaying a second visual indicator around a perimeter of the displayed map when the approximate region includes the displayed map and also extends beyond the displayed map;
        changing from displaying the first visual indicator to displaying the second visual indicator in response to magnifying an area of the map that includes the approximate region in which the computing device is located, wherein the first visual indicator is not displayed while the second visual indicator is being displayed; and
        changing from displaying the second visual indicator to displaying the first visual indicator in response to demagnifying an area of the map that includes the approximate region in which the computing device is located, wherein the second visual indicator is not displayed while the first visual indicator is being displayed.

13. The computer-implemented method of claim 12, wherein detecting the user gesture on the view location icon initiates a request for the location information for the computing device.

14. The computer-implemented method of claim 12, further comprising receiving the location information from a transmitting device that is located within a region corresponding to the displayed first visual indicator.

15. The computer-implemented method of claim 12, wherein the location information corresponds to one or more terrestrial transmitting devices from which the computing device receives signals.

16. The computer-implemented method of claim 12, further comprising:
    receiving signals from a plurality of services capable of providing the location information; and
    selecting location information from one of the plurality of services in accordance with location information selection criteria.

17. The computer-implemented method of claim 12, wherein the first visual indicator includes a circle displayed on the displayed map.

18. The computer-implemented method of claim 12, wherein the first visual indicator includes a rectangle displayed on the displayed map.

19. The computer-implemented method of claim 12, wherein the second visual indicator includes a rectangle displayed at the perimeter of the displayed map.

20. The computer-implemented method of claim 12, wherein while displaying the second visual indicator, the second visual indicator occupies a first area of the touch screen display, further comprising:
    while displaying the map and the second visual indicator, receiving an input to magnify the area of the map that includes the approximate region in which the computing device is located; and
    in response to receiving the input:
        magnifying the area of the map that includes the approximate region in which the computing device is located; and
        continuing to display the second visual indicator occupying the first area of the touch screen display.

21. The computer-implemented method of claim 12, wherein the first visual indicator and the second visual indicator are displayed overlaid on the map.

22. The computer-implemented method of claim 12, wherein changing from displaying the second visual indicator to displaying the first visual indicator is based on detecting a de-pinching gesture, and wherein changing from displaying the first visual indicator to displaying the second visual indicator is based on detecting a pinching gesture.

23. A non-transitory computer readable storage medium storing one or more programs configured to be executed by one or more processors of a computing device with a touch screen display, the one or more programs including instructions for:
    displaying a map application, wherein the map application is configured to display a map;
    receiving location information for the computing device; and
    in response to detecting a gesture on a view location icon while the map application is displayed:
        displaying a first visual indicator on a portion of the displayed map that indicates an approximate region in which the computing device is located in accordance with the received location information when the approximate region lies within the displayed map; and
        displaying a second visual indicator around a perimeter of the displayed map when the approximate region includes the displayed map and also extends beyond the displayed map;
    changing from displaying the first visual indicator to displaying the second visual indicator in response to magnifying an area of the map that includes the approximate region in which the computing device is located, wherein the first visual indicator is not displayed while the second visual indicator is being displayed; and
    changing from displaying the second visual indicator to displaying the first visual indicator in response to demagnifying an area of the map that includes the approximate region in which the computing device is located, wherein the second visual indicator is not displayed while the first visual indicator is being displayed.

24. The non-transitory computer readable storage medium of claim 23, wherein detecting the gesture on the view location icon initiates a request for the location information for the computing device.

25. The non-transitory computer readable storage medium of claim 23, wherein the one or more programs further include instructions for receiving the location information from a transmitting device that is located within a region corresponding to the displayed first visual indicator.

26. The non-transitory computer readable storage medium of claim 23, wherein the location information corresponds to one or more terrestrial transmitting devices from which the computing device receives signals.

27. The non-transitory computer readable storage medium of claim 23, wherein the one or more programs further include instructions for:
    receiving signals from a plurality of services capable of providing the location information; and
    selecting location information from one of the plurality of services in accordance with location information selection criteria.

28. The non-transitory computer readable storage medium of claim 23, wherein the first visual indicator includes a circle displayed on the displayed map.

29. The non-transitory computer readable storage medium of claim 23, wherein the first visual indicator includes a rectangle displayed on the displayed map.

30. The non-transitory computer readable storage medium of claim 23, wherein the second visual indicator includes a rectangle displayed at the perimeter of the displayed map.

31. The non-transitory computer readable storage medium of claim 23, wherein while displaying the second visual indicator, the second visual indicator occupies a first area of the touch screen display, the instructions further for:
    while displaying the map and the second visual indicator, receiving an input to magnify the area of the map that includes the approximate region in which the computing device is located; and
    in response to receiving the input:
        magnifying the area of the map that includes the approximate region in which the computing device is located; and
        continuing to display the second visual indicator occupying the first area of the touch screen display.

32. The non-transitory computer readable storage medium of claim 23, wherein the first visual indicator and the second visual indicator are displayed overlaid on the map.

33. The non-transitory computer readable storage medium of claim 23, wherein changing from displaying the second visual indicator to displaying the first visual indicator is based on detecting a de-pinching gesture, and wherein changing from displaying the first visual indicator to displaying the second visual indicator is based on detecting a pinching gesture.

* * * * *